(12) United States Patent
Harvill et al.

(10) Patent No.: US 12,056,343 B2
(45) Date of Patent: Aug. 6, 2024

(54) SYSTEM AND METHOD FOR AUTHORING HIGH QUALITY RENDERINGS AND GENERATING MANUFACTURING OUTPUT OF CUSTOM PRODUCTS

(71) Applicant: ZAZZLE INC., Menlo Park, CA (US)

(72) Inventors: Leslie Youong Harvill, Olympia, WA (US); Scott Burgess, Portland, OR (US); Brent Burgess, Winchester (GB); Matthew DiFonzo, Belmont, CA (US); Robert I. Beaver, III, San Francisco, CA (US)

(73) Assignee: ZAZZLE, INC., Menlo Park, CA (US)

( * ) Notice: Subject to any disclaimer, the term of this patent is extended or adjusted under 35 U.S.C. 154(b) by 54 days.

(21) Appl. No.: 17/827,726

(22) Filed: May 29, 2022

(65) Prior Publication Data

US 2023/0384922 A1 Nov. 30, 2023

(51) Int. Cl.
G06F 3/04847 (2022.01)

(52) U.S. Cl.
CPC ................. G06F 3/04847 (2013.01)

(58) Field of Classification Search
USPC .......................................................... 715/771
See application file for complete search history.

(56) References Cited

U.S. PATENT DOCUMENTS

| | | | |
|---|---|---|---|
| 8,442,355 B2 | 5/2013 | Imai | |
| 8,958,663 B1 * | 2/2015 | Harvill | H04N 1/32128 382/318 |
| 10,254,941 B2 * | 4/2019 | Bowen | G06F 3/04845 |
| 10,901,750 B1 * | 1/2021 | Price | G06F 8/71 |
| 2001/0016054 A1 | 8/2001 | Banker et al. | |

(Continued)

OTHER PUBLICATIONS

International Search Report dated Jun. 23, 2023 for Application No. PCT/US2023/015035.
International Search Report dated Jul. 3, 2023 for Application No. PCT/US2023/015037.
International Search Report dated Jun. 27, 2023 for Application No. PCT/US2023/015033.

(Continued)

*Primary Examiner* — Tamara T Kyle
*Assistant Examiner* — Koorosh Nehchiri
(74) *Attorney, Agent, or Firm* — Patterson & Sheridan LLP; Malgorzata A. Kulczycka

(57) ABSTRACT

In some embodiments, a method for processing and controlling a collection of data to generate output using a dynamic system comprises: providing the dynamic system for generating digital representations of physical products; providing a control system having two or more data modules, the two or more data modules being communicatively coupled to receive collection data, for a physical product of the physical products, from the dynamic system and implementing a plurality of switches; activating the dynamic system to read and process the collection data received from the dynamic system; and using the two or more data modules of the control system, generating, based on the collection data, output that satisfies conditions set forth using the plurality of switches; generating a digital representation of the output as a series of user interface elements for a user to control, modify, and view the digital representation of the physical product using one or more common user interface classes available on a digital platform.

20 Claims, 60 Drawing Sheets
(44 of 60 Drawing Sheet(s) Filed in Color)

(56) References Cited

U.S. PATENT DOCUMENTS

| | | | | |
|---|---|---|---|---|
| 2010/0073466 A1* | 3/2010 | Jones | ............ | H04N 13/31 |
| | | | | 348/51 |
| 2010/0153831 A1* | 6/2010 | Beaton | ............ | G06Q 30/02 |
| | | | | 715/201 |
| 2010/0185309 A1* | 7/2010 | Ohiaeri | ............ | G06Q 30/0621 |
| | | | | 700/98 |
| 2012/0221428 A1 | 8/2012 | Harvill et al. | | |
| 2013/0060801 A1* | 3/2013 | Beaver, III | ............ | H04N 1/00161 |
| | | | | 707/758 |
| 2014/0279180 A1* | 9/2014 | Beaver | ............ | G06Q 30/0643 |
| | | | | 705/26.5 |
| 2015/0205500 A1* | 7/2015 | Zacharias | ............ | G06F 40/166 |
| | | | | 726/4 |
| 2016/0343058 A1* | 11/2016 | Levy | ............ | G06F 16/248 |
| 2021/0118031 A1* | 4/2021 | Beaver, III | ............ | G06Q 30/0621 |
| 2022/0318875 A1* | 10/2022 | Ciulis | ............ | G06T 17/20 |

OTHER PUBLICATIONS

Fdhal Nawar, "Towards an Automated Soft Proofing System Using High Dynamic Range Imaging and Artificial Neural Networks", Apr. 30, 2011.

Fabian et al. "Integrating the Microsoft Kinect with Simulink: Real-Time Object Tracking Example", IEEE/ASME Transactions of Mechatronics, vol. 19, No. 1. Feb. 2014.

Farabet et al. "NeuFlow: A Runtime Reconfigurable Dataflow Processor for Vision", Jun. 20, 2011. IEEE Computer Society Conference on, IEEE.

\* cited by examiner

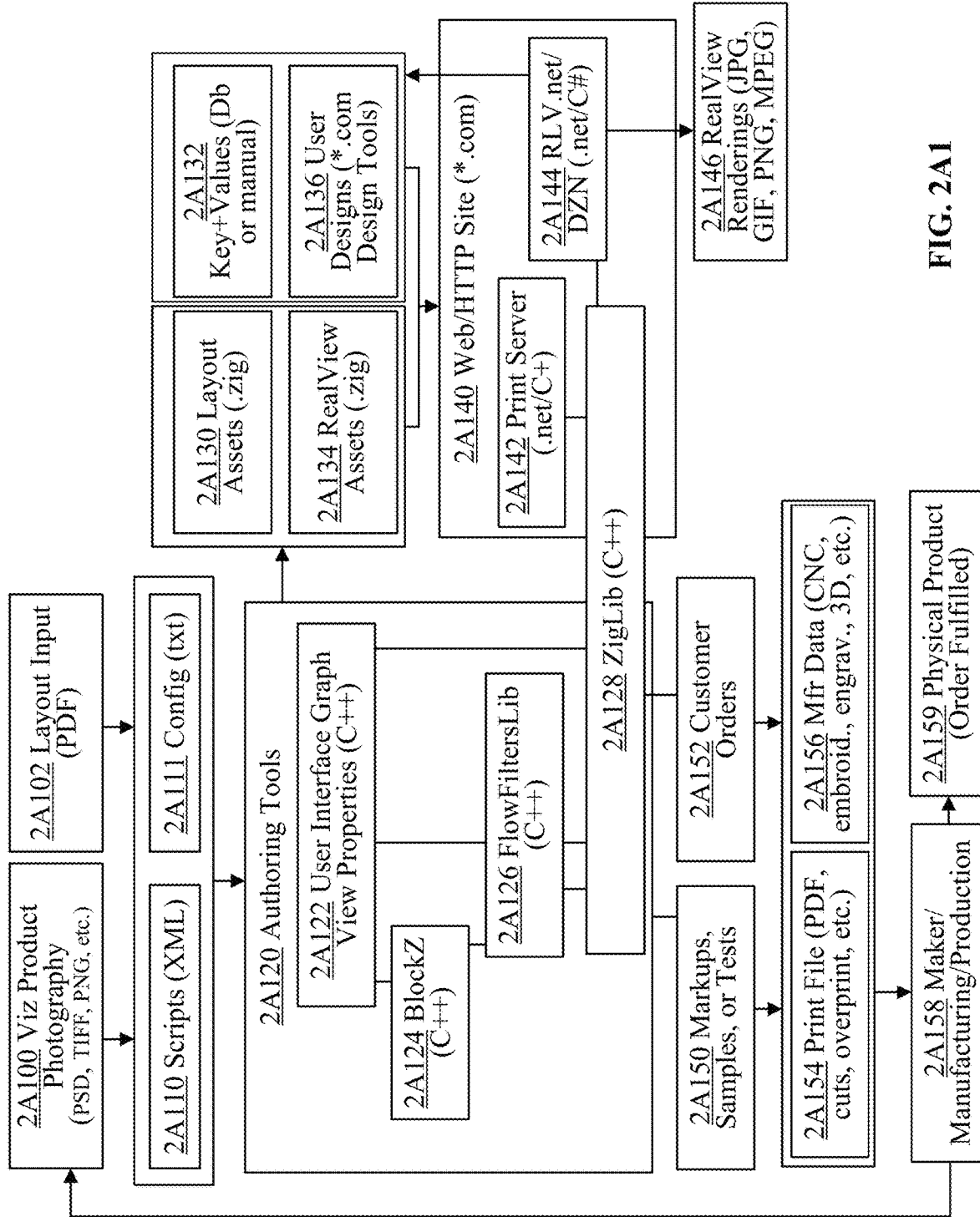
FIG. 2A1

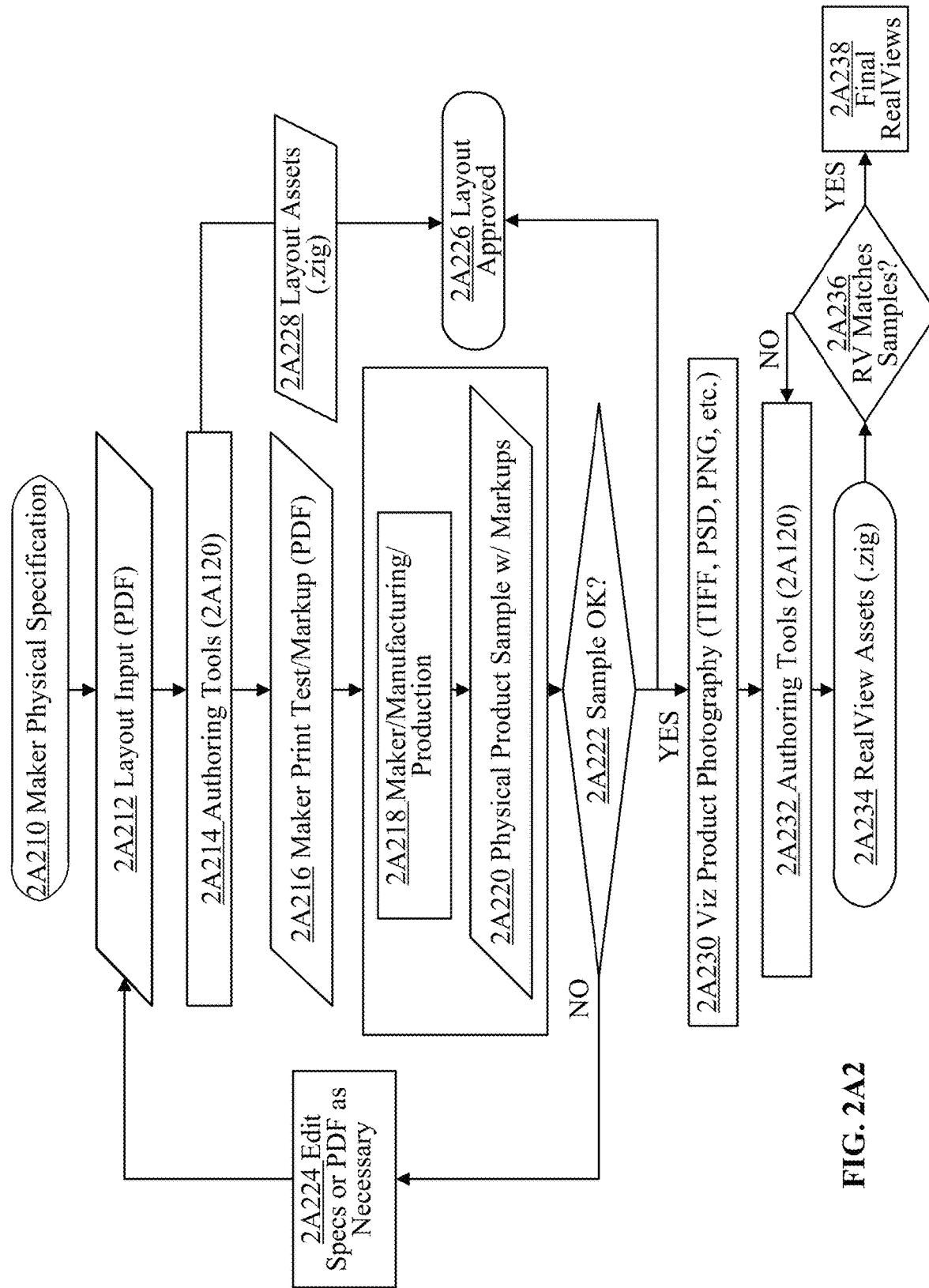
FIG. 2A2

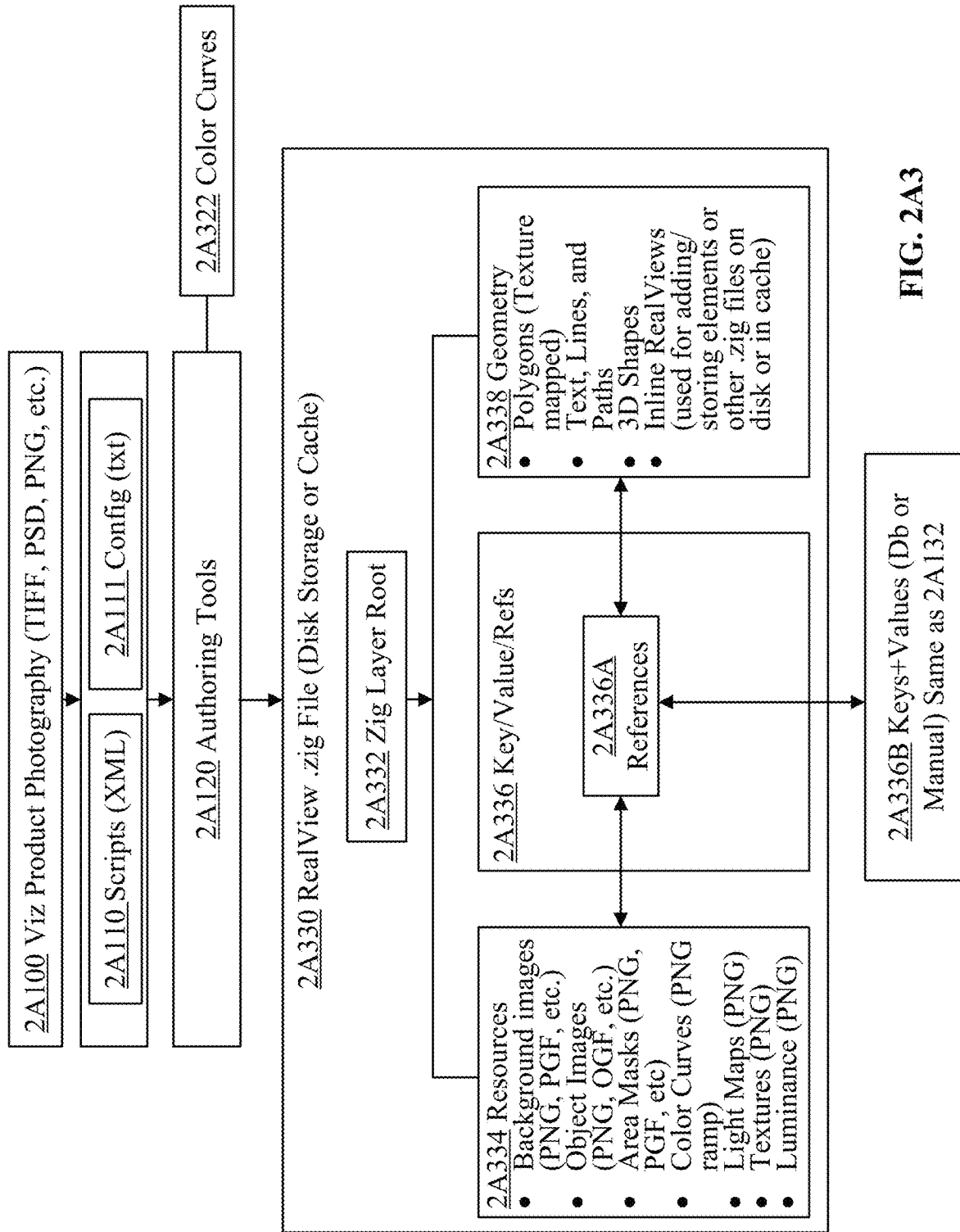
FIG. 2A3

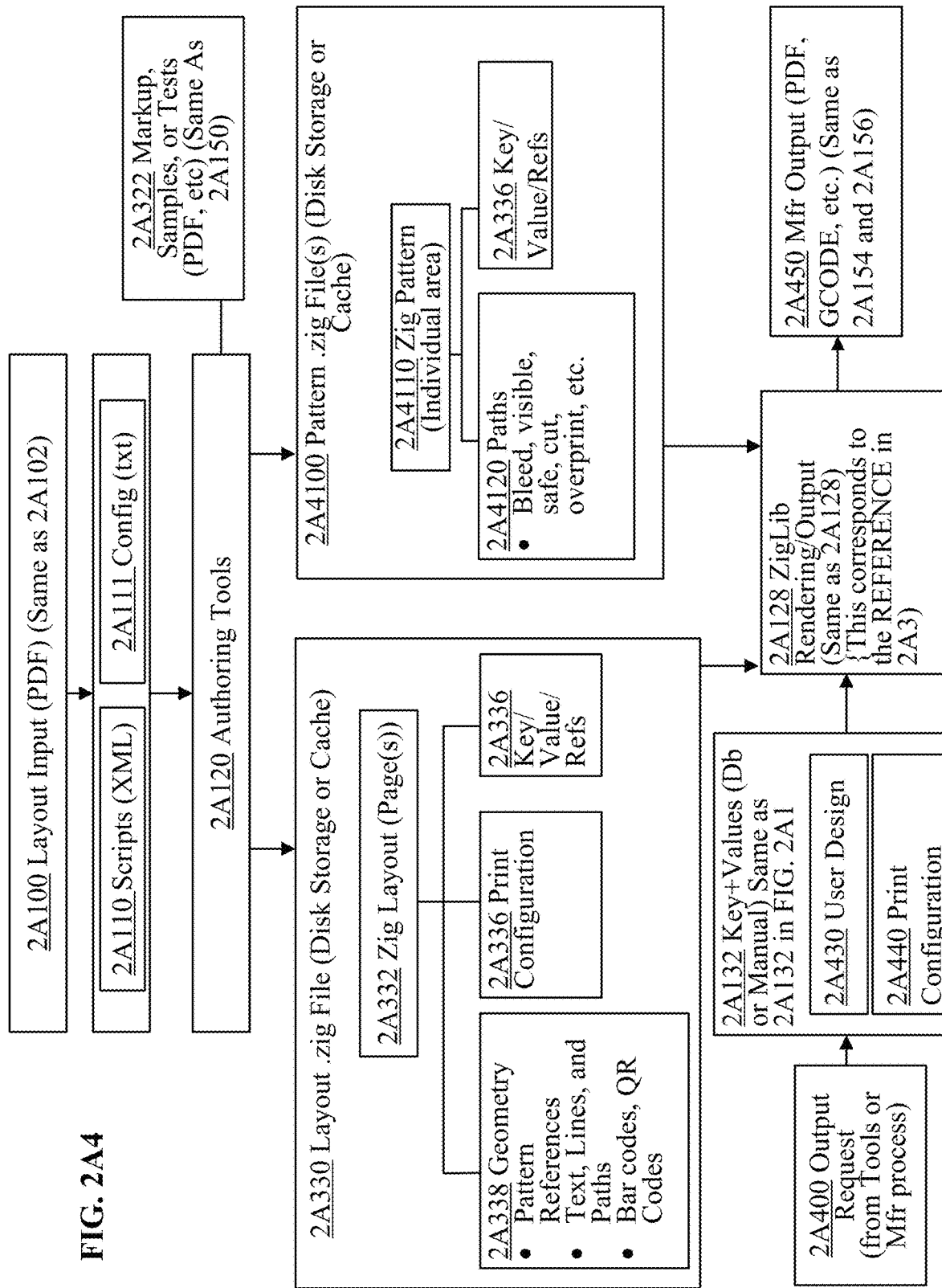
FIG. 2A4

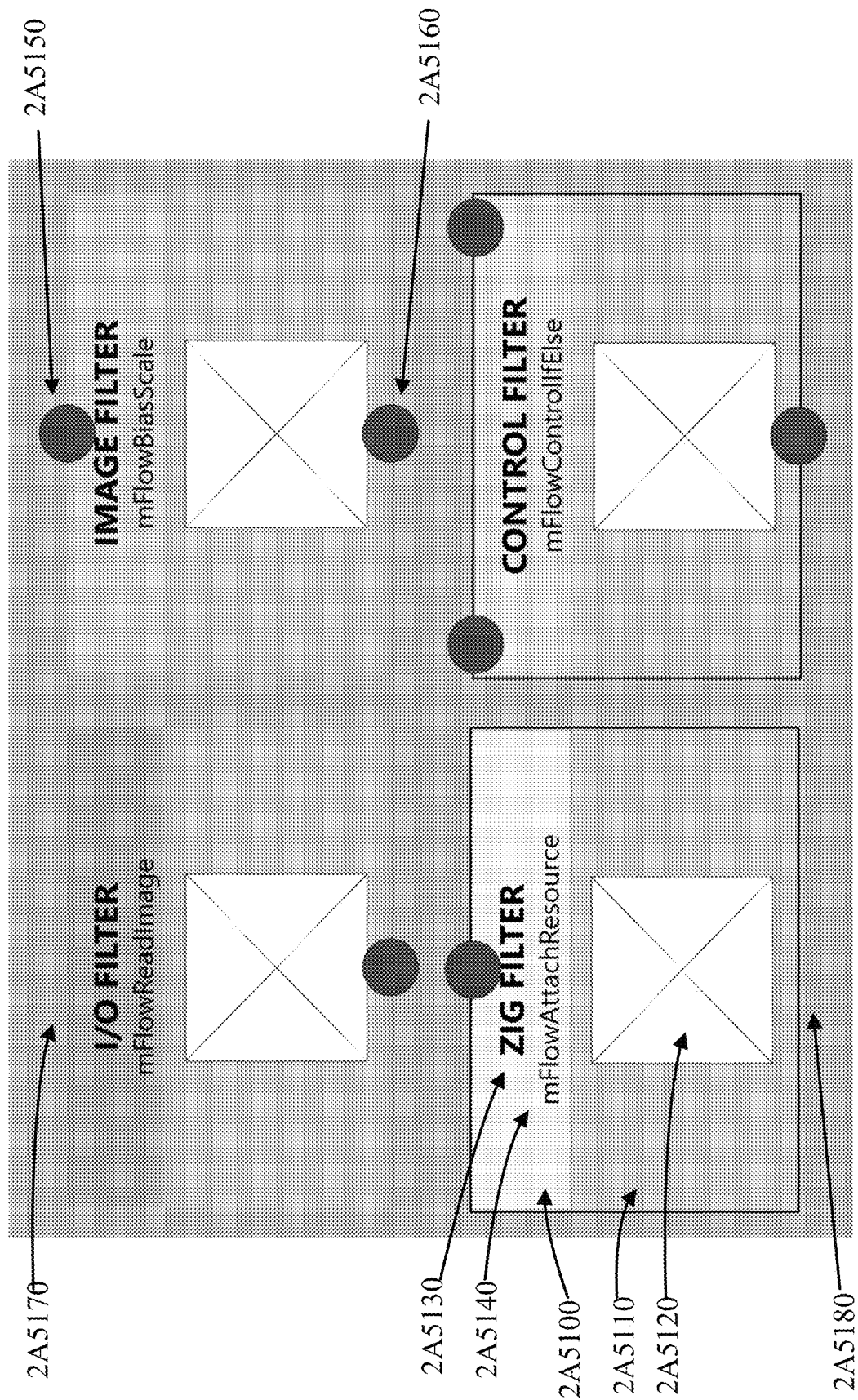
FIG. 2A5

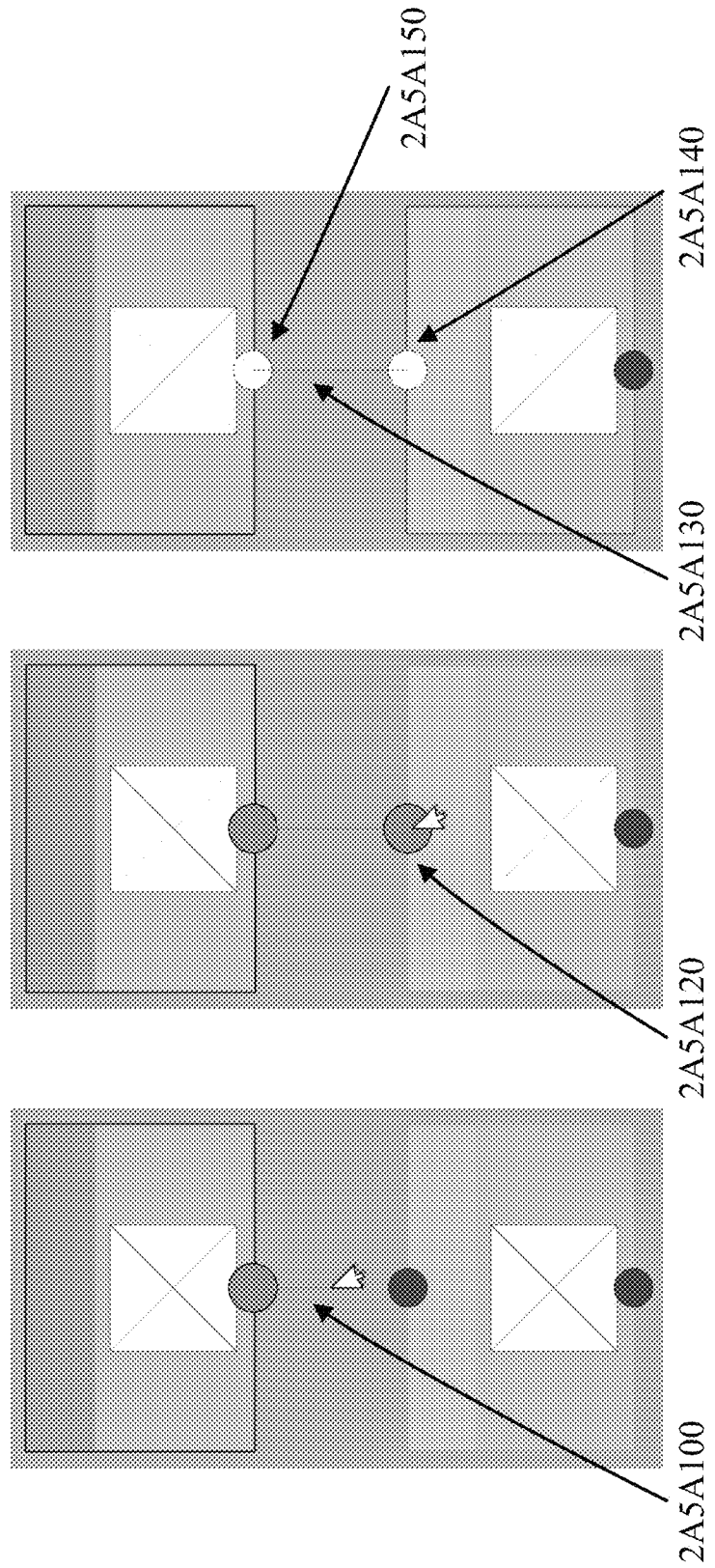
FIG. 2A5A

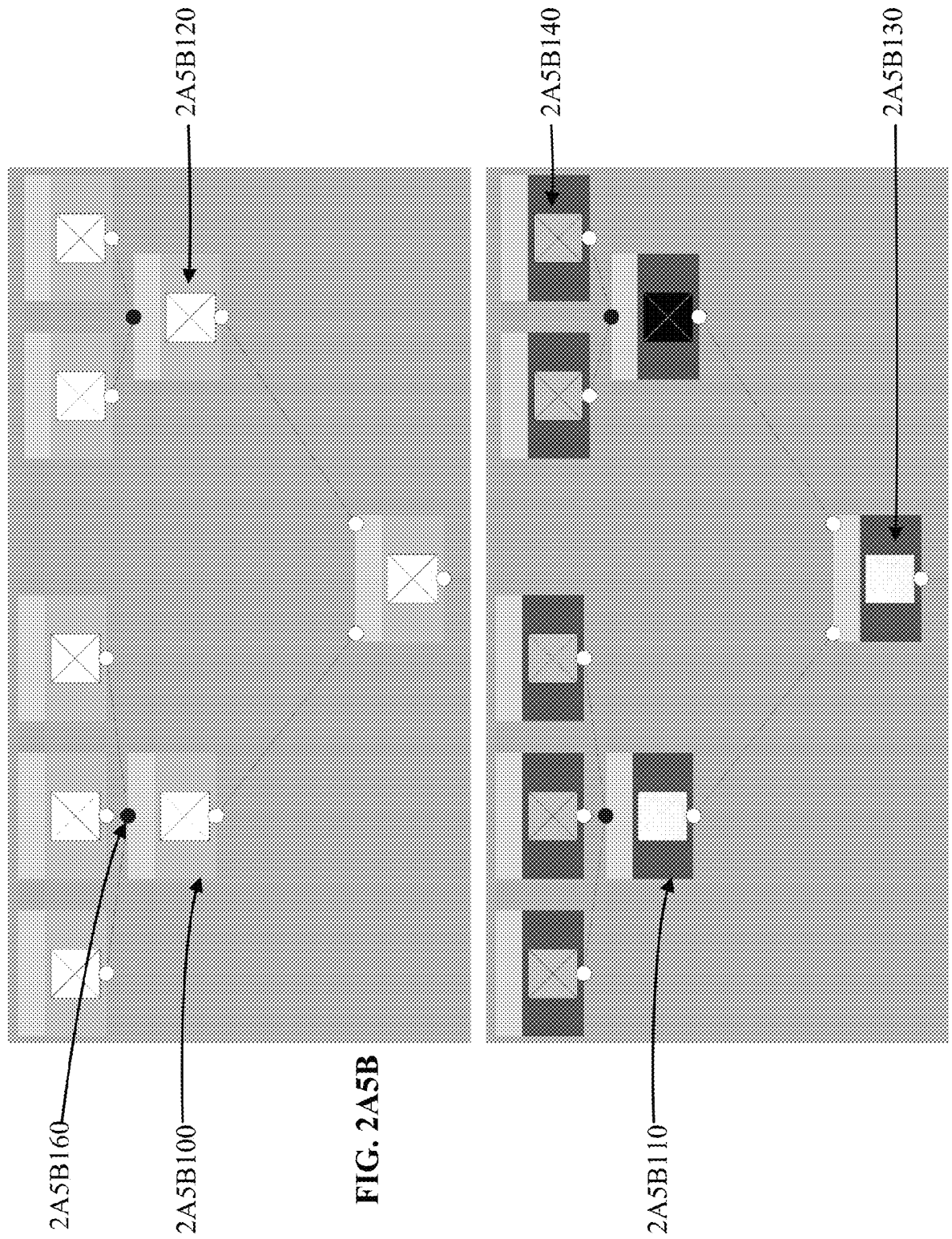
FIG. 2A5B

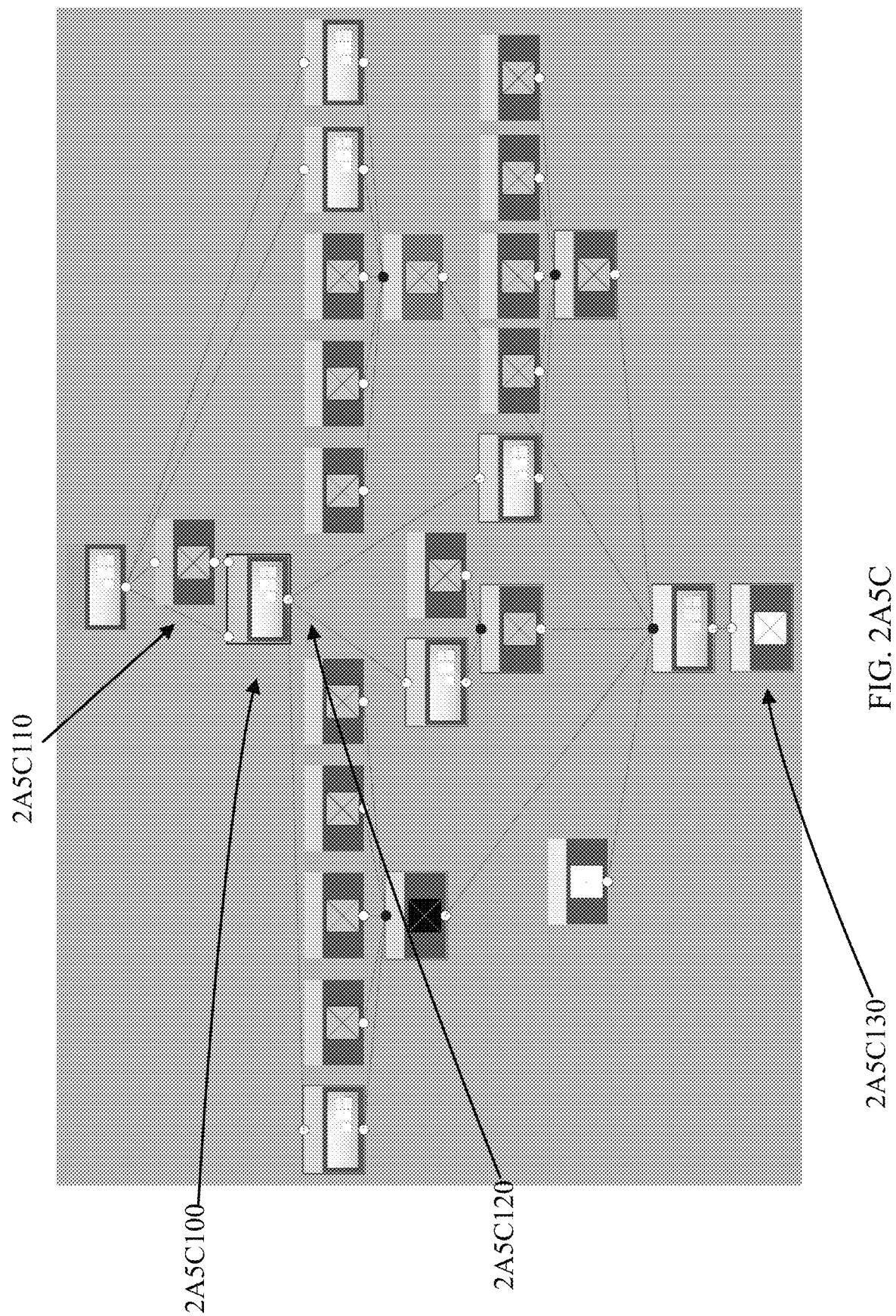
FIG. 2A5C

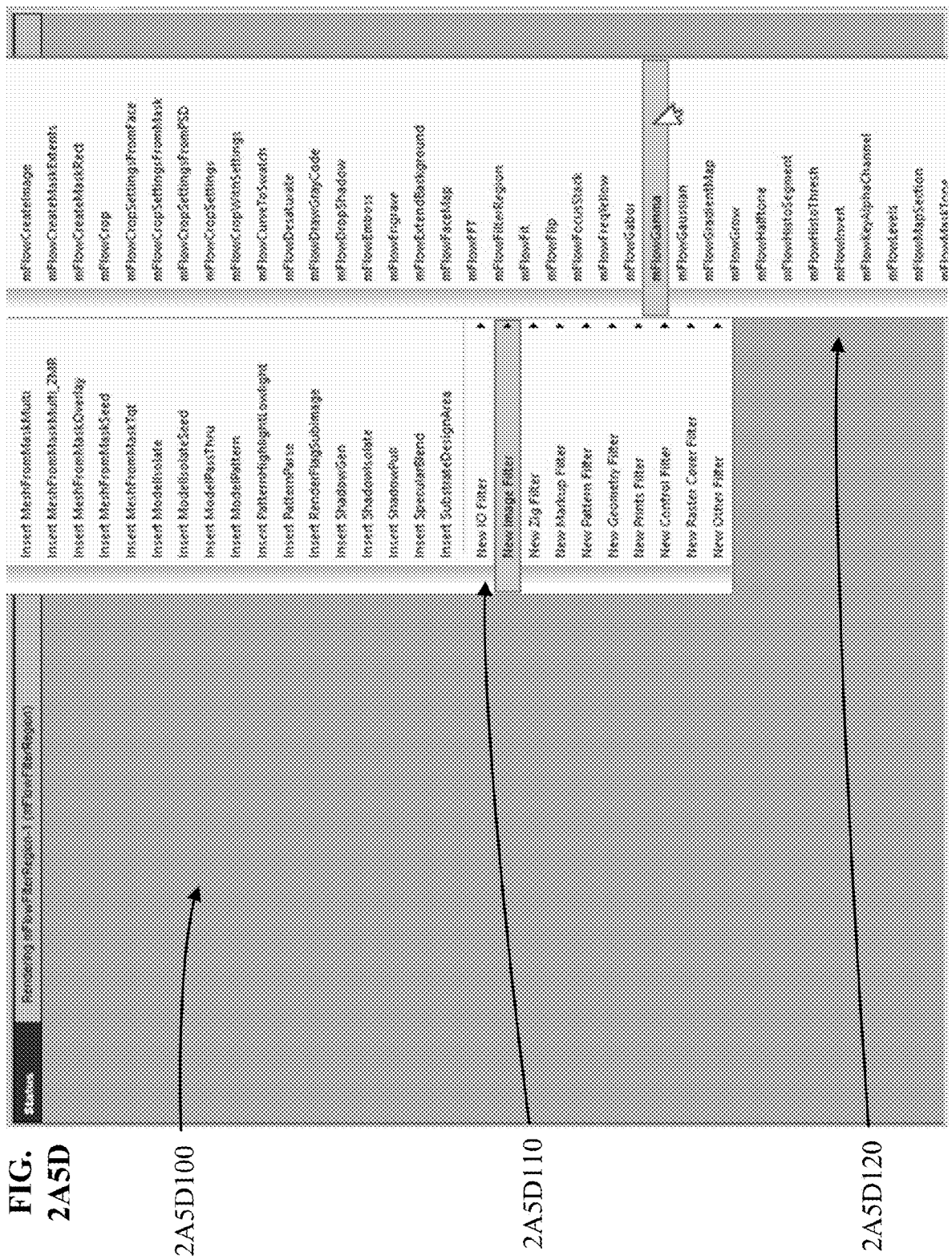
FIG. 2A5D

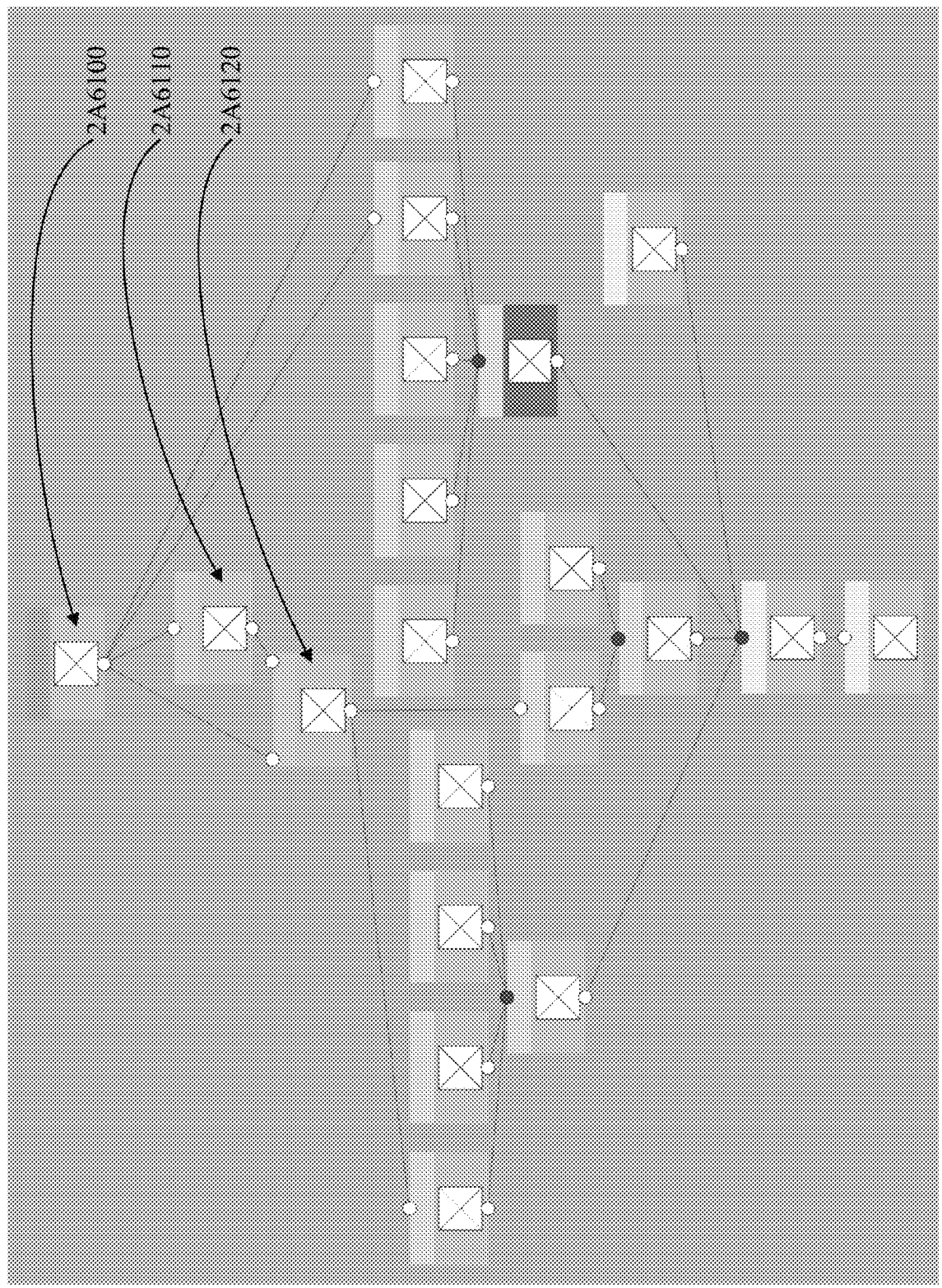
FIG. 2A6

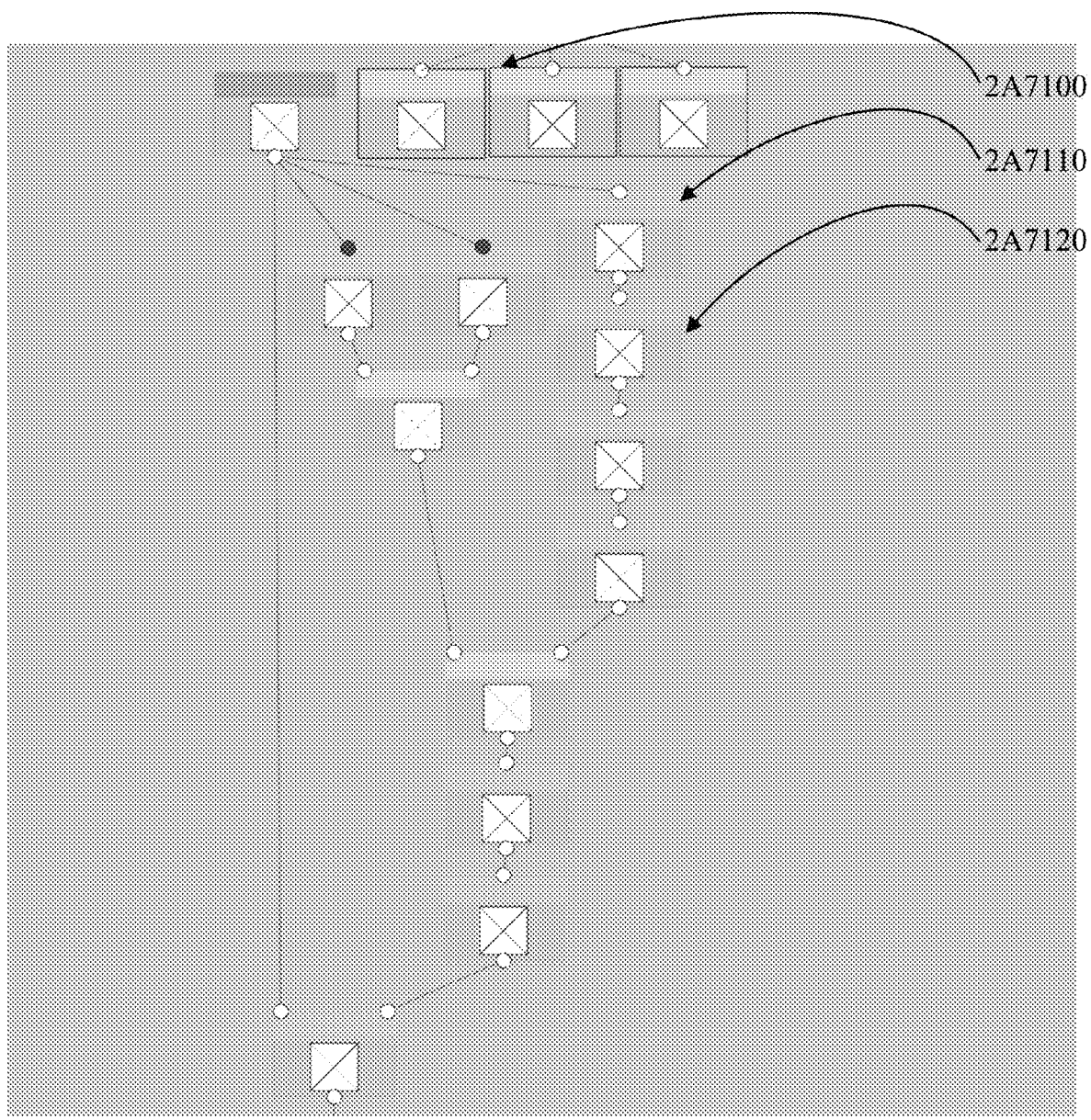
FIG. 2A7

| | | |
|---|---|---|
| LayoutMarkup | | |
| Settings | | |
| Input Name | ConfigPDF | |
| Pattern Combos | front+back, front2, fron... | |
| Grid | | |
| Save Grid | True | |
| Grid Color | | |
| Red | 0.000000 | |
| Green | 0.000000 | |
| Blue | 0.000000 | |
| Bg Color | | |
| Red | 1.000000 | |
| Green | 1.000000 | |
| Blue | 1.000000 | |
| Write Background | False | |
| Invert Colors | False | |
| Line Size Option | Scale | |
| Line Width | 2.000000 | |
| Squares Per Inch | 10 | |
| Outlines | | |
| Save Outlines | True | |
| Markup | | |
| Save Markup | True | |

| | A | B | C | D | E |
|---|---|---|---|---|---|
| | this.mFlowFilterRoot.Default | this.mFlowFilterRoot.AssetName | this.mFlowFilterRoot.Sku | this.mFlowFilterRoot.View | this.m |
| 1 | zazzle_papercup_side.xml | zazzle_papercup_8oz-0_0_0-white-none-clean-product-2048 | zazzle_papercup_8oz | 0_0_0 | white |
| 2 | zazzle_papercup_front.xml | zazzle_papercup_8oz-0_90_0-white-none-clean-product-2048 | zazzle_papercup_8oz | 0_90_0 | white |
| 3 | zazzle_papercup_side2.xml | zazzle_papercup_8oz-0_180_0-white-none-clean-product-2048 | zazzle_papercup_8oz | 0_180_0 | white |
| 4 | zazzle_papercup_back.xml | zazzle_papercup_8oz-0_270_0-white-none-clean-product-2048 | zazzle_papercup_8oz | 0_270_0 | white |
| 5 | zazzle_papercup_lid.xml | zazzle_papercup_8oz-0_0_0-white-none-clean-lid-product-2048 | zazzle_papercup_8oz | 0_0_0 | white |
| 6 | zazzle_papercup_insitu1.xml | zazzle_papercup_8oz-0_0_0-white-none-insitu1-product-2048 | zazzle_papercup_8oz | 0_0_0 | white |
| 7 | zazzle_papercup_insitu2.xml | zazzle_papercup_8oz-0_0_0-white-none-insitu2-product-2048 | zazzle_papercup_8oz | 0_0_0 | white |
| 8 | zazzle_papercup_insitu3.xml | zazzle_papercup_8oz-0_0_0-white-none-insitu3-product-2048 | zazzle_papercup_8oz | 0_0_0 | white |
| 9 | zazzle_papercup_temp.xml | zazzle_papercup_8oz-0_0_0-white-none-temp-product-2048 | zazzle_papercup_8oz | 0_0_0 | white |
| 10 | zazzle_papercup_multi.xml | zazzle_papercup_8oz-0_0_0-white-none-multi-product-2048 | zazzle_papercup_8oz | 0_0_0 | white |

| | | | |
|---|---|---|---|
| | | Asset Path | E:\vit\zazzle\zazzle_papercup\... |
| | | Asset Name | zazzle_papercup_8oz-0_0_0-w... |
| | | Configuration Name | shotListConfig.txt |
| | | Configuration Info | |
| | | DefaultName | zazzle_papercup_side.xml ← 3ZC100 |
| | | Sku Name | zazzle_papercup_8oz |
| | | Current Shot | 0 |
| | | Take Record Name | |
| | | View Name | 0,0,0 |
| | | Substrate Name | white |
| | | Model Name | none |
| | | Context Name | clean |
| | | Crop Name | product |
| | | Maximum Dimension | 2048 |
| | | Current Take | 0 |
| | | Pof Current Take | false |
| | | Force Max Dim | false |
| | | Force Zig Write Name | false |
| | | Force Image Sampling | Don't Force |
| | | Force Compression Format | Don't Force |
| | | Force Alpha Premul | false |
| | | Write All Sizes | true |
| | | External Edit Format | |
| ☐ | ReadVis | | |
| | ☐ Input File Settings | | |
| | | File Path | Raw |
| | | File Name | zazzle_papercup_8oz... |

| | | |
|---|---|---|
| | Red | 240.00000 |
| | Green | 240.00000 |
| | Blue | 240.00000 |
| | Alpha | 255.00000 |
| ☐ | Blend Modes | |
| | Backgrou... | Normal |
| | BlendWrap | Normal |
| | BlendFront | Normal |
| ☐ | Source Maps | |
| | backgrou... | background |
| | wrapBott... | wrapBottom |
| | wrapFull | wrapFull |
| | frontBott... | frontBottom |
| | frontFull | frontFull |
| ☐ | Luminance Maps | |
| | LumBack... | LumBackground |
| | LumWrap | LumWrap |
| | LumFront | LumFront |
| ☐ | Blend Images | |
| | Shadow | Shadow |
| | Model | Model |
| | Specular | Specular |
| | Lid | Lid |
| ☐ | Render Flags | |
| | LidFlag | 1 |

SYSTEM AND METHOD FOR AUTHORING HIGH QUALITY RENDERINGS AND GENERATING MANUFACTURING OUTPUT OF CUSTOM PRODUCTS

FIELD OF DISCLOSURE

One technical field of the present disclosure is digital image processing. Another technical field is computer-implemented techniques for defining, capturing, assembling, and displaying customized content using digital image processing, and producing depictions of customizable items accurately and effectively.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

With the growth of digital computation capabilities and enhancements in manufacturing processes, goods manufacturing is transforming into production of goods according to individual customization requests received from customer computers. For instance, manufacturers usually fulfill online orders received from the customers who use their computer systems to customize depictions of generic goods and place the online orders for the individually customized goods.

There are many systems on the market that are configured to offer the users the opportunity to order products having customized attributes. For example, in the case of the custom manufactured framed products such as photos, digital images, artwork, and other frameable products, the systems may offer the users the opportunity to order the frames having customized sizes and colors.

Customizing the products that have many customizable parameters may be quite challenging. The selection of customization values may have implications on the appearance of the final custom products and on the way that the final custom products are rendered. Therefore, the systems often provide the functionalities for displaying depictions, i.e., synthetic views, of the customized products to help the users to visualize their customized products before the users order the products.

Generally, synthetic views are digital depictions of the objects displayed on computer-based display devices. In the context of digital customization of products, it is useful to render synthetic views of the products before the products are manufactured. This allows a user to visually check the product features and decorations before actually ordering the product. The synthetic views are often a combination of imagery from digital photography. They may include, for example, digital markups and synthetic renderings derived from, for example, 2D, 2.5D and 3D geometry of the objects.

Algorithms for high quality digital rendering of geometry have been researched and studied for some time. They typically use simulation of light, texture, and color. Major advancements in this technology include work using Scanline Rendering, Binary Space partitioning, zBuffer, aBuffer, the Pixar's Reyes rendering system (culminating in the Renderman tool), the wide availability of hardware supporting OpenGL and Direct3D, and improvements in hardware assisted ray-tracing, as implemented in, for example, Intel's Embree rendering system. For example, the real-time rendering applications for simulation and games typically use carefully designed content and geometry rendered with optimized spatial partitioning on hardware using OpenGL or Direct3D. The rendering time for a frame in a real-time rendering application must be rapid, and usually, the latency appears to be a key barrier for supporting user interactions with the application.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the drawings:

FIG. 2A1 is a block diagram that illustrates an example structure of an example implementation of authoring tools.

FIG. 2A2 is a block diagram that illustrates an example structure of an example implementation of authoring tools.

FIG. 2A3 is a block diagram that illustrates an example structure of an example implementation of authoring tools.

FIG. 2A4 depicts an example structure of an example implementation of authoring tools.

FIG. 2A5 depicts an example of a BlockZ.

FIG. 2A5A depicts a process of connecting a filter output to another filter's input.

FIG. 2A5B depicts two possible filter processing states.

FIG. 2A5C depicts an example data-flow processing unit.

FIG. 2A5D depicts a process of selecting a filter to be added to a Graph View workspace.

FIG. 2A6 depicts an example of BlockZ connected together.

FIG. 2A7 depicts an example of a BlockZ.

FIG. 2BA depicts examples of key-value pairs.

FIG. 2EA depicts a CAD cutout file definition to be sent to a manufacturer and corresponding layers describing the CAD cutout file.

FIG. 2FA depicts a G-code file to be sent to a manufacturer for manufacturing a cutout of an example brass stamp.

FIG. 3K depicts example paths for example filters.

FIG. 3ZA depicts examples of complex filters.

FIG. 3ZB depicts example product data used to define properties in authoring tools.

FIG. 3ZC depicts the content of an example view file.

FIG. 4 is a flow chart depicting an example process for creating a custom product with multiple parameters encoded in product manufacturing instructions.

FIG. 5 is a flow chart depicting an example process for implementing BlockZ.

FIG. 6 is a flow chart depicting an example process for generating a composite image file.

FIG. 7 is a flow chart depicting an example process for applying filters to a composite image file.

DESCRIPTION OF EXAMPLE EMBODIMENTS

Figure 1:
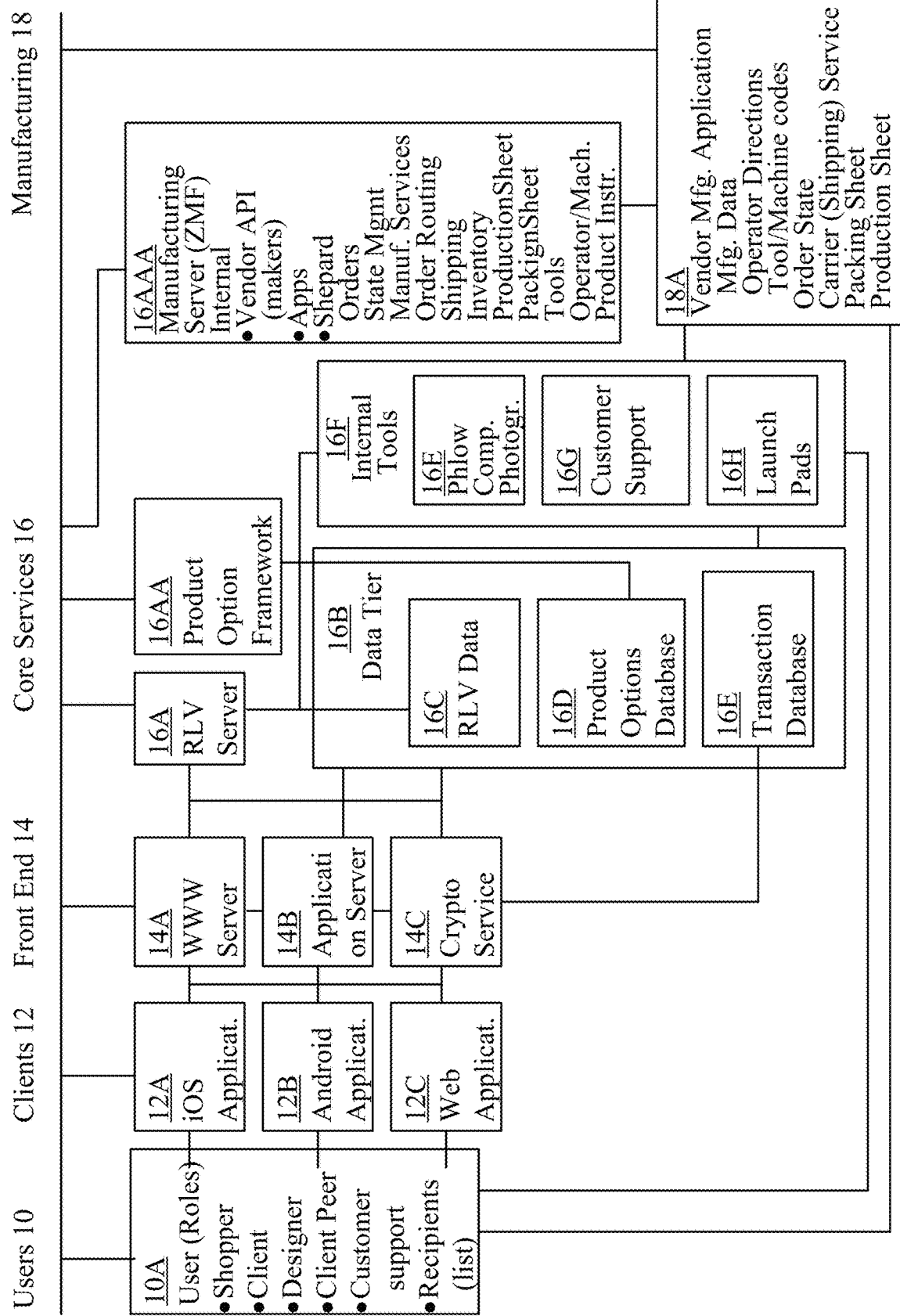
FIG. 1 is a block diagram showing an example environment for designing and manufacturing products.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

| | | |
|---|---|---|
| 1.0. | GENERAL OVERVIEW | 9 |
| 2.0. | AUTHORING TOOLS | 11 |
| 3.0. | EXAMPLE SERVICE IMPLEMENTATION | 13 |
| 3.1. | EXAMPLE COMPUTER ENVIRONMENTS | 14 |
| 3.1.1. | USER DEVICES | 16 |
| 3.1.2. | CLIENT APPLICATIONS | 16 |
| 3.1.3. | FRONT END SERVERS | 16 |
| 3.1.4. | CORE SERVICES | 16 |
| 3.2. | EXAMPLE MANUFACTURING SYSTEM | 22 |
| 3.2.1. | EXAMPLE MANUFACTURING PROCESS | 23 |
| 3.2.2. | EXAMPLE PRODUCT COLLABORATION PLATFORM | 24 |
| 3.3. | STRUCTURAL DESCRIPTION OF AUTHORING TOOLS | 25 |
| 3.4. | DESIGNING AN ASSET | 32 |
| 3.5. | ASSET DEFINITION DATA | 33 |
| 3.6. | SPECIFIC CUTOUT CASES | 34 |
| 3.7. | EXAMPLE TRANSFER FILM | 36 |
| 3.7.1. | AN EXAMPLE METHOD FOR CREATING DATA-FLOW PROCESSING UNITS | 37 |
| 3.8. | BLOCKZ | 40 |
| 3.8.1. | BLOCKZ AS A FILTER STRUCTURE | 41 |
| 3.8.2. | CONSOLIDATION OF FILTER SETS | 41 |
| 3.8.3. | FAILED STATES | 42 |
| 3.8.4. | FAIL STATE SWITCHING | 43 |
| 3.8.5. | BLOCK CONTROL CLUSTER | 44 |
| 3.8.6. | COMPLEXITY OF A BLOCK CLUSTER | 44 |
| 3.8.7. | IF-ELSE DECISION POINTS | 45 |
| 3.8.8. | STREAMLINED PROCESSING | 45 |
| 3.8.9. | EXAMPLE DATA FLOW NETWORK IMPLEMENTING BLOCKZ | 47 |
| 3.8.10. | EXAMPLE METHOD FOR PROCESSING DATA USING BLOCKZ | 49 |
| 3.9. | ADDING AND LINKING INDIVIDUAL BLOCKZ IN A FILTER SET | 50 |
| 3.10. | BLOCKZ AS INHERENTLY COMPLICATED FILTER STRUCTURES | 51 |
| 3.10.1. | CONSOLIDATION OF FILTER SETS | 51 |
| 3.10.2. | STREAMLINED AND STANDARDIZED FILTER SETS | 52 |
| 3.11. | EXPOSING A SUBSET OF CAPABILITIES TO EXTERNAL GROUPS | 52 |
| 3.12. | LOOPS AND LOOPING | 53 |
| 3.13. | USING FILTER SETS IN DYNAMIC INSITU REALVIEWS | 53 |
| 3.14. | TRANSLATING KEY-VALUE PAIRS TO MANUFACTURING INSTRUCTIONS | 54 |
| 3.14.1. | SPOT COLOR DEFINITIONS - FOIL EXAMPLES | 54 |
| 3.15. | DESIGNING PROCESS | 57 |
| 3.15.1. | DESIGNING AN ASSET | 57 |
| 3.15.2. | GENERATING INSTRUCTIONS TO A MANUFACTURER | 57 |
| 3.15.3. | EXAMPLE PROCESS FOR CORRELATING A MANUFACTURED PRODUCT WITH AN INTERACTIVE DIGITAL DESIGN | 59 |
| 3.15.4. | EXAMPLE OF CREATING A CUSTOM WAX SEAL STAMP | 61 |
| 3.15.5. | 3D PRINTING EXAMPLE | 63 |
| 3.15.6. | BLEED AND NO BLEED ISSUES IN DESIGNING PRODUCTS | 64 |
| 3.16. | EXAMPLE OF A BLEED CASE | 65 |
| 3.17. | WRAP-AROUND CASES | 66 |
| 3.18. | USING MARKUPS TO VERIFY LOCATIONS OF THE GREEN/BLUE/RED LINES | 67 |
| 3.19. | EXAMPLES OF A NO BLEED CASE | 68 |
| 3.20. | GRID DEFINITION | 69 |
| 3.21. | COMPUTATIONAL PHOTOGRAPHY APPROACH | 70 |
| 3.21.1. | RECOGNIZING COLORS BASED ON MARKUPS | 70 |
| 3.22. | QUICK RESPONSE CODES (QR CODES) | 73 |
| 3.23. | DESIGN VIEWS | 74 |
| 3.24. | CONFIGURABLE IMAGES | 75 |
| 3.25. | PRINT VIEWS | 76 |
| 3.26. | PRINT FILES | 76 |
| 3.27. | ASSET DEFINITION FROM A MANUFACTURER | 77 |
| 3.28. | DATA STRUCTURES FOR CAPTURING AN ASSET DEFINITION | 80 |
| 3.28.1. | LAYOUTS AND LAYERS | 80 |

-continued

| | | |
|---|---|---|
| 3.28.2. | ILLUSTRATOR VIEWS | 81 |
| 3.28.3. | LAYERS | 82 |
| 3.29. | GENERATING DATA TO ENABLE HIGH QUALITY RENDERINGS | 83 |
| 3.30. | FIELD MARKUPS | 84 |
| 3.31. | FILTERS | 85 |
| 3.32. | UNIQUENESS OF THE DATA FLOW NETWORK | 88 |
| 3.33. | MARKUPS | 88 |
| 3.33.1. | CONIC MARKUPS | 89 |
| 3.33.2. | NON-CONIC MARKUPS | 89 |
| 3.34. | USING MARKUPS TO TEST LIGHTING LEVELS | 90 |
| 3.35 | USING MARKUPS TO TEST SIZES/SHAPES/ PROPORTIONS/POSITIONS | 92 |
| 3.36. | HIGH QUALITY PHOTOGRAPHY | 92 |
| 3.36.1. | RECEIVING PHYSICAL PRODUCTS | 92 |
| 3.36.2. | TAKING PHOTOGRAPHS OF PHYSICAL PRODUCTS | 93 |
| 3.36.3. | COMPOSITE IMAGE FILES | 94 |
| 3.36.4. | EXAMPLE COMPOSITE IMAGE FILES | 95 |
| 3.37. | EXAMPLE PROCESS FOR GENERATING A COMPOSITE IMAGE FILE | 95 |
| 3.38. | MFLOWZIGINLINE | 97 |
| 3.39. | LAYERS, CHANNELS AND PATHS IN A COMPOSITE IMAGE FILE | 98 |
| 3.40. | EXAMPLE COMPONENTS OF A COMPOSITE IMAGE FILE | 99 |
| 3.41. | GENERATING A DIGITAL REPRESENTATION OF THE PHYSICAL PRODUCT | 99 |
| 3.42. | APPLYING FILTERS TO A COMPOSITE IMAGE FILE | 100 |
| 3.43. | COMPLEX FILTERS | 101 |
| 3.44. | UNIQUE PROCESSING OF A COMPOSITE IMAGE FILE | 102 |
| 3.45. | PORTING A COMPOSITE IMAGE FILE INTO AUTHORING TOOLS | 103 |
| 3.46. | EXAMPLES OF COMPLEX FILTERS | 104 |
| 3.47. | UNIQUENESS OF COMPLEX FILTERS | 105 |
| 3.48. | CREATING LAYERS AND CHANNELS USING COMPLEX FILTERS | 105 |
| 3.49. | LOADING LAYERS | 106 |
| 3.50. | EXAMPLE STATIC VIEWS | 106 |
| 3.51. | EXAMPLE CONTENT OF AN EXAMPLE VIEW FILE | 108 |
| 3.52. | EXAMPLE FLOW CHARTS | 109 |
| 3.52.1. | METHOD FOR CREATING A CUSTOM PRODUCT WITH MULTIPLE PARAMETERS ENCODED IN PRODUCT MANUFACTURING INSTRUCTIONS | 109 |
| 3.52.2. | METHOD FOR IMPLEMENTING BLOCKZ | 111 |
| 3.52.3. | GENERATING A COMPOSITE IMAGE FILE | 113 |
| 3.52.4. | APPLYING ADVANCED FILTERS TO A COMPOSITE IMAGE FILE | 114 |
| 3.52.5. | CORRELATING A MANUFACTURED PRODUCT WITH AN INTERACTIVE ASSET | 115 |
| 3.53. | IMPLEMENTATIONS MECHANISMS | 117 |

1.0. General Overview

In some implementations, a method for designing and manufacturing a custom product using a multiplicity of parameters encoded in the product's manufacturing instructions by representing each parameter, specific to a custom product, by using one or more key-value pairs of a plurality of key-value pairs. A key-value pair is a data structure that captures a pair and may include an attribute key and a corresponding attribute value. A key may be, for example, a name of the attribute, and a value may be, for example, the value associated with the key. A simple example of a key-value pair may include a "color" word as a key and a "red" word as a value for the pair represented as a {color; red} pair. The term "product" usually refers to a physical product, while the term "asset" usually refers to a digital file or an interactive digital product; these terms may be used interchangeably throughout the specification.

The method may also include classifying each key, in the plurality of key-value pairs for a custom product, into a classification selected from a plurality of classifications. The classification may be based on a contribution of the key to an overall appearance of the custom product.

Based on the plurality of classifications, values for each key, of the key-value pair from the plurality of key-value pairs, may be selected. The selection may be based on characteristics of a to-be-manufactured, physical product that corresponds to the custom product synthetic rendering (which is the designed and customized asset). The to-be-manufactured, physical product may, unfortunately, have one or more marked visual differences for the corresponding parameter from the corresponding key-value pair when compared to the synthetic rendering.

The plurality of key-value pairs may be translated into a plurality of instructions that are represented in the data format that is compatible with the executable programs of a manufacturer. Stating differently, the plurality of key-value pairs may be translated to the data expressed in the data format that the manufacturer's processes can understand.

The plurality of instructions may be transmitted to the manufacturer, causing the manufacturer to execute the executable programs using the plurality of instructions to generate a manufactured, physical product. As described above, the plurality of instructions captures the translation of the plurality of key-value pairs specific to the asset.

Upon receiving the physical product from the manufacturer, an imaging means may be used to detect one or more regions, in the physical product, that indicate visual differences between the physical product and the custom product.

Based on the one or more regions, a graphical representation of the physical product is constructed. The graphical representation is represented using a plurality of modified key-value pairs and is constructed in such a way that the plurality of modified key-value pairs indicate the changes in an appearance between the physical product and the customized product.

The method may also include correlating the plurality of the modified key-value, corresponding to the appearance of the physical product, with the plurality of key-value pairs derived previously and corresponding to the appearance of the custom product.

Based on the correlation, one or more differences between the plurality of the modified key-value (corresponding to the appearance of the manufactured, physical product) and the plurality of key-value pairs (corresponding to the appearance of the custom product) are determined. The differences may be used to generate additional instructions to the manufacturer to help the manufacturer to manufacture a new product that resembles the custom product more accurately.

Throughout the disclosure, the term "composite image file" means a file that is executed by the authoring tools (described later) to generate an XML data container (i.e., a zig file, described in detail later), which the core services (such as core services 16 described in FIG. 1) use to generate a graphical representation of a configurable image.

Furthermore, throughout the disclosure, the term "configurable image" (e.g., a RealView) means an image returned by the core services in response to the user's modulated product options (based on the key-value pairs, described in detail later) selected from the options displayed on a website or other service where a user may interact with digital files implementing the approach described herein.

Moreover, throughout the disclosure, the term "composite image" is a collection of layers, channels, and data elements (described in detail later) that collectively represent an interactive asset (described in detail later).

2.0. Authoring Tools

In some implementations, a product visualization platform is configured to execute one or more software applications designed to generate high quality renderings and manufacturing outputs of custom products. Generating the high quality renderings and the outputs may include performing several visualization tasks and production tasks. The tasks may be performed by executing the software applications as a set of sequential and/or parallel processes. As it will be explained later, the applications are also referred to as authoring applications or authoring tools.

The authoring tools may receive, as input, an initial description of a product that is to be displayed by the platform and then made available for customization. From the initial description, the tools may generate layouts, or manufacturing files, that include a high level representation of how the product is to be made or embellished and what the customizable parts the product has. The layouts and manufacturing files are described later.

Manufacturing files may also include, for example, markups, and the files with markups may be sent to a manufacturer. A markup may be a two-color checkerboard pattern comprising a plurality of squares, where each square is of a single color and each adjacent square is of an opposite color. For example, a markup may be a two-color checkerboard pattern comprising solid-colored squares, where each square is of a single color and each adjacent square is of the opposite color. A markup portion of an input image may be partitioned into a set of regions, where each region of the set of regions represents a single corresponding square of the markup. In other embodiments, the markups may include different pattern(s), shape(s), or color(s). The markups have been disclosed in, for example, U.S. Pat. Nos. 9,852,533 B2 and 10,283,165 B2.

In response to sending the manufacturing files for a product to a manufacturer, the manufacturer may generate a physical product containing the markups and may send the physical product to the platform's operators.

Upon receiving the physical product with the markups, the platform's operators may take, using for example digital cameras, a set of high quality photographs depicting the physical product and the corresponding markups. The photographs are then provided as input to the authoring tools executing on the platform. For example, the photographs containing the markups may be provided as input for generating, for example, various views of the product, and depicting the product having different finishes, different patterns, different colors, different shadings, and the like.

In some implementations, the visualization platform uses various views (e.g., configurable images, layouts, and design views (described later)) to depict the product and to allow generating output, which then can be, for example, displayed on the website generated by the visualization platform and made available to customers for personalization, customization and potentially purchasing. Different views are described later.

Various depth maps and laser-based imagery may also be used. Examples of devices that capture information about a product's physical appearance or construction may include cameras, scanning devices (such as lasers scanners, iPhones (Time Of Flight imaging), Kinects (structured infrared light pattern), and the like. Depth maps (generated using, for example, Microsoft's Kinect hardware and laser scanners may be used as scanning devices in testing and asset production. In the context of this disclosure, they operate similarly to, for example, a camera. They may be configured to capture the product's physical attributes or surface characteristics. The depth maps and laser scans may then be used in an asset generation in the authoring tool.

If a customer finishes customizing a product and, for example, places an order for the product, then the data describing the customized product may be transmitted to, for example, a print server. The print server may use the data to generate a manufacturing output file. The output file may contain manufacturing instructions, which a manufacturer may use to manufacture the customized product as ordered by the customer. The manufacturing instructions are described later.

3.0. Example Service Implementation

"Dynamic InSitu RealViews" or "InSitu RealViews" refer to a service developed around a RealViews technology pipeline. Individual image assets available in the service are referred to as the singular "Dynamic InSitu RealView" or "InSitu RealView." The service allows groups internal to a company to customize imagery placed in various environments and use contexts on the collaboration website in the same way that products on the website can be customized. This allows a customer to see a custom product as it might be used or "In Situ".

In some implementations, the service allows a single InSitu image to be used and reused on multiple occasions and for multiple purposes on a single occasion depending on localization and the user language such as English, French, German, and Japanese languages.

Usually, traditional methods for creating InSitu image assets are not part of the authoring tools. The traditional methods are usually performed by, for example, graphic artists in a marketing department. In some implementations, the service includes receiving, for example, a composite image file that is created with layers that contain product images or photography and artwork taken from the website. They may be used to produce non-dynamic InSitu imagery.

A typical process for creating a RealView using the authoring tools is designed around ingesting new products (i.e., the product's manufacturing instructions have not been processed or verified by the authoring tools, the product's data and files have not been added to the product asset library, and configurable images for the product have not been generated) for the purpose of selling them using the website.

In Dynamic InSitu RealViews, the product captured in the images already exists in the product asset library. Therefore, the product has already gone through the authoring tool pipeline. This means that all related product data have been generated and added to the website, and there is an existing set of products that have been designed and offered to customers using the site. Product information and designs are linked to the Dynamic InSitu RealViews within the service, so that the product captured in the image has virtual representations of the products available to purchase on the website.

Dynamic InSitu RealViews include, for example, the images that are used as merchandising tools for popular, attractive, or thematic sets of products, that can be changed on demand. The InSitu RealViews can also contain and display multiple unrelated products in a single image, while traditional RealViews only contain one product.

3.1. Example Computer Environments

In some embodiments, an approach for authoring high quality rendering and generating manufacturing output of custom products is implemented in a product collaboration platform. The platform allows users, designers, customers, and support engineers, to, for example, design and create digital designs of products. An example computer environment for the process of creating digital designs, manufacturing products, and the like is described later in FIG. 1.

A digital design for a product may be captured in, for example, product description data for the product. A hyperlink to the particular location may be created and transmitted from the collaboration platform to a manufacturing server to cause the manufacturing server to generate a final product based on the digital design.

A product may be a digital product, such as a digital gift card, or may be a physical product, such as a physical t-shirt.

FIG. 1 is a block diagram showing an example environment for designing and manufacturing products. FIG. 1, the other drawing figures, and all of the description and claims in this disclosure are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In FIG. 1, users 10 are individuals who create and design digital designs of products; clients 12 correspond to software applications configured to facilitate communications between users 10 and front end servers 14; core services 16 correspond to software applications and tools configured to facilitate creating and designing of the digital designs and generating manufacturing instructions for manufacturing final products based on the digital designs; and manufacturing 18 corresponds to manufacturing servers and applications configured to manufacture, or cause manufacturing, the final products, and the like.

3.1.1. User Devices

FIG. 1 depicts several examples of users 10. Each of users 10 may use its own, or shared, computer device. Examples of user devices are described later in FIG. 2 (see devices 140A-G).

In some embodiments, examples of users 10 are determined based on the roles that may be assigned to the users. Examples 10A of roles may include a shopper, a client, a designer, a client peer, a customer support engineer, a recipient, and the like. Examples of user roles are described in detail in FIG. 8.

3.1.2. Client Applications

Clients 12 in FIG. 1 refer to client applications that are implemented in client servers 14 and that are configured to support requests received from users 10A. Non-limiting examples of clients 12 may include iOS applications 12A, Android applications 12B, Web applications 12C, and the like.

3.1.3. Front End Servers

Front end servers 14 refer to computer-based servers that are configured to process requests received from clients 12 and in many cases interact with core services 16 to further resolve these requests. Examples of front end servers 14 include one or more WWW servers 14A, one or more application servers 14B, one or more cryptographic servers 14C. Cryptographic servers 14C may be configured to provide cryptographic services for encrypting/decrypting, transmitting, or otherwise communicating data between the entities depicted in FIG. 1.

3.1.4. Core Services

Core services 16 in FIG. 1 refer to servers and services implemented in a role-based collaboration platform configured to provide functionalities for creating and designing digital designs, handle collaboration requests, and facilitate the customization requests received from users 10. The role-based collaboration platform is described in detail in FIG. 2.

In some embodiments, a customization process performed by a user, of users 10, and intended to generate a digital design of a customized product is captured in so-called product description data, which then may be translated into a manufacturing description comprising product and manufacturing instructions.

The product and manufacturing instructions may include digital design specifications, data, and code needed to manufacture a custom product. That may include instructions for generating, for example, a 3D geometry for digital final products. This may also include generating instructions for generating 2D and/or 3D patterns that may be used to cut, cast, or form physical components of physical final products. The patterns may be parametric, i.e., they may have parameters that, through encoded relationships, adjust the form of the pattern for a specific need.

For instance, a set of 2D patterns for a t-shirt graded based on size, may become a parametric pattern by interpolating grade curvatures. A single parametric value may set this automatic grading. The single parametric value is usually called a 'size.'

The product instructions may also include models, including 2D and 3D models that are used to form, through additive manufacturing, or subtractive manufacturing, portions of a product. The models may be parametric, i.e., they may have parameters that, through coded relationships, adjust the form of the model for a specific need. For instance, a set of 3D models may represent a bike helmet. Each model may fit a statistically normed human head of a specific age. A coded relationship between the models may allow for interpolation of the set of models for a specific age. A single parametric value may set the automatic interpolation. The single parametric value in this case is usually called an 'age.'

The product instructions may also include material properties such as a physical material used to form a product from a pattern. Some material properties may be parametric, i.e., they may be selected or changed during the manufacturing time.

The properties may also include a body color. For instance, the color of a fabric may be selected for manufacturing a t-shirt. According to another example, the color of a plastic may be selected for manufacturing a bike helmet.

The properties may also include a body texture such as the fabric weave of a t-shirt may be specified to be smooth or slubby. For instance, the surface of a plastic bike helmet may be polished or satin. Each property is necessarily specific to each class of materials. Examples of materials and properties may include a fabric (such as a weave or knit type, a fiber type (cotton, wool, flax, polyester, polypropylene), a thread size, a thread count, a color, an integral design (ikat, knit, tapestry), a bolt width, a selvage type, a surface (hand), and the like.

The properties may also include plastics, which may include sub-properties such as a color, a surface quality (a bidirectional luminance function), a melting point, impact resistance, a forming method (thermoplastic, cast), a type (acrylic, polypropylene, etc.), and the like.

The properties may also include metals, which may include sub-properties such as a type (aluminum, steel, copper, brass, etc.), a color, a surface quality (e.g., a bidirectional luminance function), a melting point, a tensile strength, a shear strength, a toxicity, and the like.

The properties may also include non-woven specified by a type (paper, felt, Tyvek, etc.), a color, a surface quality (e.g., a bidirectional luminance function), a surface type (hot pressed, natural, textured, etc.), a weight per square meter, an acid content, a compatible media, coating, and the like.

The properties may also include metamaterials which may be described as a combination of multiple materials created during a manufacturing process. For instance, during a fused deposition manufacture, plastics with a variety of properties may be mixed to provide a physical product with gradations of flexibility, durometer, and the like. According to another example, during laser sintering of metals, a mix of metal alloys with a variety of properties may be deposited, resulting in a product composed of gradations of metallic properties. According to yet another example, during high resolution uv-printing, layers of the uv-cured material with different refractive indices may be deposited, resulting in a large variety of optical effects.

The properties may also include embellishment such as a trim-color, designs, and applied ornaments. The trim colors may indicate the color of the edging around the sleeve of a t-shirt, the color of the trim around the base of a bike helmet, and the like.

The designs may indicate a custom printed front of a t-shirt, a custom thermal printed design to the side of a bike helmet, and the like.

The applied ornaments may indicate rhinestones on a t-shirt, holographic spangles on a bike helmet, and the like.

Some properties may apply to a large class of products and may allow for a limited set of properties to be transferred from one product to another. Other properties may be specific to a particular product or manufacturing method.

It may be appreciated that much of the novel art of the system and method is in enumerating the constraints imposed by manufacturing a specific custom product and crafting these constraints as a set of product option key-value pairs. These manufacturing constraints are propagated through the entire system and method, and by using these product option key-values, allowing for the manufacturing of a series of custom products that meet these physical constraints.

Referring again to FIG. 1, in some embodiments, core services 16 refer to services implemented in a role-based collaboration platform. In the depicted example, core services 16 may be provided by one or more real-view (RLV) servers 16A and a product option framework 16AA. Both RLV servers 16A and product option framework 16AA may use one or more data tier databases 16B, including RLV Data 16C, a product options database 16D, a transaction database 16E, and the like.

In some embodiments, core services 16 may also utilize internal tools 16F, such as a "Phlow" computational photographical tools 16E, a customer support tools 16G, a launch pads tools 16H, and the like.

Product option framework 16AA is also referred to as a persistent design data framework. The framework data may include a product options set, which may include a set of product options pertaining to a specific product type. It usually contains the product instructions (e.g., collaboration components 106 in FIG. 2) for manufacturing, or producing, the product.

In some embodiments, product option framework 16AA is configured to provide services for transforming ProductOption key-value pairs (i.e., manufacturing constraints) from one product to the other. Transforming the ProductOption key-value pairs from one product to another may require, for example, transforming the color space (i.e., sRGB to CMYK US Web Coated (SWOP) v2), transforming an image from raster to vector, and/or resizing the image for the fit.

An example use case of the product option framework is described in detail in FIG. 2.

In some embodiments, there are two basic types of product instructions (1) fixed (that include the instructions for the product which are fixed and not customized), and (2) custom (that contain the logic to transform a user interface parameter into a product instruction).

In some embodiments, the product option set contains the logic to enumerate each customizable option in a manner that presents a complete user interface to change the parametric product instructions.

The instructions for manufacturing a customized product are usually parametric. The parameters include the size of the customized product (this can be multi-dimensional, and include width, height, depth). The parameters may also relate to human sizes or age. The parameters may also be custom and based on biometric information.

The parameters may also include a component body color, a component body texture, a trim body color, a trim body texture, a design area, and the like.

In some embodiments, a product option may be represented as a key-value pair. The key-value pair is a label that may span individual products and represent a class of products. The keys of pairs may include a material type, a color, a size, and the like.

The value in a key-value pair is a specific discrete or continuous value that sets a manufacturing instruction. Examples of discrete (enumerated) values may include a discrete type of fabric such as cotton, cotton-polyester blend, silk, and the like. The discrete values may also include specific colors, such as white, navy, black, and the like.

Examples of continuous values of key-value pairs may include a single element, such a length or a ribbon, a vector, such as a size of a frame for a print (width (in inches)) or a height (in inches)), or the size of a box for the European countries, such as a size of a box for the EU (width (in millimeters), height (in millimeters), depth (in millimeters)).

The values may also reference a known file type, such as an image for the design on a t-shirt, such as an embroidery file for the back of a jacket, such as an engraving design for a bracelet, and the like.

In some embodiments, values in key-value pairs may include a set of graphic primitives for a design, such as an image, a line, a circle, a rectangle, a text, a group, and the like.

The product option key-values may have default values. Default values are pre-set values that will produce a product without changing any key-value pairs through customization. When key-values are changed they may produce a product option framework event chain. A product option framework event chain is a journal of each key-value change ordered in time.

A product type may itself be represented by a product option key-value. Using this option type, one product type may be associated with another product type through a well-known relationship.

In some embodiments, a product option framework event chain includes one or more products, and the chain may represent or memorialize an event. The products may represent or memorialize an event. Examples of events may include weddings, birthdays, anniversaries, graduations, national holidays, reunions, and the like.

Many products fit into an event chain. For example, the products that fit into a wedding event may include the following products: save the date products, invitations, RSVPs, bachelor party invite products, bachelorette party invite products, party favors products, gift registry cards, place cards, napkins, wedding programs, wedding gifts, thank-you cards, wedding keepsake photos, and the like.

Examples of products that may fit into a birthday event may include the following products: invitations, RSVPs, party bags, party keepsake photos, and the like.

In some embodiments, in a product option set event chain, a key-value pair encodes the next product in the chain. For example, an invitation may be chained to an RSVP card. A key-value may also encode the role for the chained event. For example, a chained RSVP card key-value may further include a recipient of the invitation as the sender role for the RSVP card.

A key-value pair may also encode the shared properties used to set the chained product's properties. For instance, a design for the invitation may be shared with the RSVP card. A key-value may also encode the timing for the chained product. Typically, the event chain properties are custom (parametric), and they may be changed by a product designer to fit a specific product set.

In an embodiment, a product option framework is configured to generate a product option framework user interface. Accordingly, each product option set is associated with logic and code to build a user interface element for each parametric product option. Furthermore, each product options set contains style hints so that each user interface element may be artfully placed to produce a high quality user experience.

Typically, user interface elements are designed to match each class of values found in all products covered by a product option framework. New user interface elements may be added as the product categories expand. The user interface elements may include a design view, a color editor, a font editor, a size selector, a texture selector, a text editor, a fabric swatch selector, a product configurable image, and the like.

In some embodiments, a product options framework cooperates with a user product renderer that may be implemented in, for example, a RealView server 16A. The user product renderer may be configured to render views of a custom product as though it is already manufactured. Typically, it uses a product option set of key-values as input. It creates one or more run-time assets using computational photography of the manufactured product.

3.2. Example Manufacturing System

Referring again to FIG. 1, manufacturing instructions may be communicated from core services 16 to manufacturing 18, which may include one or more manufacturing servers 16AAA. Servers 16AAA may receive the manufacturing instructions, process the instructions, and communicate with a vendor manufacturing application 18A to generate, for example, manufacturing data, operator directions, tool/machine codes, and the like. The application may also generate information about an order state, a packing slip, a production sheet, and the like. Some of that information may be communicated to a carrier (shipping) service selected to deliver the final products to the recipients.

A final product may be manufactured using markups. A markup for, for example, a body color of a product may be made by specifying a distinct and separate color for Body-Color key-value. A markup for the trim color of a product may be made by specifying a distinct and separate color for, for example, a TrimColor key-value pair. A markup for a design area of a product may be made by specifying a specific marker type (e.g., a removable linear markup, a digital markup, or a digital field markup) for a design-area image.

Construction of a so-called Product RealView geometry may be performed using computational photographic techniques. For example, a BodyColor area of a surface may be recognized and layered as a custom computer graphics shader for rendering light, color, and texture. Each TrimColor area's surface may be recognized and layered as a custom computer graphics shader for rendering light, color, and texture. Rendering of the Product RealView may be performed by setting its product option key-values and shading each of its constructed layers.

3.2.1. Example Manufacturing Process

As described above, a manufacturing process may pertain to manufacturing a digital product as well as manufacturing a physical product. Since the manufacturing instructions for generating a product are generated based on a plurality of key-value pairs for a digital design of the product, in some situations, the same manufacturing instructions may be used to manufacture the digital product as well as to manufacture the physical product.

In some embodiments, a product options framework (described in detail in FIG. 2) builds an interface for a key called OutputStyle. The interface for the OutputStyle key may allow a designer (or any other collaborator) to select values for the media for the presentation of an interactive design. The choices may include a JPEG Image, a GIF Image, and an H264_Video.

If a designer chooses the GIF Image option, then the product options framework may send the instructions to the manufacturing system to traverse each of the key-values in the KeyValueJournal, and for each key, and use a User Product Renderer to render the state of the custom physical product with that modification as images in the sRGB 32-bit RGBA format. Subsequently, the manufacturing system may store the renderings in a local image cache.

Then, the manufacturing system may traverse the images stored in the local image cache and determine an optimal color palette for that collection of images.

Subsequently, the manufacturing system may convert the images in the local image cache from 32-bit RGBA format to 8 bit Indexed color.

Then, the manufacturing system may embed a digital watermark which encodes the input KeyValueJournal's UUID in the 8 bit indexed color image cache.

Next, the manufacturing system may begin encoding the image file. For example, the manufacturing system may write the header bytes; write the Logical Screen Descriptor bytes; write the found color palette as a gif Global Color Table; write the gif 8 bit character application name; and embed metadata as a comment (or a watermark) which encodes the input KeyValueJournal's UUID.

Next, the manufacturing system sets a FrameCount to 1 and proceeds to processing each frame in the image file. The processing includes checking if there is an image in the 8 bit indexed color image cache; and if so, then the manufacturing system continues; otherwise, the manufacturing system proceeds to taking the next image.

To continue, the manufacturing system writes the gif Graphic Control Description for the FrameCount, and then processes the first 8 bit indexed color image cache into blocks of 255 LZW compressed bytes.

Next, the manufacturing system writes the compressed bytes, and removes the first image from the 8 bit indexed color image cache. Then, the manufacturing system increments the FrameCount and repeats the process for the next frame.

Once the manufacturing system processes all frames, the manufacturing system writes the file terminator (such as an ASCII code for zero) to the image file and outputs the manufactured GIF product.

At this point, executing the manufacturing instructions for the purpose of manufacturing the product ends, and the manufacturing of the product is completed.

3.2.2. Example Product Collaboration Platform

In some embodiments, the approach presented herein is implemented in one or more computer systems that host a product collaboration platform. Alternatively, the approach may be implemented in one or more computer systems that communicate with the collaboration platform but that do not actually host the platform itself. For the clarity of the description, it is assumed that the computer environment supporting the approach presented herein is implemented in the product collaboration platform.

Figure 2A:
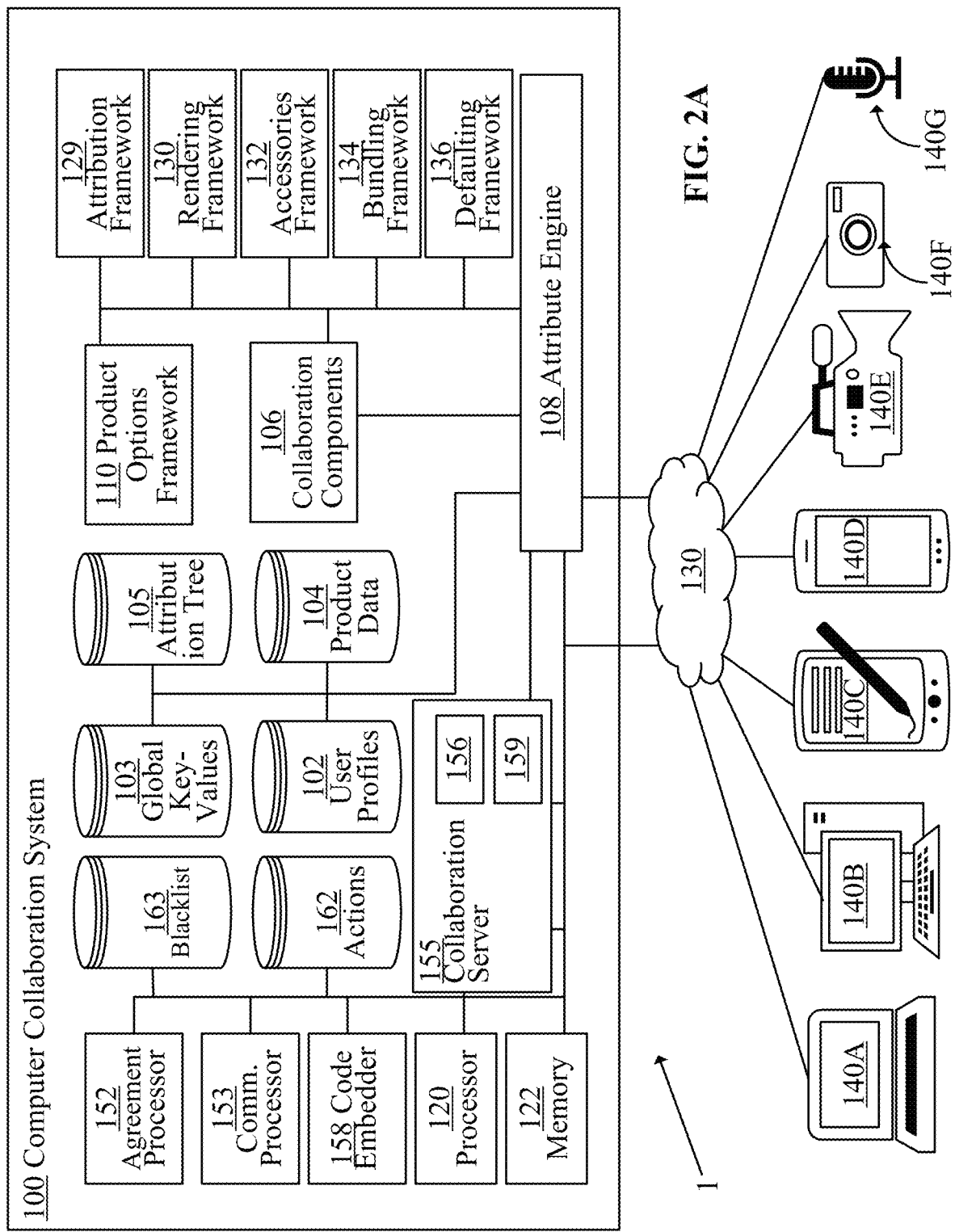
FIG. 2A is a block diagram showing an example of a role-based collaboration platform.

FIG. 2A is a block diagram showing an example of a role-based collaboration platform. In the example depicted in FIG. 2A, a computer collaboration system 100 includes a user profiles database 102, a global-key-values database 103, a product data definitions database 104, an attribution trees database 105, collaboration components 106, a product options framework 110, an attribute engine 108, one or more processors 120, one or more memory units 122, and one or more frameworks 129-136.

Furthermore, computer collaboration system 100 includes a collaboration server 155 (including a monitoring system 156, and a request analyzer 159), one or more blacklist databases 163, one or more actions databases 162, an agreement processor 152, a communications processor 153, and a code embedder 158. Computer collaboration system 100 may communicate directly, or via one or more communications networks 130, with one or more user computers 140A-140G, all described in detail later.

Computer collaboration system 100 shown in FIG. 2A is provided herein to illustrate clear examples and should not be considered as limiting in any way. Other computer collaboration systems may include additional components such as computer servers, various input/output devices, and additional software and/or hardware components that are not depicted in FIG. 2A. Other computer collaboration systems may be implemented in cloud-based systems, distributed computer networks, and the like. Other computer collaboration systems may include fewer components than example computer collaboration system 100 shown in FIG. 2. Computer collaboration system 100 is described in detail later.

3.3. Structural Description of Authoring Tools

In some embodiments, authoring tools are structurally configured as shown in FIGS. 2A1, 2A2 and 2A3. It should be noted that, in some situations, geometric, volumetric, or other appearance data may be used as input to, for example, run the process of generating a configurable image using data inputs instead of photography (as shown as 2A100 in FIG. 2A3).

FIG. 2A1 is a block diagram that illustrates an example structure of an example implementation of authoring tools. Components depicted in FIG. 2A1 include a Viz Product Photograph 2A100, a layout input 2A102, one or more scripts documents 2A110, a configuration document 2A111, authoring tools 2A120, layout assets 2A130, key-value pairs 2A132, RealView assets 2A134, user designs 2A136, web/http site 2A140, RealView renderings 2A146, markups, samples and/or tests 2A150, customer orders 2A152, print files 2A154, manufacturing data 2A156, a maker/manufacturing/production 2A158, and a physical product 2A159. The above components are described later. The components may also include additional elements, some of which are described later.

Authoring tools 2A120 may be configured in many different ways. In some implementations, authoring tools 2A120 include a user interface characterized by user interface graph view properties 2A122, a plurality of BlockZ components, a flow filters library 2A128, a Zig Library 2A128, and the like. The components of authoring tools 2A130 are described in detail later.

In some implementations, Zig Library 2A128 is shared between authoring tools 2A120 and web/http site 2A140. Web/http site 2A140 may also include a print server 2A142, a RealView.net 2A144, and the like. The components of web/http site 2A140 are described in detail later.

FIG. 2A2 is a block diagram that illustrates an example structure of an example implementation of authoring tools. The depicted diagram comprises a maker physical specification 2A210, a layout input 2A212, a maker print test/markup 2A216, and other components described later.

Maker physical specification 2A210 may be a PDF document, 2D/3D CAD document, or other type of document. It is used to provide the specification to authoring tools 2A214 and to allow authoring tools 2A214 to initiate a processing flow.

Layout input 2A212 may be obtained based on maker physical specification 2A210 and may be provided to authoring tools 2A214 as input.

Authoring tools 2A214 may use layout input 2A212 to generate, for example, maker print test/markup PDF file(s) 2A216. The print test/markup PDF files may be provided to a maker or a manufacturer, such as a maker/manufacturing/production entity 2A218.

Based on the received print test/markup PDF files, maker 2A218 may generate a physical product sample 2A220.

Physical product sample 2A220 may include, for example, markups imprinted on the physical product sample. The markups are described in detail later.

In step 2A222, the physical samples, generated based on the maker print test/markup files, may be evaluated to determine whether the physical samples appear to correspond to what they should look like. The determination may be primarily performed manually and based on the information that the team performing the evaluation has available.

The evaluation may include, for example, checking the sample to make sure that the sample actually was printed correctly and matches what the evaluators thought should be printed.

If there is some discrepancy between the appearance of the sample and, for example, the maker print test/markup information, then one of the solution is to edit (step 2A224) or otherwise modify the maker print test/markup file(s) to make sure that if the modified print file is provided to the manufacturer, the manufacturer would produce a sample that corresponds to the asset better and more precisely.

If/once the print test/markup file is modified, the modified file is rerun through the process, i.e., provided to a manufacturer, have the manufacturer manufacture the samples based on the print file, and then evaluate the samples to determine whether the samples correspond to the assets.

Some of the samples may include, for example, field markups, various grids, and other details. All these markups, grids and other details are considered to determine whether the samples correspond to the assets. If they do not, then the print file may be modified again and again, the modified file may be sent to the manufacturer who manufactures the new samples, and the new samples are compared to determine that the new samples correspond to the respective assets.

If it is determined that the samples are acceptable (step 2A222), then the samples may be used to generate a visualization (Viz) using product photography (step 2A230). In this step, the samples are photographed, and then processed by authoring tools 2A120 in step 2A230 to generate various views of the corresponding assets. Various photography techniques may be implemented in this process. An example of the photograph includes computational photography, described later.

The photographs may be saved in files expressed in many formats, including TIFF, PSD, PNG, and the like.

Alternatively, or in addition to, if it is determined that the samples are acceptable (step 2A222), a corresponding layout is approved in step 2A226 based also on the layout assets provided in step 2A228. The layout assets may be represented as '.zig" files, as described later.

In step 2A234, the photographs are used to generate RealView assets. The RealView assets may be saved in the files in .zig format or the like.

In step 2A236, a test is performed to determine whether the RealView assets match the samples generated by the manufacturer. The test may be performed either visually or automatically. Various ways of performing the test are described later.

If the RealView assets do not match the corresponding samples, then the processing performed by the authoring tools in step 2A232 is repeated until the RealView assets do match the corresponding samples.

If the RealView assets do match the corresponding samples, then, in step 2A238, one or more final RealViews of the assets are generated, and subsequently used and, for example, displayed in a GUI, as described later.

Rerunning the authoring tools until the RealView assets (generated in step 2A232) match the corresponding samples (in step 2A236), may include adjusting, otherwise modifying, some parameters and/or filter blocks, as described later, until the output generated by the modified parameters and filters and presented as the RealView assets match the corresponding samples.

Once the final RealView assets are generated, a set of layouts (approved in step 2A226) may be used to produce, for example, the manufacturers specification for the corresponding assets.

In some implementations, some of the photographs generated herein or RealView asset depictions may be edited using, for example, image editing tools such as Photoshop™, and the like.

The layouts, the photograph and the process described herein is designed to produce the output that meets the requirements for, for example, an accurate representation of the corresponding assets. Within the process, the photographs may be, for example, retouched or otherwise modified, using various tools and techniques, which should not be viewed as limited to Photoshop™. The intermediate files may include files stored in a PDF format, text format, and/or other.

In some implementations, the photographs may be used to generate animated depictions of the assets. Using the animation may allow viewing the asset from various angles and generating various snapshots of the assets.

FIG. 2A3 is a block diagram that illustrates an example structure of an example implementation of authoring tools. As depicted in FIG. 2A3, Viz product photography 2A100, which may include TIFF files, PSD files, PNG files, and the like, may be used by scripts 2A110 and configuration programs 2A111. Scripts 2A110 may include xml files, or the like. Configuration programs 2A111 may be text files containing executable instructions, or the like.

Scripts 2A110 and configuration programs 2A111 along with the Viz product photography 2A100 and color curves 2A322 may be used by authoring tools 2A120.

In some implementations, configuration programs 2A111 contain a text-based list of key-value pairs that configure the scripts to match the product before any specific editing is done to adjust the RealView or the layouts. The data in these key-value pairs can, for example, originate in the product configuration database, manufacturers' specifications, or they can be specified by an author. The data in these key-value pairs frequently contains information that identifies and describes a particular RealView or layout, for example, matching input files (such as image files or PDF files) to the particular asset or matches the asset to known database entries.

Color curves 2A322, or color gradients, are defined as a gradual blending from one color to another. The blending may occur between colors of the same tone (for example, from light blue to navy blue), colors of two different tones (for example, from blue to yellow), or even between more than two colors (for example, from blue to purple to red to orange).

Color gradients may be used to add depth to an image. Combining a gradient with varying levels of opacity can help, for example, to create a sense of proximity and distance to the image. The color gradients may be also used to subtly guide their users' eyes and attention toward a specific area of a product.

Color gradients usually have a central starting point where the color starts. Then, from that point, the initial color progressively blends into other colors. Thus, may create, for example, a certain pattern. The pattern, size, shape, area, and color choices all affect how the color gradient looks.

The most typical color gradients include linear gradients, radial gradients, conic gradient, diamond gradient, and reflected gradients. A linear gradient creates a band of colors originating from a straight line. That gradient transitions smoothly from one color to the next. A radial gradient radiates out from a central point. A conic gradient is similar to a radial gradient in that they are both circular and use a center point for the color's beginning; but the conic gradient radiates in a conical form. A diamond gradient forms a diamond shape from a central starting point, and the endpoints are in the corners of the diamond; therefore, it is best used in quadrilateral (square or rectangle) shapes. A reflected gradient is like a linear gradient mixed with a mirror, i.e., the color is mirrored from a centerline in each direction as opposed to a linear gradient that only shades in one direction. Color curves may be png images of gradients. An example of gradients may be found here: https://www.w3.org/TR/SVG11/pservers.html #:~:text=SVG %20provides %20for %20two %2 0types,stroked %20with %20the %20referenced %20gradient.

Gradients may be used to encode the effects of light sources interacting with a materials' surface properties. Materials, such as plastic, fabric, metal, or paper, reflect light based on their color, surface texture, and sub-surface characteristics. Light source properties can include direction, color, and intensity. The system may use gradients that encode this information to simulate depth and 3D appearance in a rendered 2D scene, for example, when interacting with a depth and directional image map within the scene. The effect can be to create customized scenes of products that appear realistic.

As shown in FIG. 2A3, authoring tools 2A120 may be used to generate, for example, a RealView file 2A330. RealView file 2A330 may be, for example, a .zig file, and may be stored in a disk storage unit and/or cache.

Authoring tools 2A120 may process RealView file 2A330 from a Zig layer root 2A332 and then processes one or more embedded resources 2A334, key-value pairs and references 2A336, geometry files 2A338 of a digital asset, and the like.

In some implementations, resources 2A334 include, for example, background images (such as PNG images, Progressive Graphics File (PGF) images, and the like), object images (such as PNG object images, Open Document Format (ODF) object files, and the like), area masks (such as PNG mask files, PGF mask files, and the like), color curves (PNG ramp files, and the like), light maps (such as PNG map files, and the like), texture maps (such as PNG texture maps, and the like), luminance maps (such as PNG luminance maps and the like), and others.

In some implementations, geometry files 2A338 include, for example, geometry of polygons (including texture mapped geometry), text, lines, paths, 3D shapes, inline RealView used for adding/storing elements or other .zig files on disk or in cache, and the like.

In some implementations, key/value/reference 2A336 includes a library of references 2A336A, which may use key-value pairs 2A336B stored in a database and corresponding to key-value pairs 2A132 shown in FIG. 2A1.

In some implementations, the set of references 2A336A maps the embedded resources to the geometry, for example, providing an image to a texture mapped polygon. It also provides a mechanism for key value pairs provided by databases, user interface, and other sources to override the embedded resources with external data, such as images, text, geometry, and other data.

Other structures for implementing authoring tools 2A120 may also be utilized.

Figure 3A:
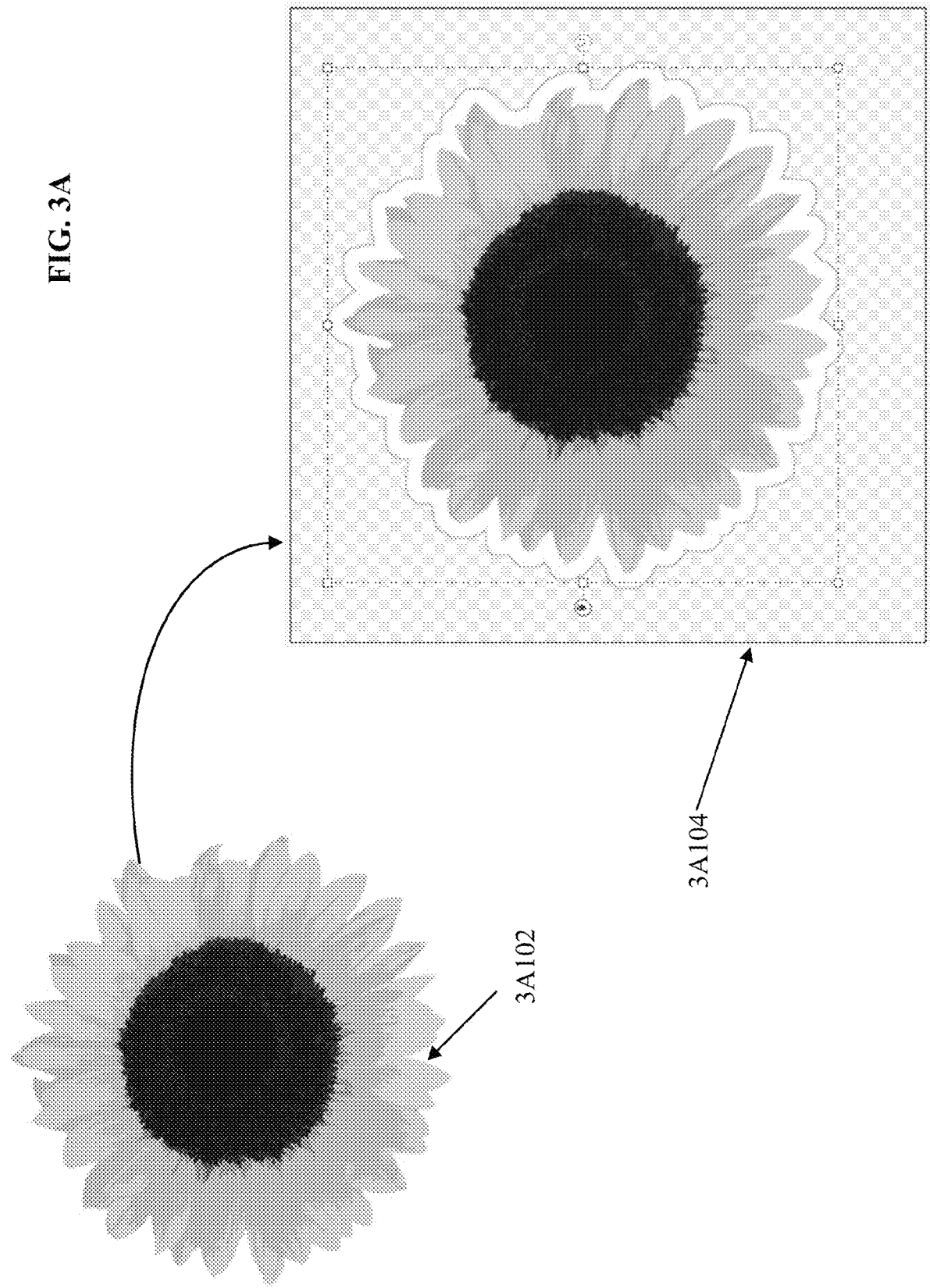
FIG. 3A depicts an example model and an example of a design view of an asset.
Figure 3B:
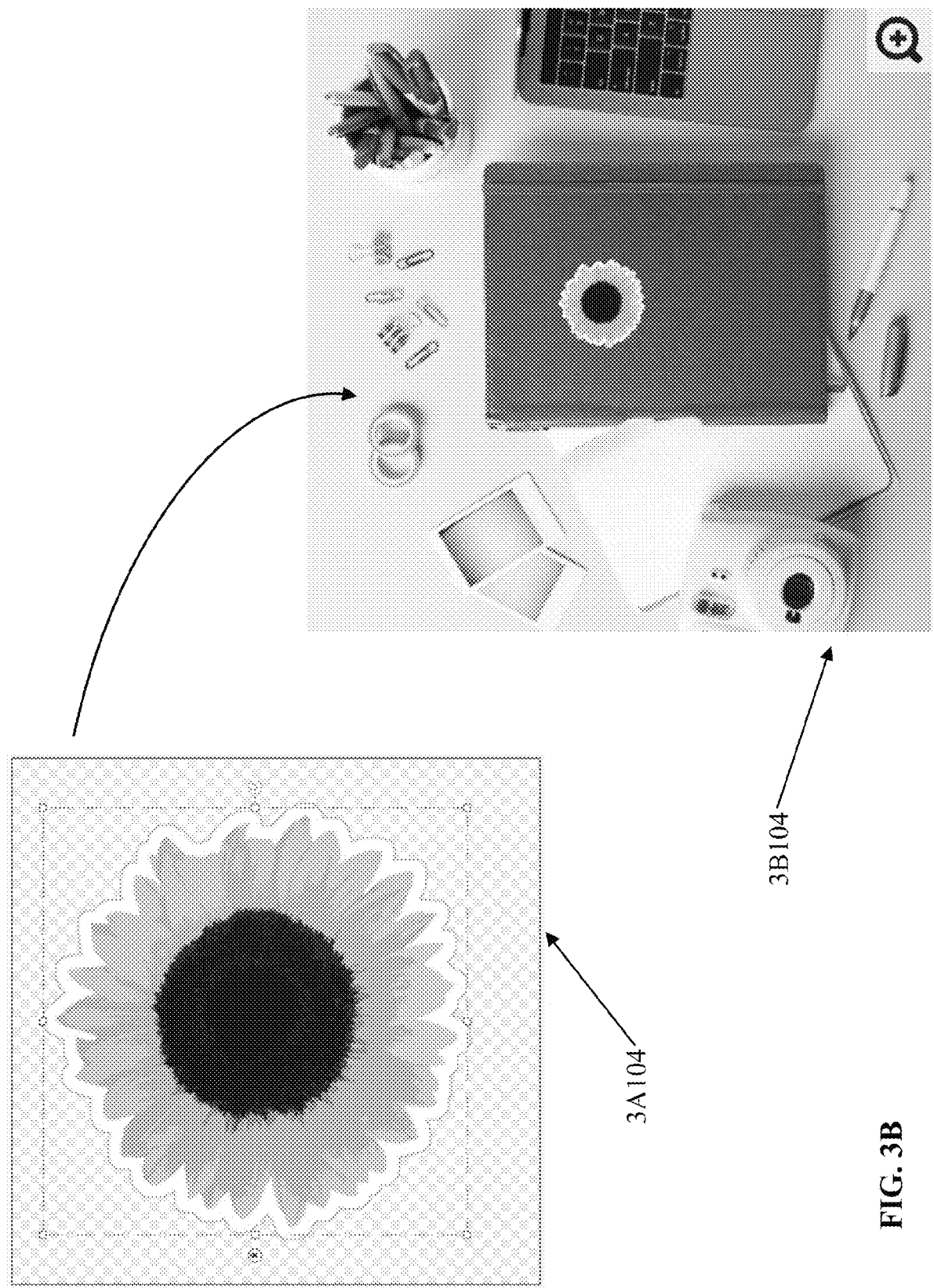
FIG. 3B depicts an example of a design view of an asset and an example of a configurable image of the asset.
Figure 3C:
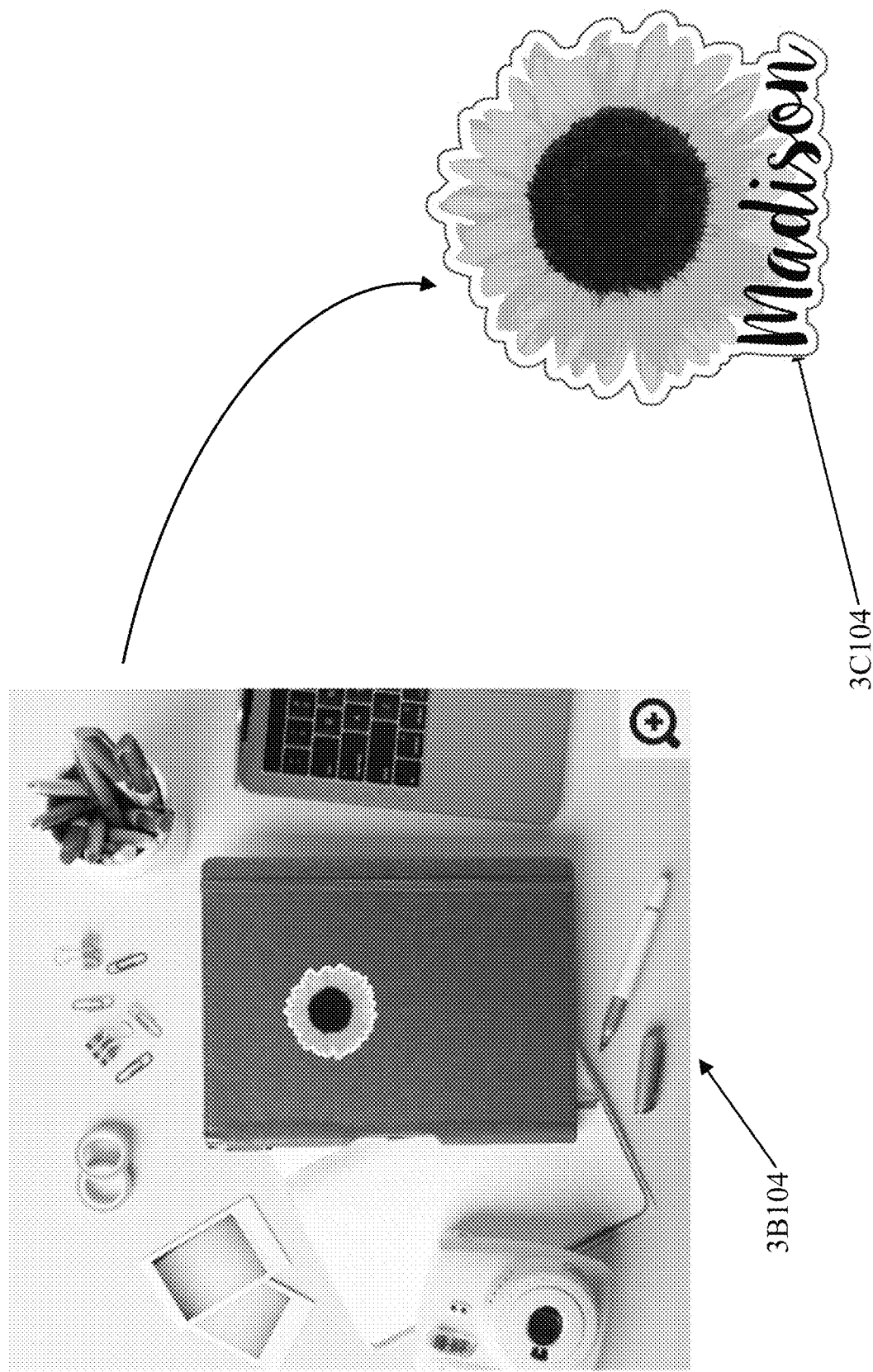
FIG. 3C depicts an example of a configurable image of the asset and an example of a print view of the asset.
Figure 3D:
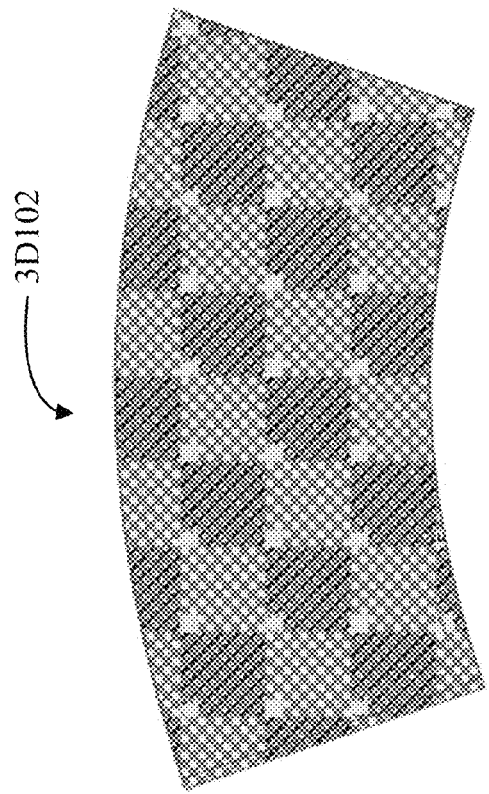
FIG. 3D depicts various views of an asset.
Figure 3D:
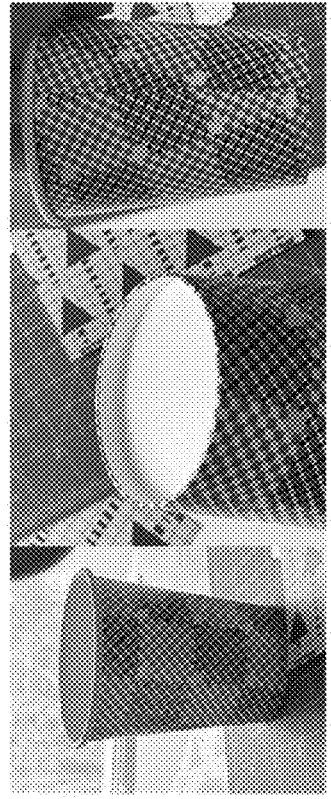
Figure 3D:
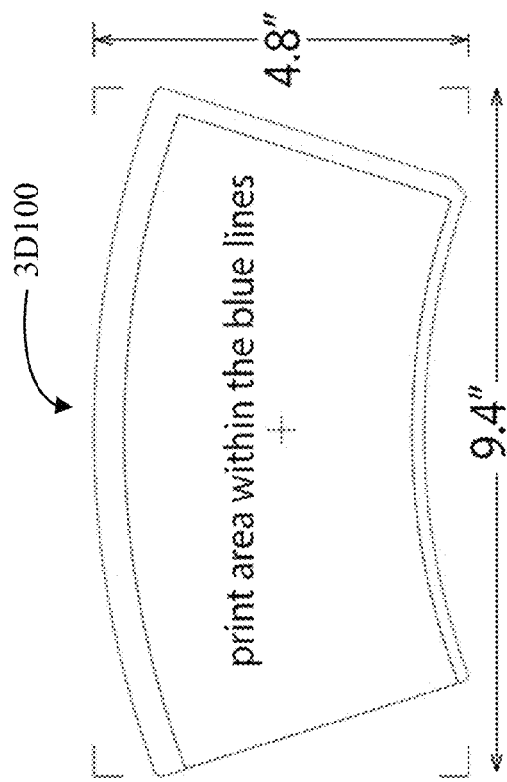
Figure 3D:
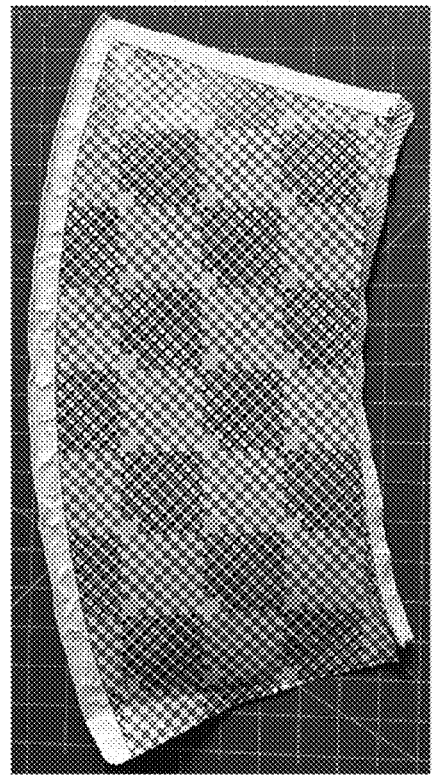
Figure 3E:
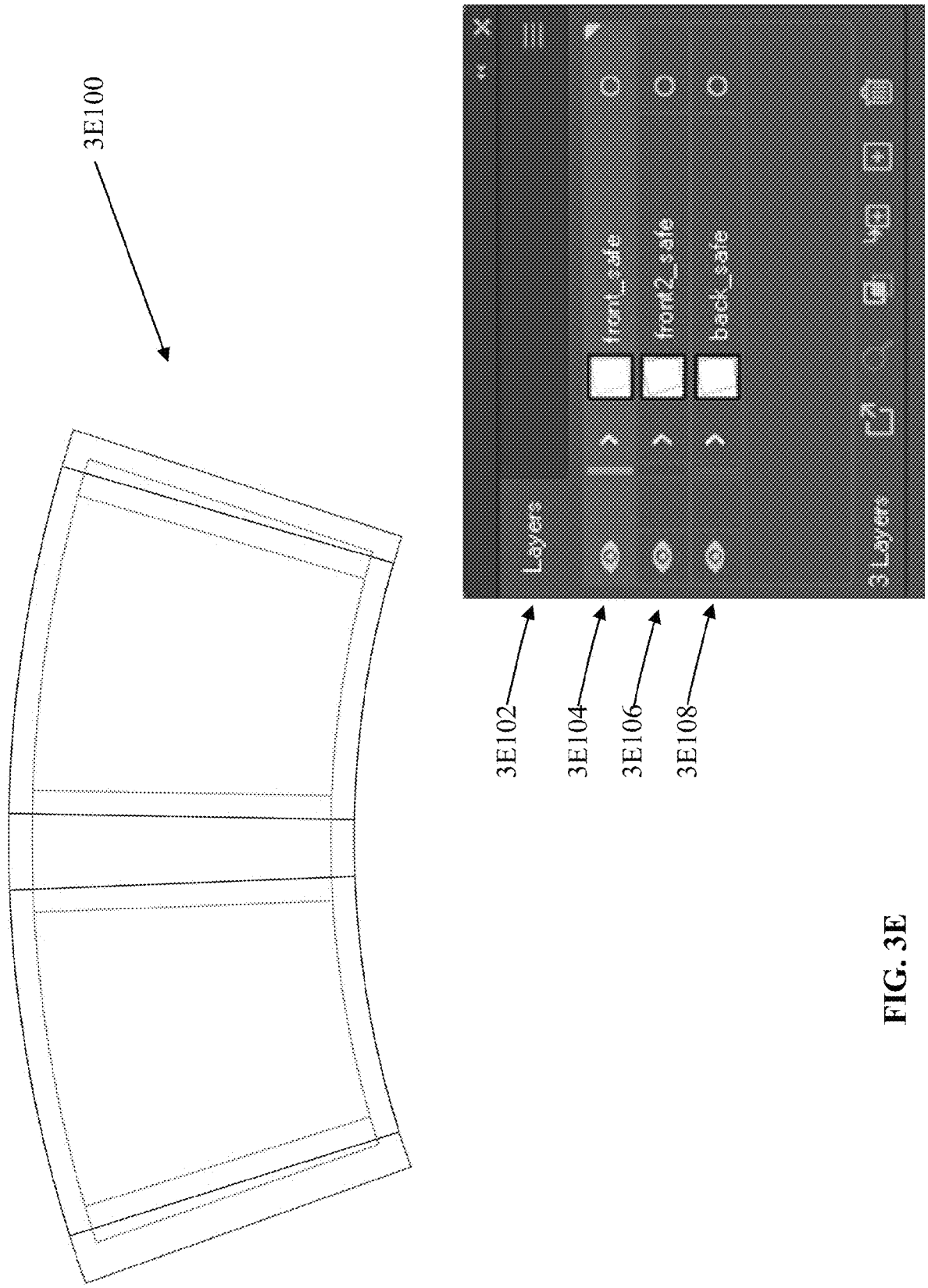
FIG. 3E depicts an example layout of an asset and an example of corresponding layers for the asset.
Figure 3F:
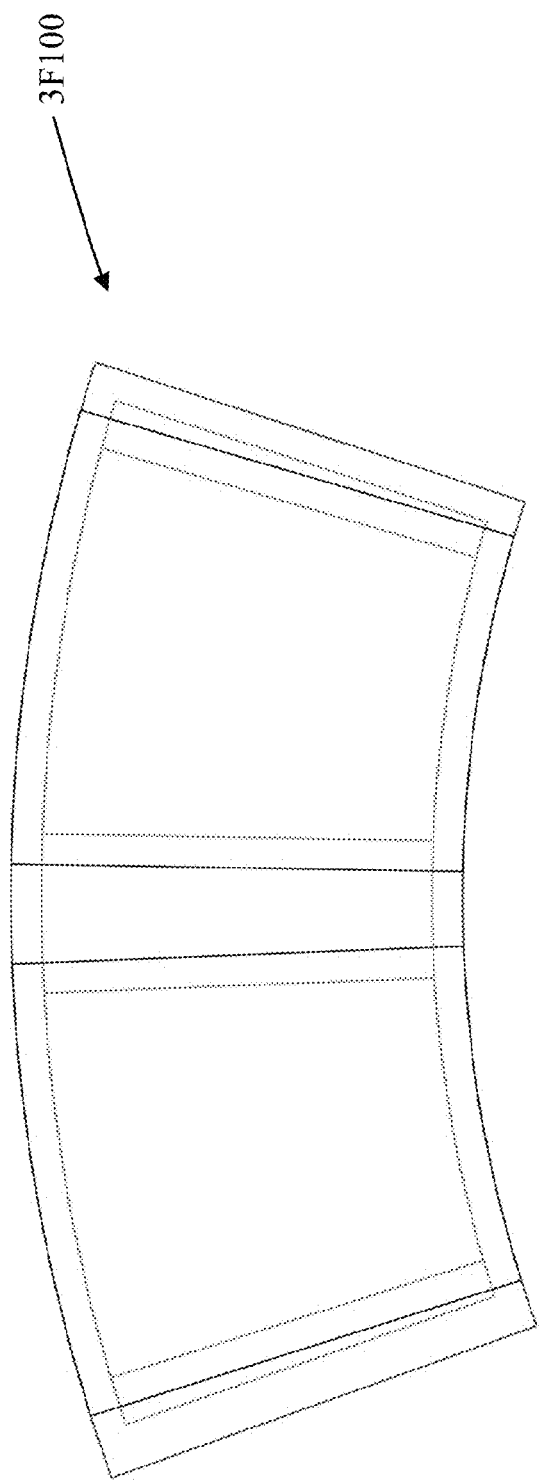
FIG. 3F depicts an example layout of an asset and an example of corresponding layers for the asset.
Figure 3F:
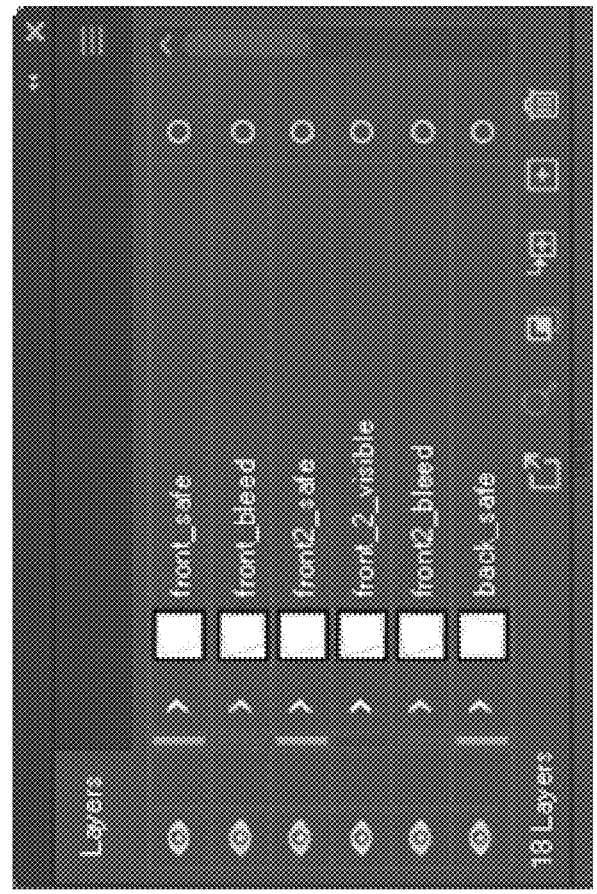
Figure 3G:
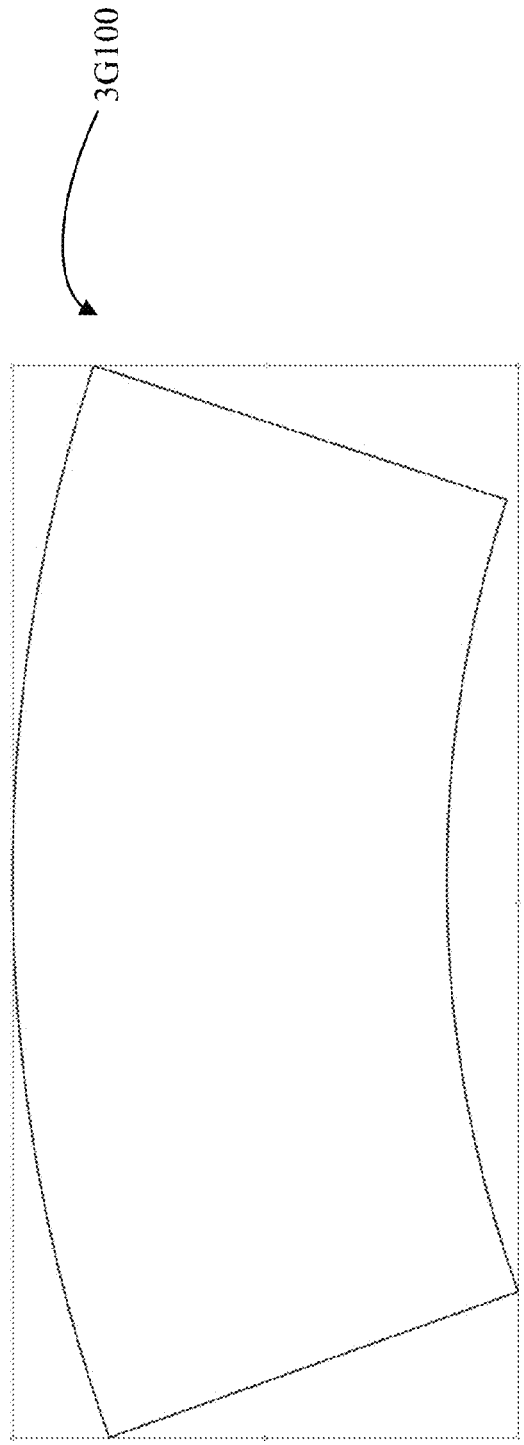
FIG. 3G depicts an example layout of an asset and an example of corresponding layers for the asset.
Figure 3G:
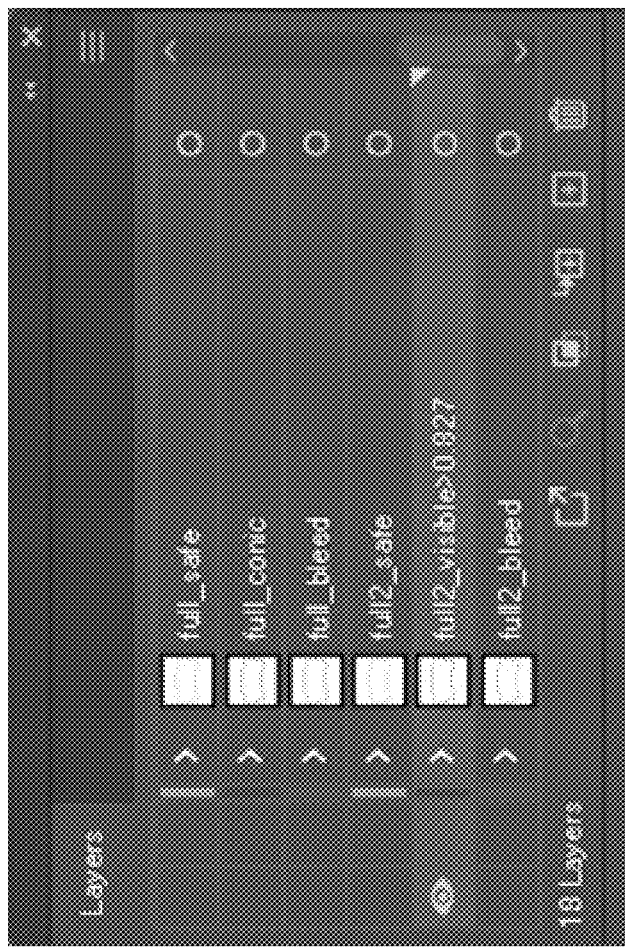
Figure 3H:
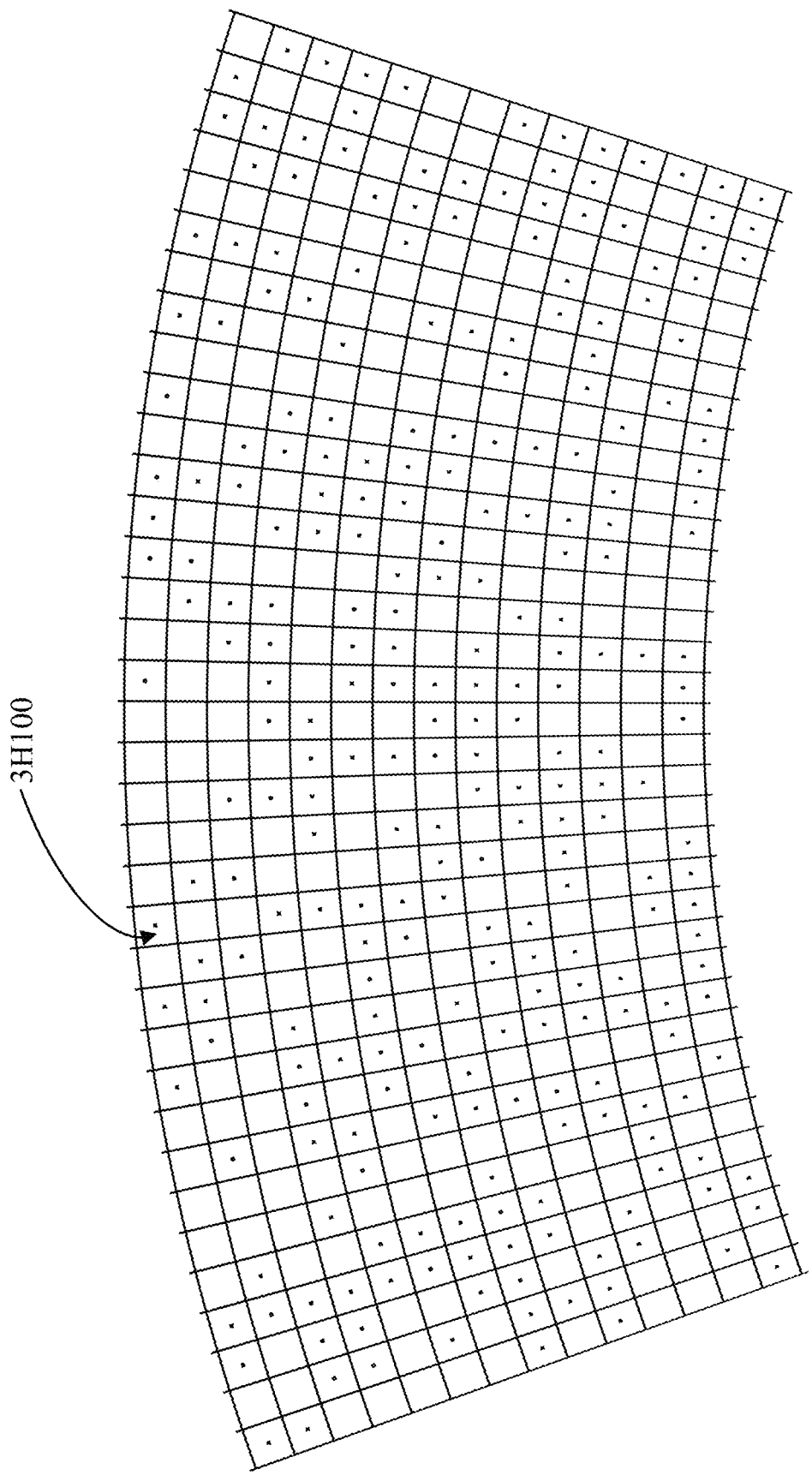
FIG. 3H depicts an example field markup.
Figure 3I:
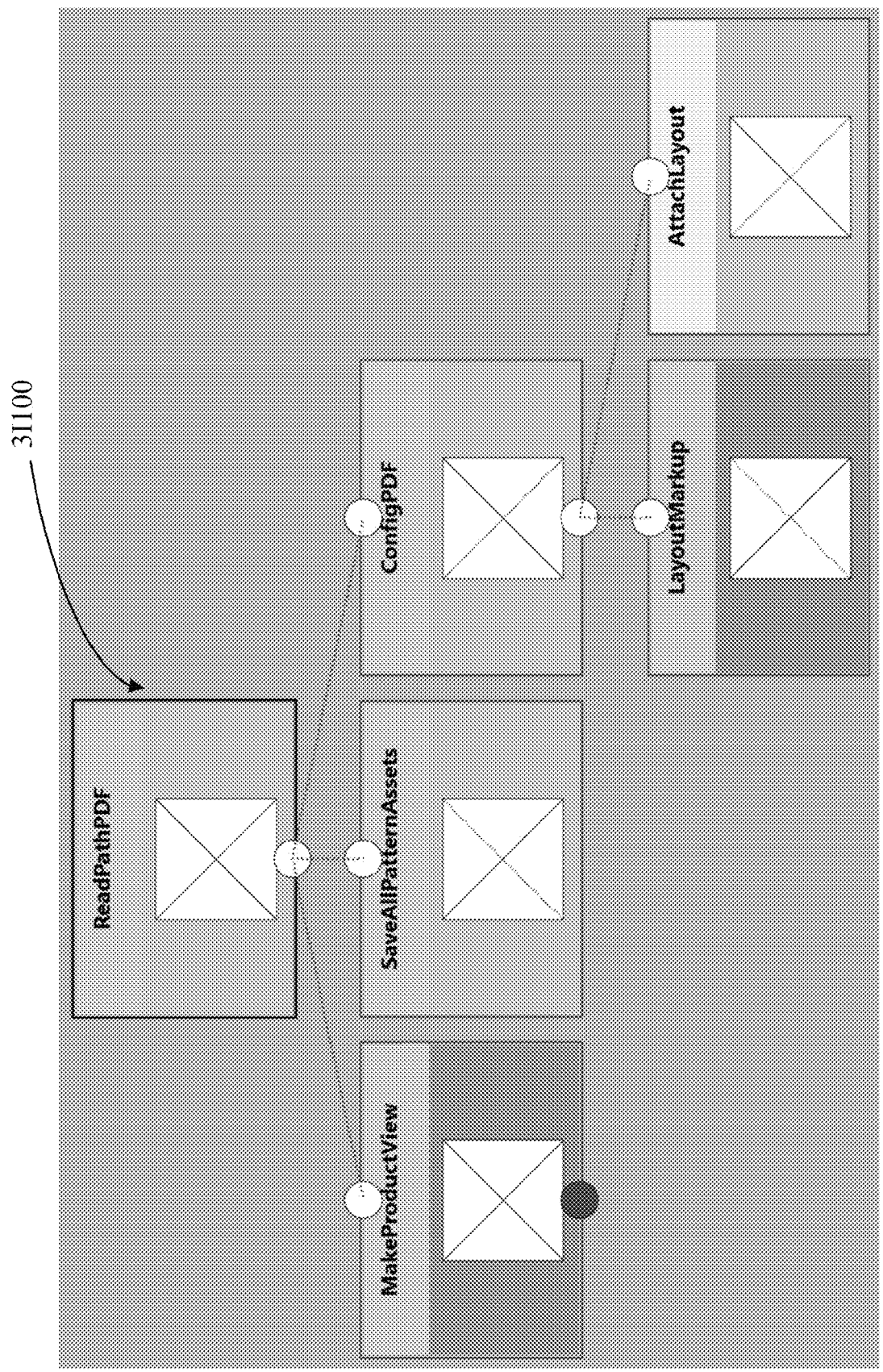
FIG. 3I depicts example filters.
Figure 3J:
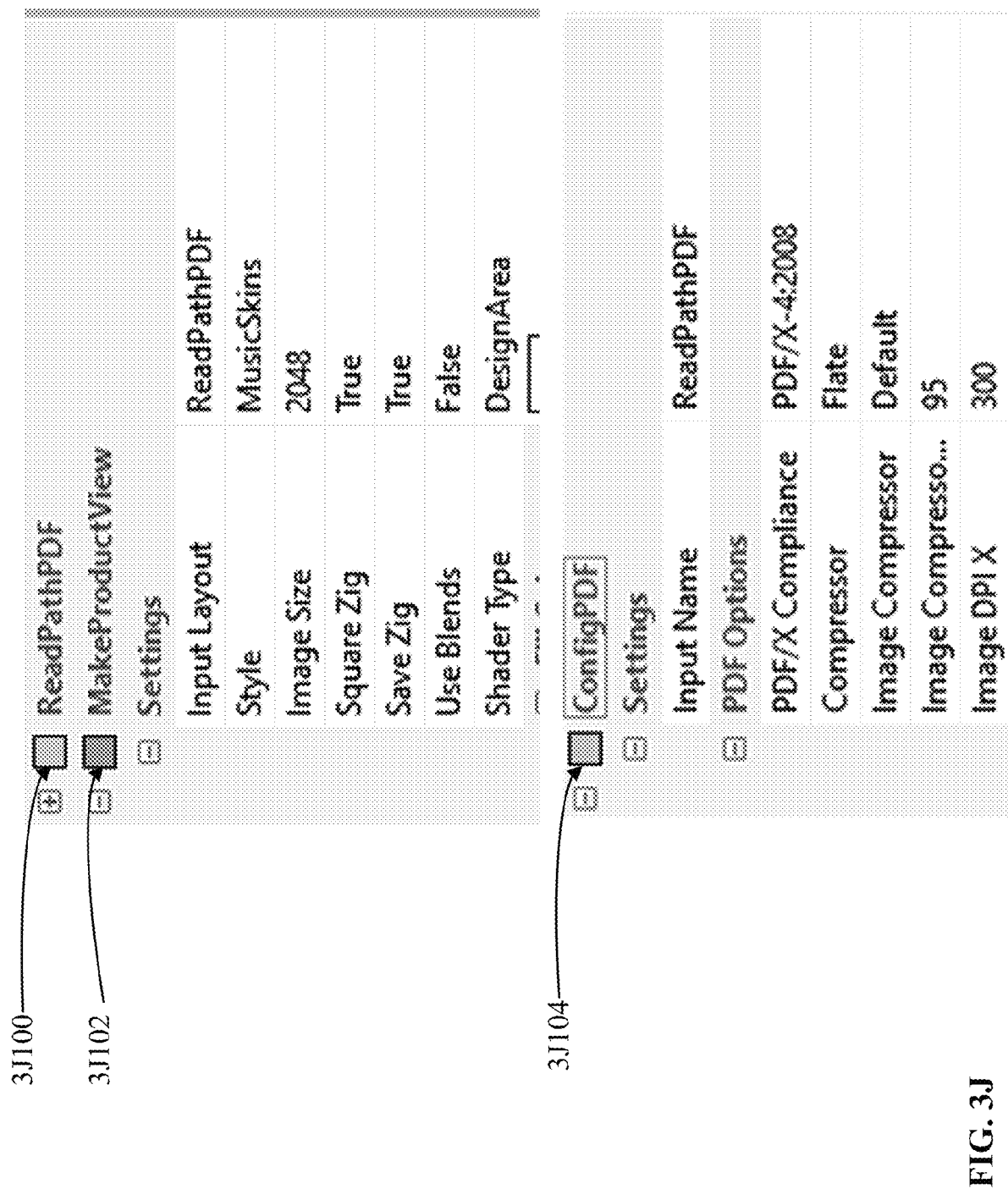
FIG. 3J depicts example paths for example filters.
Figure 3L:
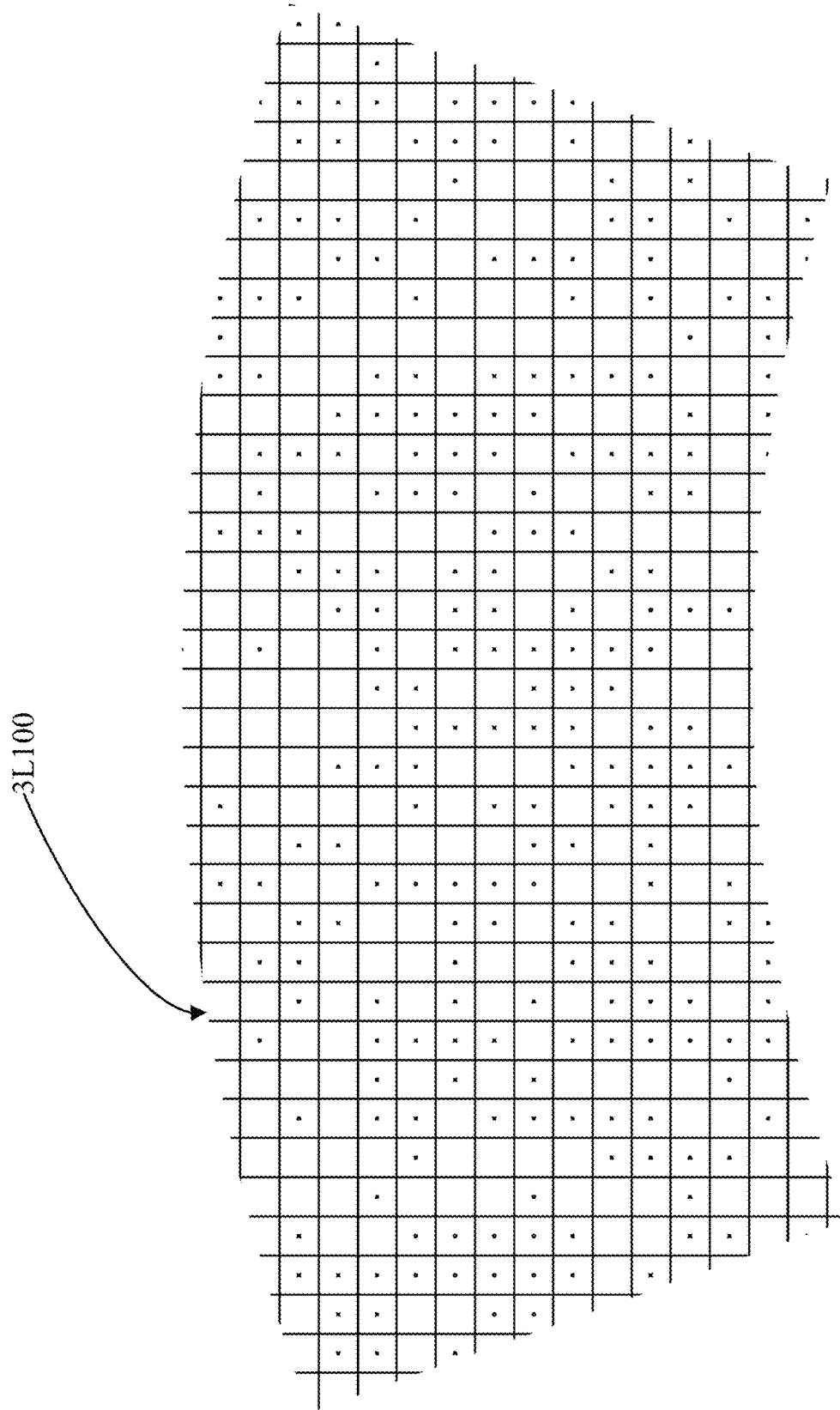
FIG. 3L depicts an example field markup.
Figure 3M:
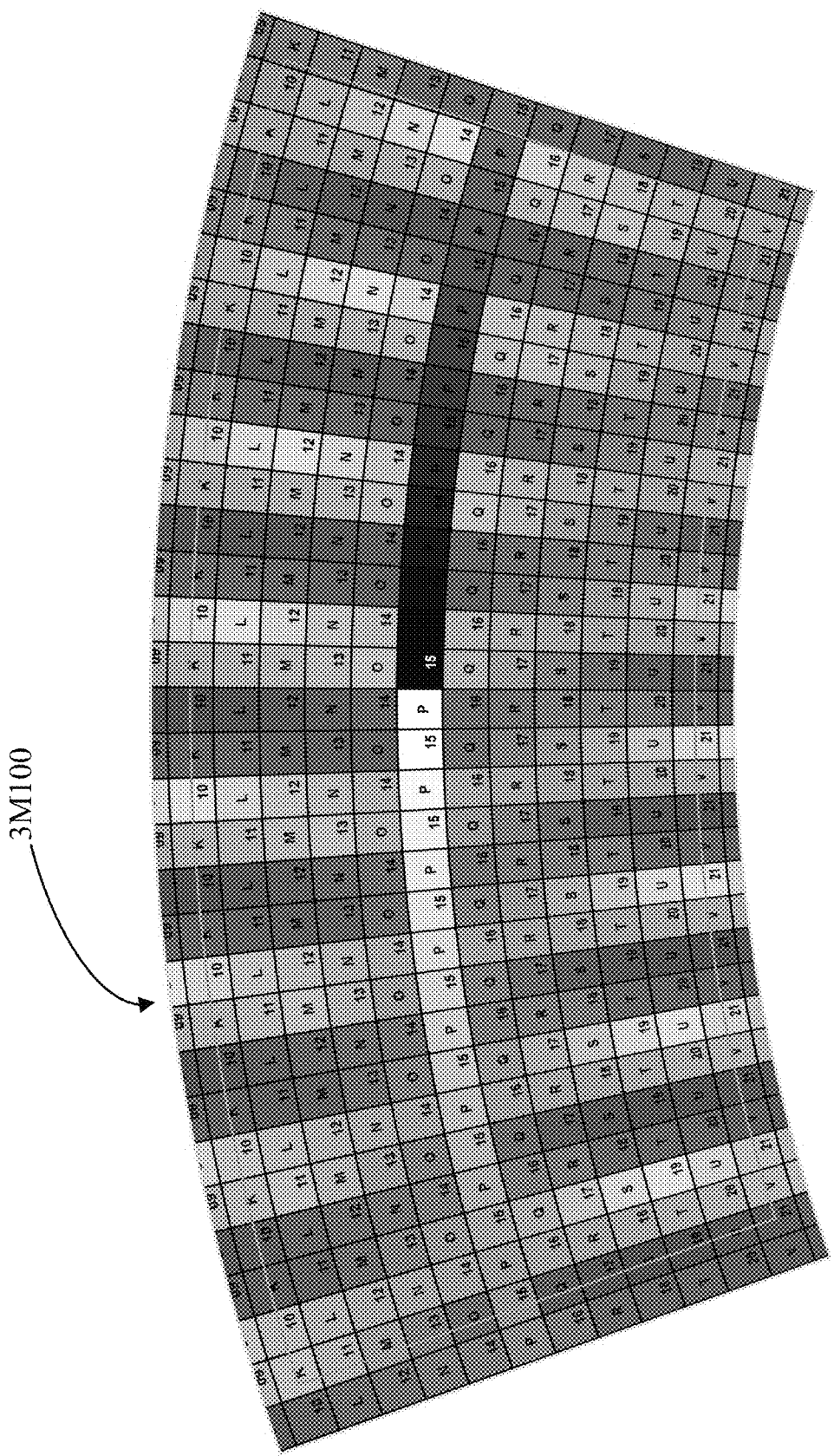
FIG. 3M depicts an example field markup used to test lighting levels.
Figure 3N:
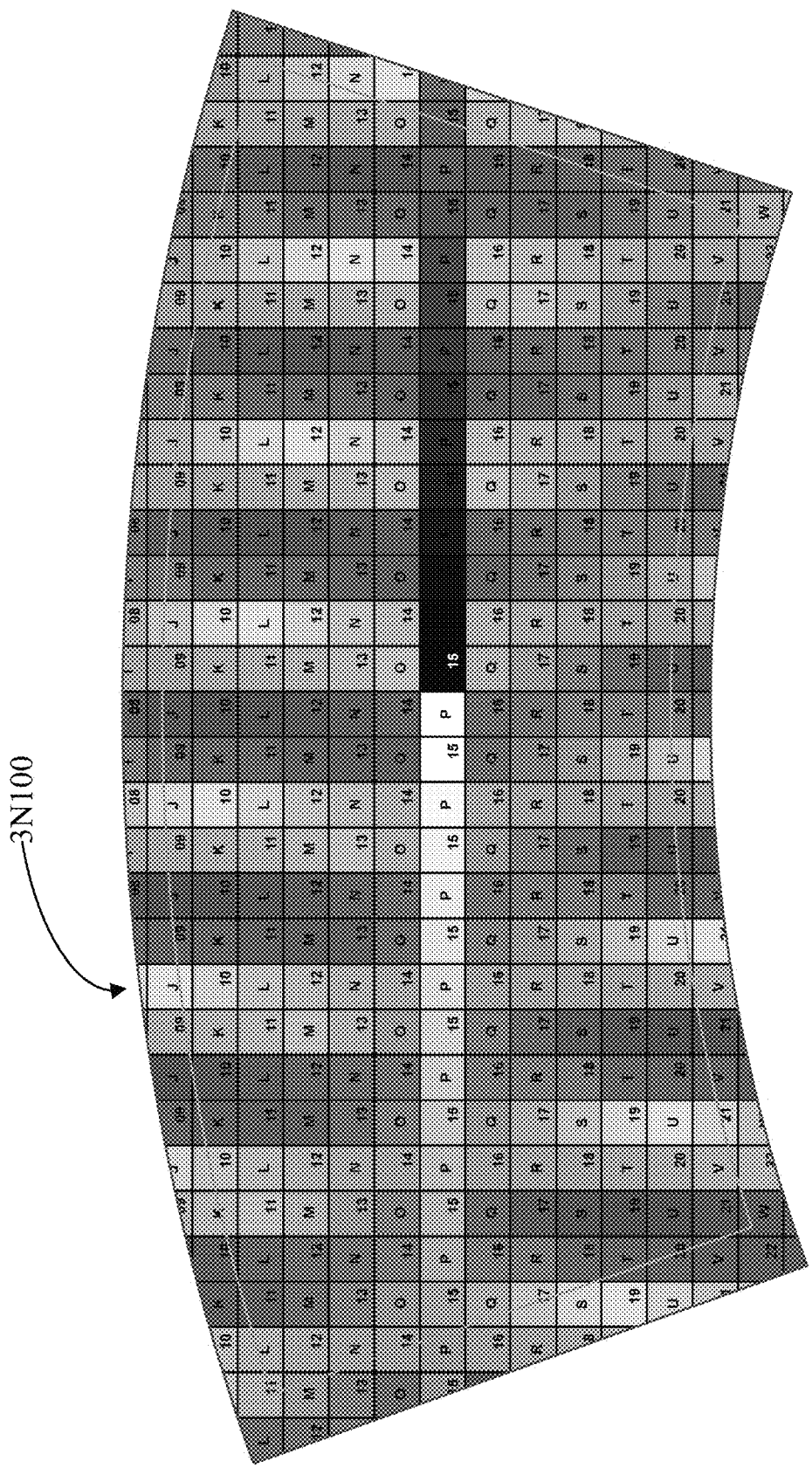
FIG. 3N depicts an example field markup used to test lighting levels.
Figure 3O:
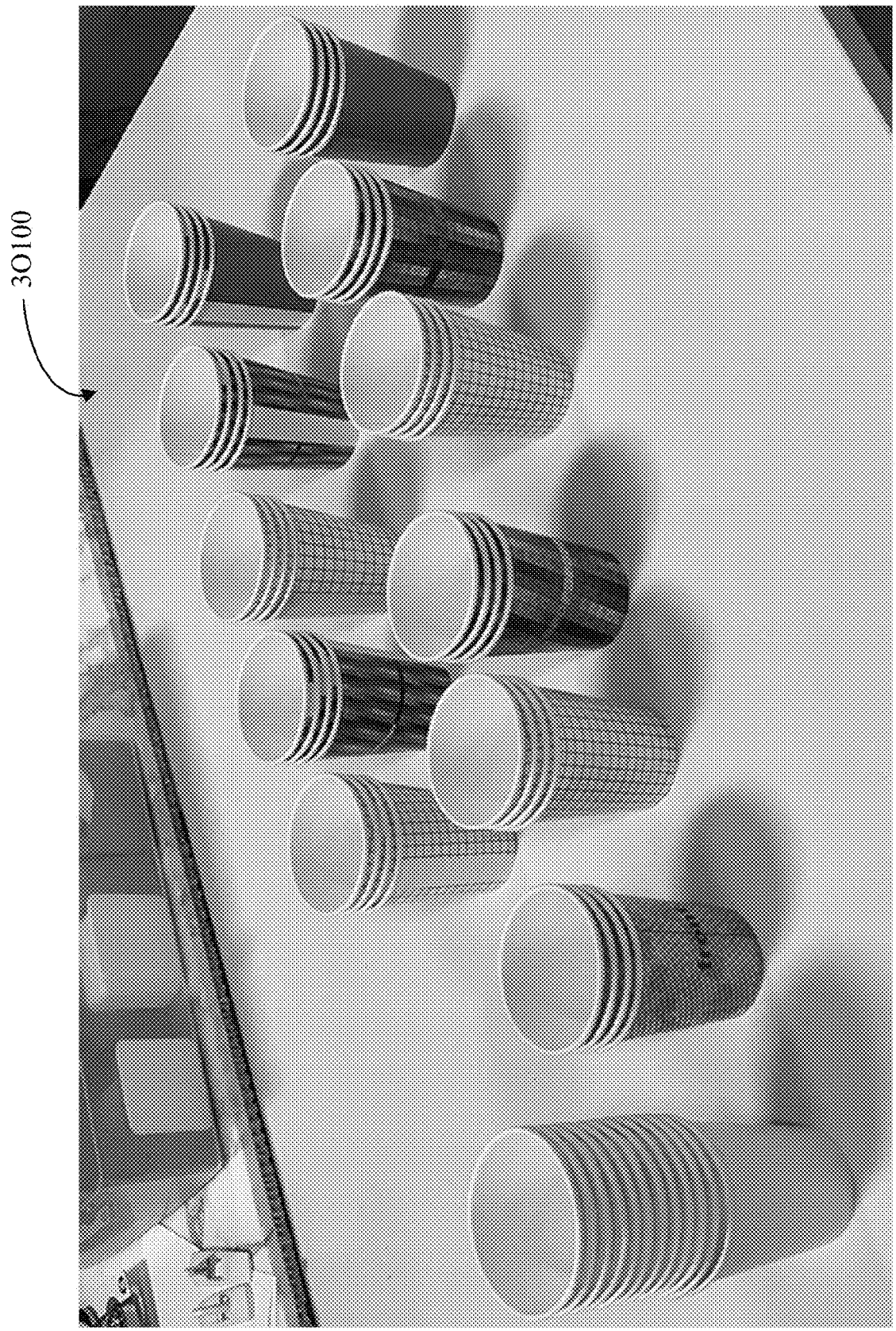
FIG. 3O depicts example physical products.
Figure 3P:
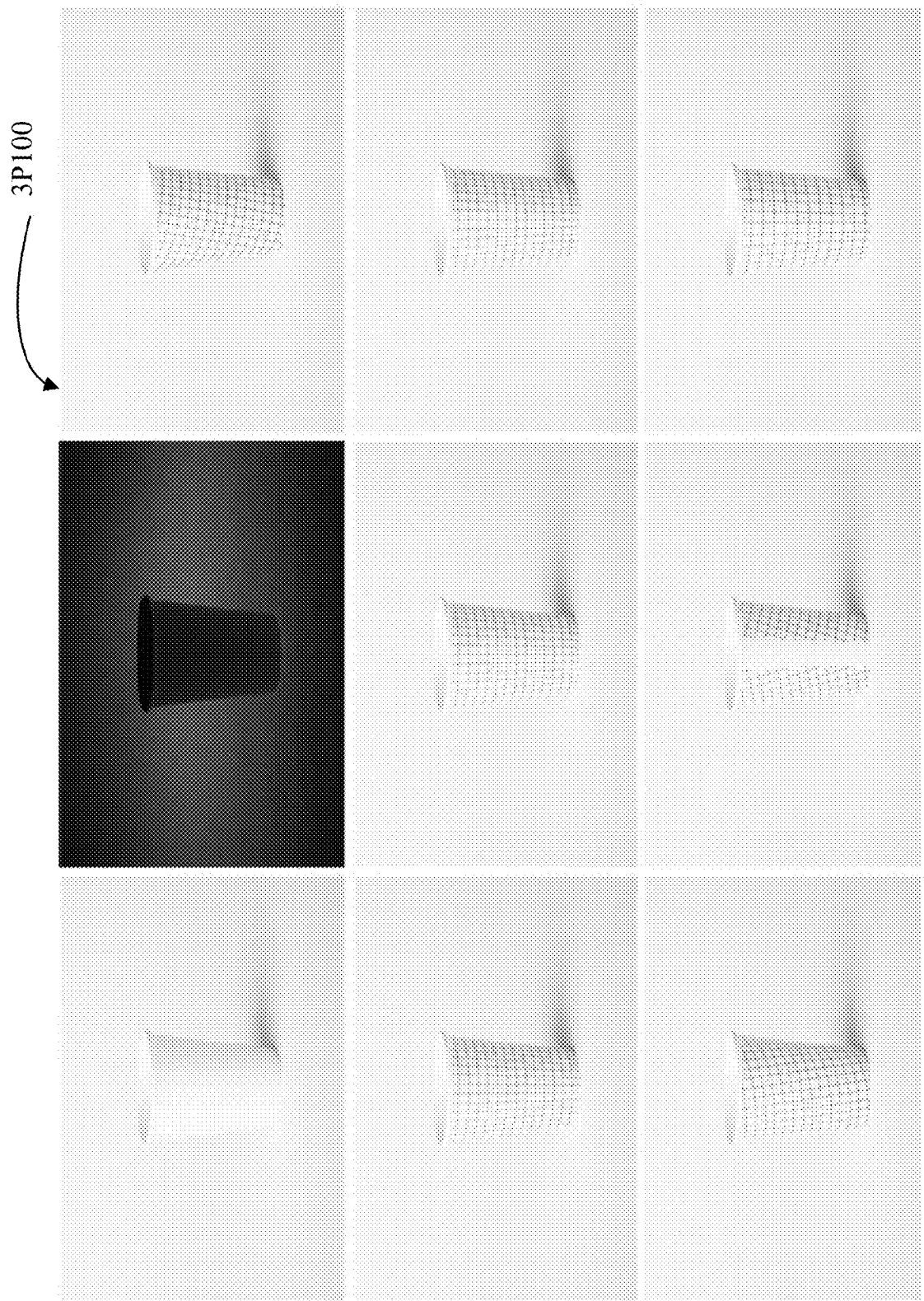
FIG. 3P depicts an example of a contact sheet.
Figure 3R:
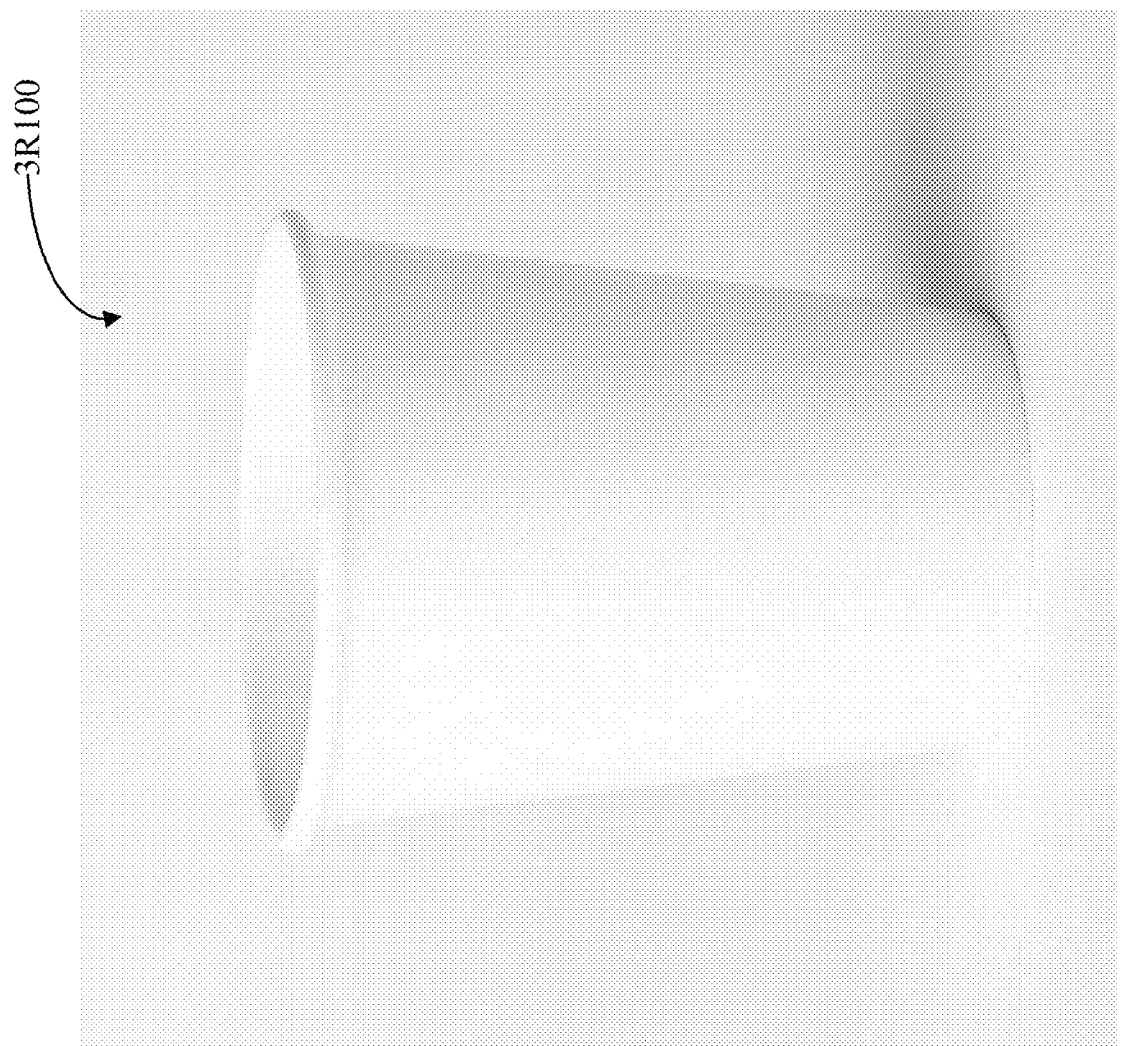
FIG. 3R depicts a composite image file.
Figure 3S:
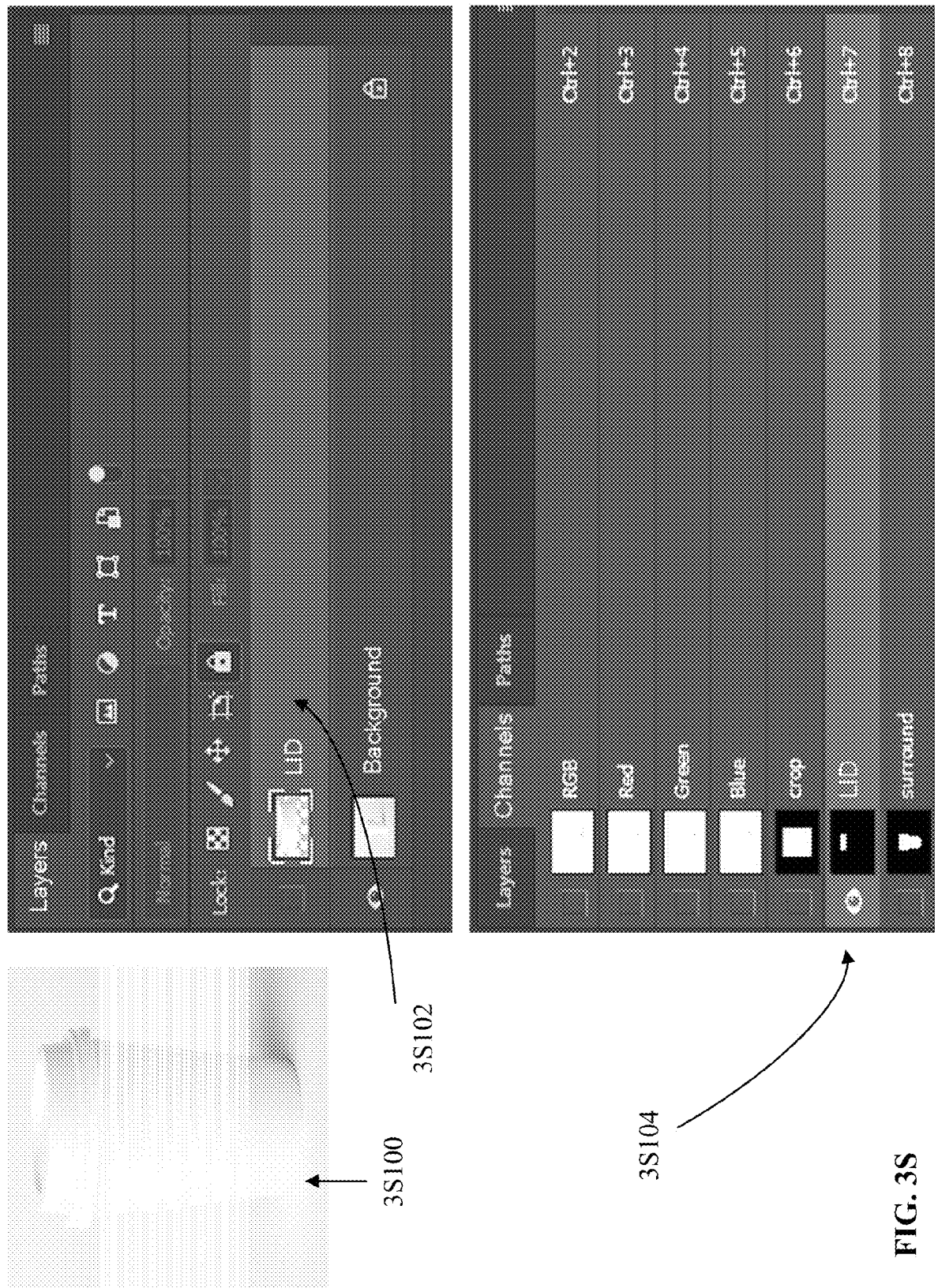
FIG. 3S depicts examples of layers, channels and paths created from component images of a composite image file of a paper cup.
Figure 3T:
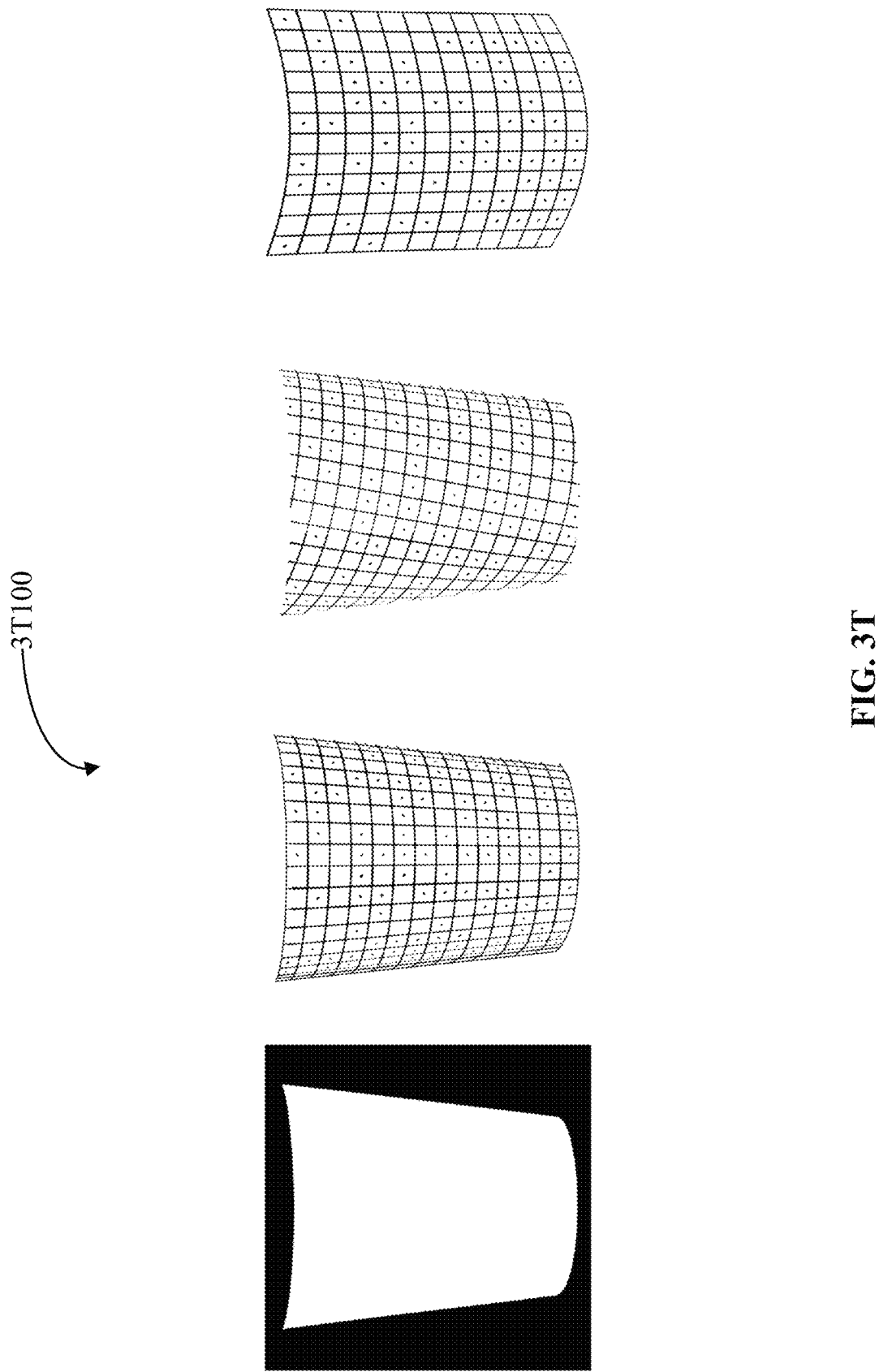
FIG. 3T depicts example components of a composite image file.
Figure 3U:
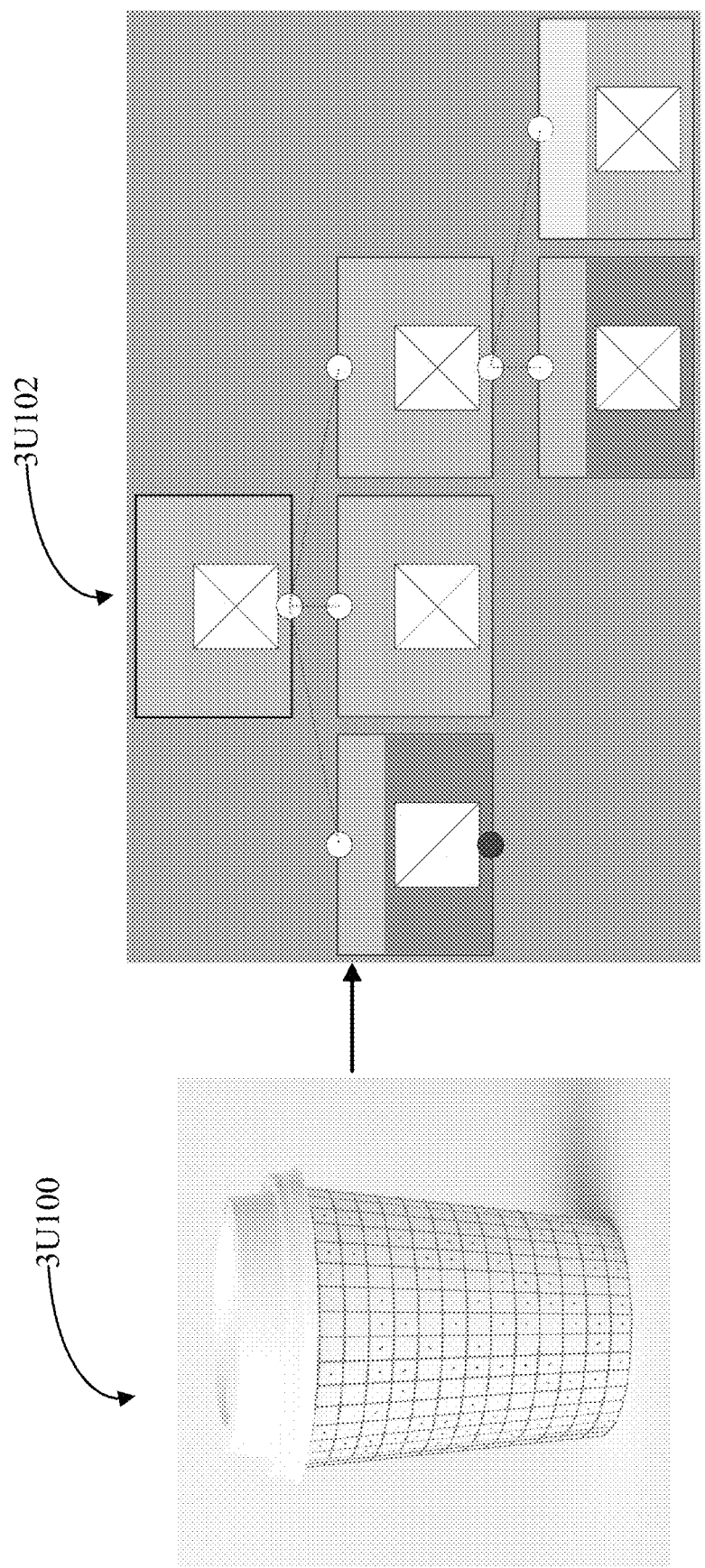
FIG. 3U depicts a process of porting a composite image file to authoring tools.
Figure 3V:
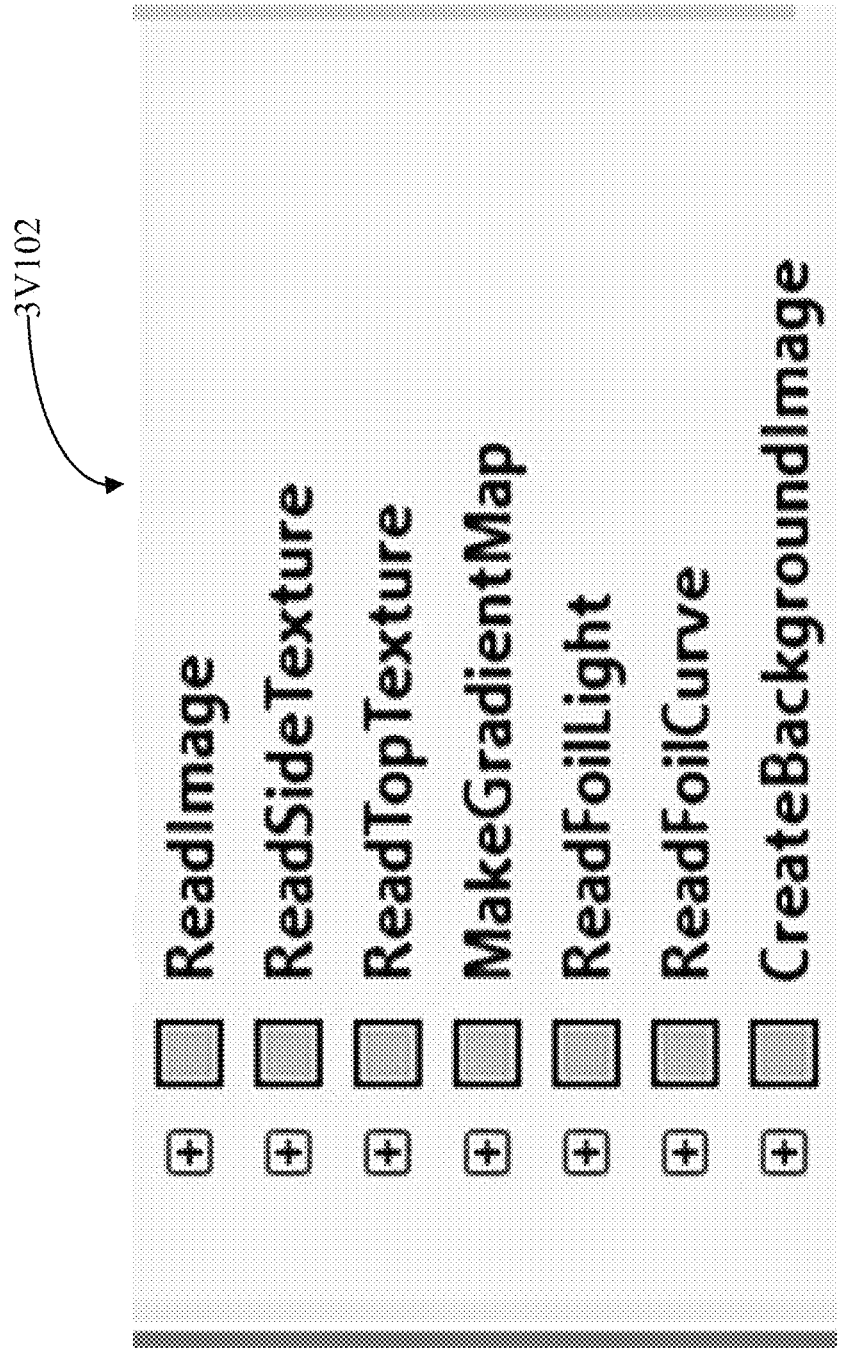
FIG. 3V depicts examples of filters.
Figure 3W:
FIG. 3W depicts a configurable image file with a changeable background.
Figure 3W:
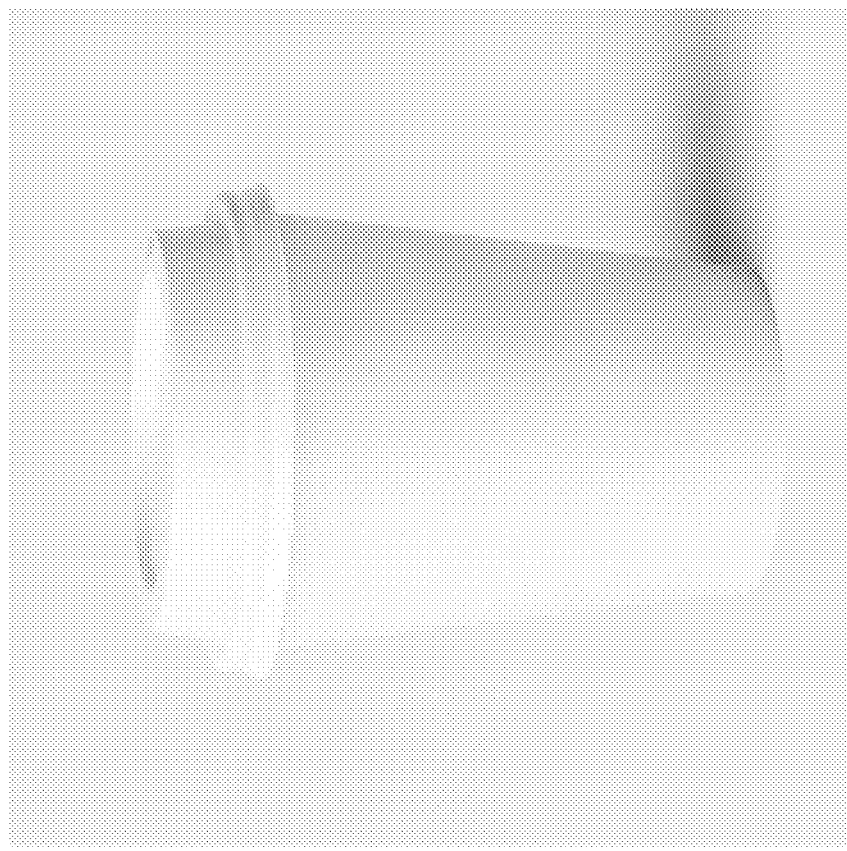
Figure 3Z:
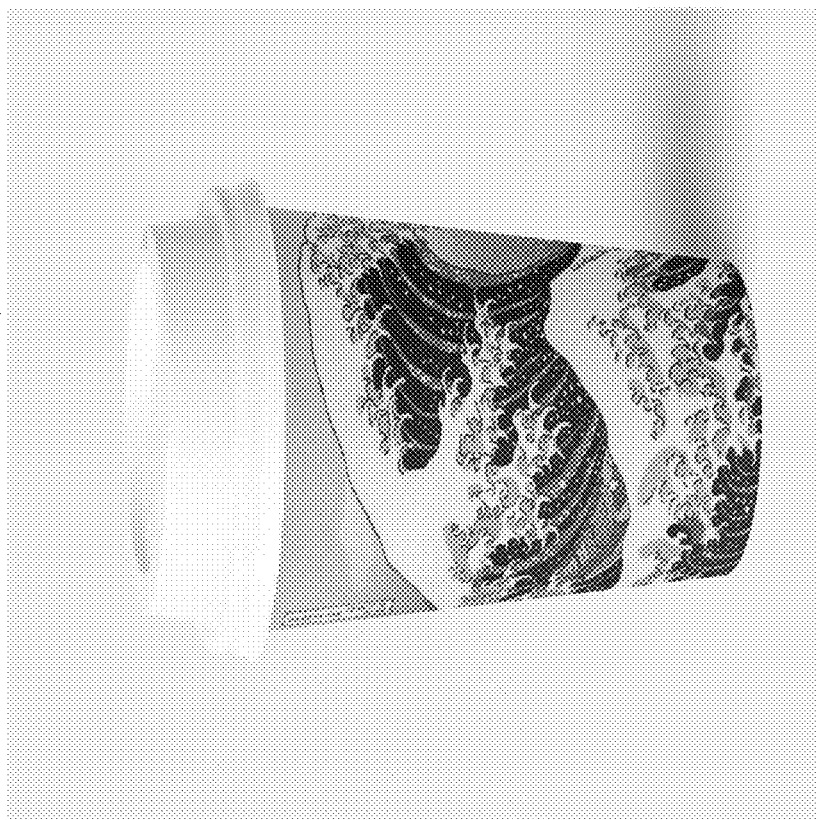
FIG. 3Z depicts an example of an image mapped to a design area of a configurable image.
Figure 3Z:
Figure 3Z:
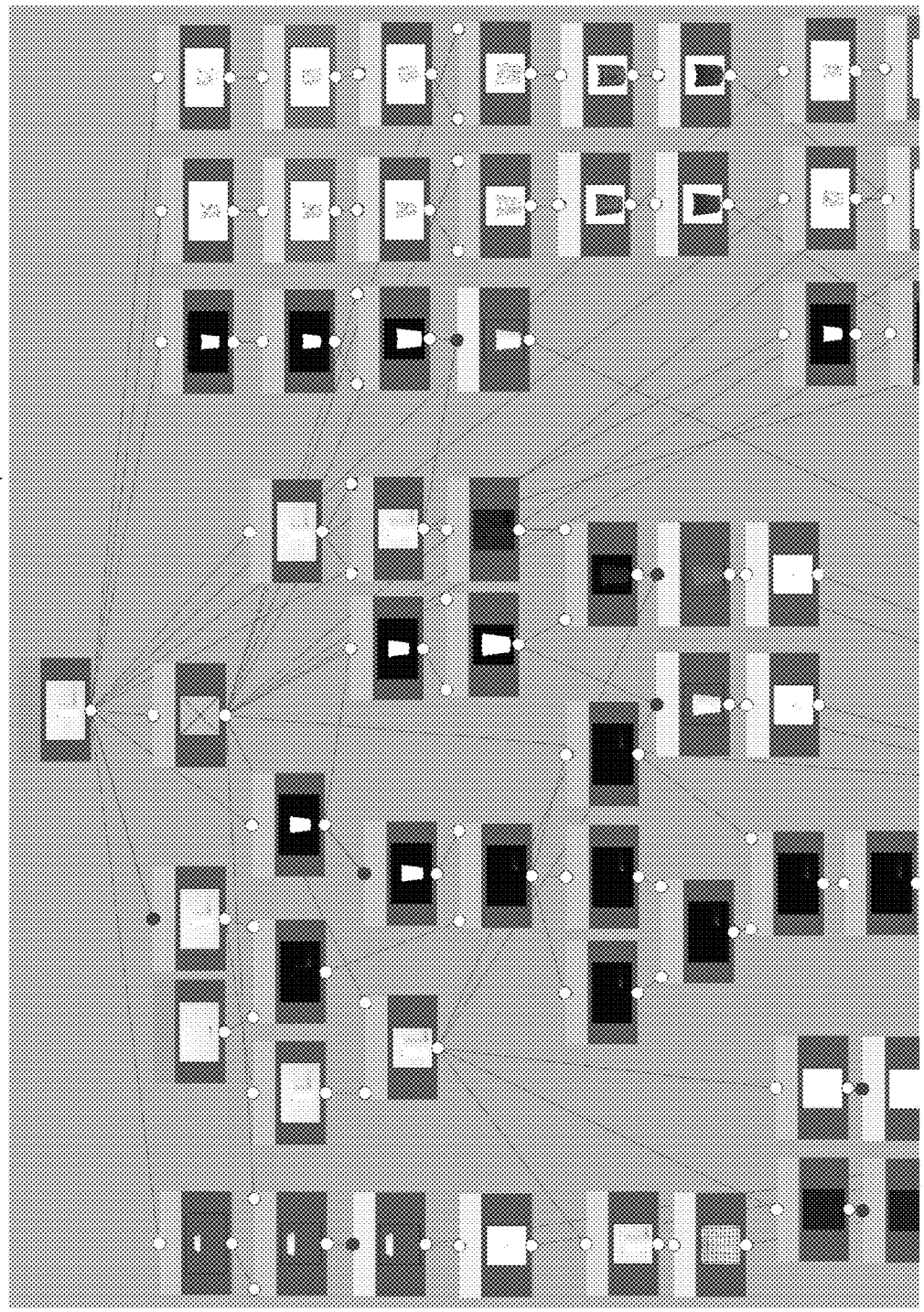
Figure 4:
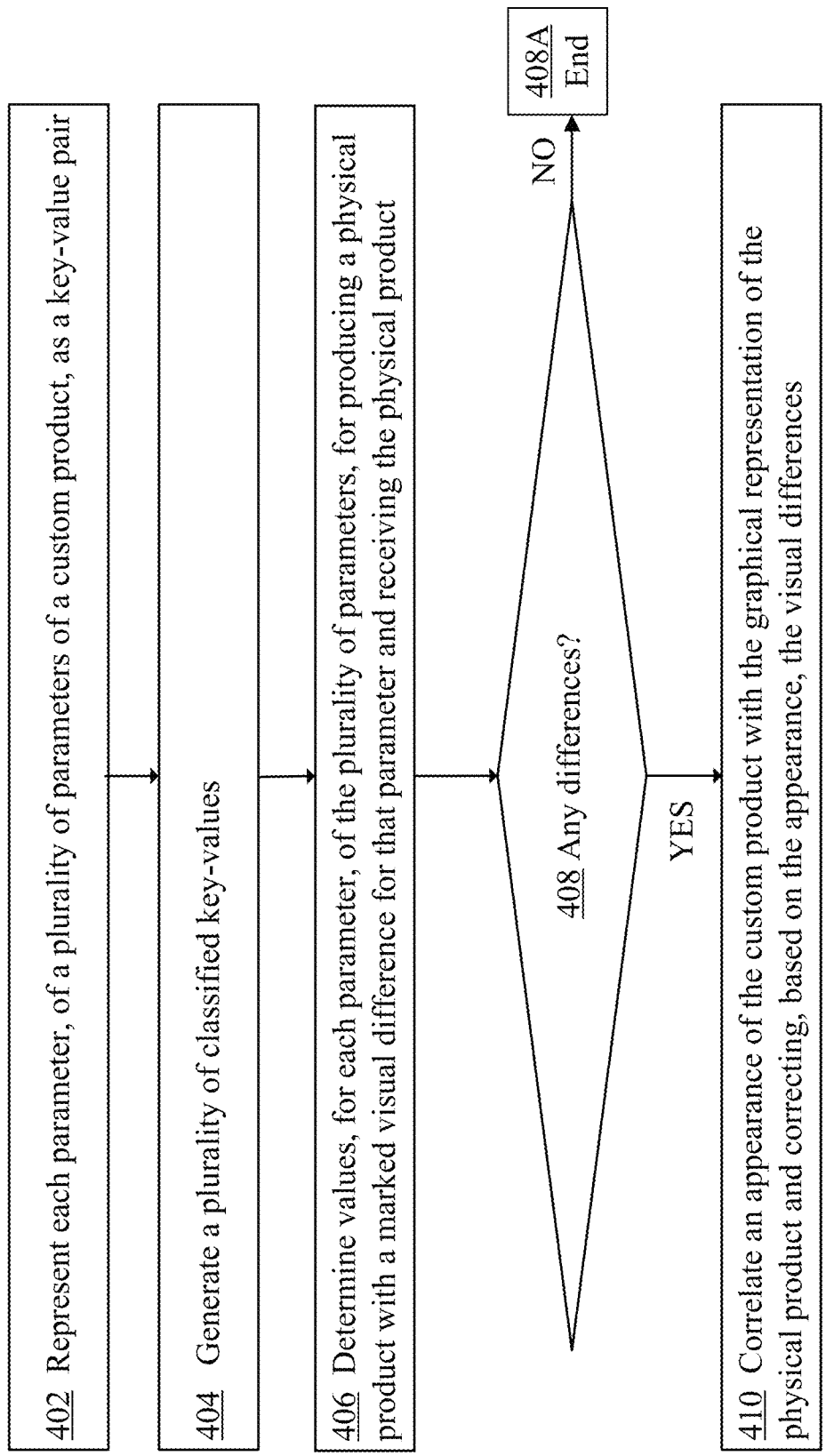

FIG. 2A4 is a block diagram that illustrates an example structure of an example implementation of authoring tools. Certain components shown in FIG. 2A4 have been also described in FIG. 2A3. However, in comparison with FIG. 2A3, FIG. 2A4 illustrates the implementation of authoring tools 2A120 from the perspective of processing an output request 2A400 until a manufacturing output 2A450 is obtained.

More specifically, as shown in FIG. 2A4, authoring tools 2A120 use scripts 2A110, configuration 2A111 and layout input 2A100 to generate and obtain layout .zig file 2A330 and pattern .zig file(s) 2A4100.

In some implementations, layout .zig file 2A330 includes a geometry 2A338, a print configuration 2A336, key-value/ references 2A336, and the like. Geometry 2A338 may include pattern references, text, lines paths, bar codes, QR codes, and the like.

In some implementations, pattern references specify a link, by name, GUID, binary files, or other reference, to a pattern .zig file that exists externally. The layout .zig can be described as a "page" or otherwise the entirety of the product area, whereas the pattern .zig are the customized areas within that page or entity.

In some implementations, pattern .zig file 2A4100 includes paths 2A4120, which may include bleed, visible, safe, cut, overprint, and the like. Each pattern .zig is a representation of a customizable area that can have separate designs, processes, and other output.

Pattern .zig file 2A4100 may also include key/value/ references 2A336, which can be used to provide customization and generate specific output data for the specific area.

Suppose that an output request 2A400 for, for example, generating and/or manufacturing a physical product based on an interactive digital design is received from a user via, for example, tools implemented on the website or via a manufacturing process. Suppose that key-value pairs are implemented for the interactive design and stored in a database, a library, or the like. The key-value pairs may include the attributes defined and/or entered by a user according to a user design 2A430 and/or a print configuration 2A440.

In some implementations, key-value pairs 2A132 are used, along with layout .zig file 2A330 and pattern .zig file 2A4100 to generate a ZigLib rendering/output 2A128, which was also described in FIG. 2A3.

ZigLib rendering/output 2A128 may be used to generate a manufacturing output 2A450, which may be expressed as a PDF file, a GCODE file, and the like. ZigLib rendering/output 2A128 corresponds to 2A154 and 2A156 in FIG. 2A1.

3.4. Designing an Asset

In some implementations, a product visualization platform is configured to execute authoring software applications designed to generate high quality renderings and manufacturing outputs of custom products. The high quality renderings may be used to, for example, generate depictions of various products and the products' components. The products are also referred to herein as assets. The assets may be displayed on a website, or other service where a user may interact with digital files, featuring the assets and facilitating the personalization, customization and ordering the product by customers. The customizing of the products may involve, for example, employing the high quality renderings to be able to display the products using functionalities of the website or the chosen display service.

However, before a high quality rendering of an asset may be generated, the asset needs to be designed and then a test needs to be performed to determine whether a manufacturer can manufacture a physical product corresponding to the asset according to the designer's specifications.

3.5. Asset Definition Data

Asset definition data is the data that parametrically describes an asset and/or a customized product. In some implementations, the asset definition data includes the Product Description Key-Values as disclosed in, for example, U.S. patent application Ser. No. 17/458,116, U.S. patent application Ser. No. 17/501,513, U.S. patent application Ser. No. 17/387,154, U.S. patent application Ser. No. 17/384,636, U.S. patent application Ser. No. 17/501,451, U.S. patent application Ser. No. 16/867,898, and U.S. Pat. No. 11,080,912.

In addition to the Product Description Key-Values, manufacturing constraints may also be used. The manufacturing constraints may be used to set forth the metes and bounds for the equipment employed by the manufacturers involved in producing the products. The manufacturing instructions are usually compatible with the configurations of, for example, manufacturing servers, such as print servers, that process the manufacturing instructions and generate outputs that meet the requirements of the customer settings.

Manufacturing instructions usually capture all the information that needs to be provided to a manufacturer so that the manufacturer can produce/manufacture a product that was customized by a user and/or a designer. The manufacturing instructions capture the key-value pairs (described in detail later) in the form that is understandable by the equipment deployed by the manufacturer. As it will be described later, two or more customized products may have their own individual sets of key-value pairs; however, not all, but some of the key-value pairs in the corresponding individual sets of the key-value pairs may be the same. For example, a collection of coffee mugs having a particular floral design imprinted on the mugs of the collection may share, or have similar, subsets of the key-value pairs that capture the details of the particular floral design.

Certain details of a group of certain customized products may be captured by a subset of the key-value pairs that may be specific to each and every certain customized product. That subset of the key-value pairs may be included in, so-called, a dictionary and labeled as reusable key-value pairs. The dictionary may be stored in a storage or a memory unit by, for example, a product customization platform, which is described later.

Similarly, one or more certain manufacturing constraints of a plurality of manufacturing constraints for manufacturing a group of certain customized products, may be specific to each and every certain customized product. The one or more certain manufacturing constraints may be included in the dictionary and labeled as reusable manufacturing constraints.

Realistically, during conversations with a manufacturer, it might be difficult to describe the necessary manufacturing constraints in the way that a product that the manufacturer manufactured would match the customized product (described using the key-value pairs). Therefore, there is a need to use the dictionary with the labeled particular manufacturing instructions (corresponding to a subset of the certain key-value pairs), and then select a short list of the manufacturing instructions, selected from the labeled particular manufacturing instructions, and use them as a starting point to capture the characteristics of the customized product. Then the manufacturing instructions from the shortlist may be refined and further fine-tuned until the accurate manufactured product can be produced.

3.6. Specific Cutout Cases

Certain customized products may have features that are usually referred to as cutout areas, i.e., openings. Examples of such customized products may include transfer films that may be applied to the surfaces of other assets. Some transfer films may have some cutouts that would require a cutting machine of a manufacturer to cut out some openings in a substrate. A transfer film is usually a thin (typically a few thousands of an inch thick) metal, polymer, monomer, or metallized polymer film transferred to a substrate and adhered. The film can be printed, cut, or modified mechanically or thermally prior to transfer. For example, if a particular transfer film is a last name that includes any of the letters such as "a," "b," "d," "e," "g," "o," and/or "p," then to generate such transfer film, the cutting machine would need to cut out the openings, i.e., the enclosed portions within the corresponding lettering included in the transfer film.

In some situations, a cutting machine, or a cutting device, may be unable to cut out relatively small openings. For example, if the cutting device has a tolerance and the precision 10 millimeters or more, that cutting device may be unable to cut out the openings that are smaller than 10 millimeters. Therefore, the manufacturer needs to provide and communicate certain manufacturing constraints to, for example, the product customization platform in advance because the manufacturing constraints may influence the way that the customized assets are going to be designed. For example, if the cutting device is unable to cut the openings smaller than 10 millimeters, then a designer should be informed in advance that the designer cannot design transfer films that have openings smaller than 10 millimeters.

Other constraints may depend on the material from which the transfer film should be cut out. For example, if the material is vinyl, which might be sensitive to tearing, wrinkling, and/or high temperatures, then a manufacturer might want to provide and communicate to the product customization platform the manufacturing constraints indicating how the vinyl can be used in the custom products.

Other constraints depend on how the transfer films are transferred from one substrate onto another substrate. For example, some substrates may be sensitive to the transfer process, and therefore, the manufacturer might want to provide and communicate to the product customization platform the manufacturing constraints indicating the limitations of the transfer film transfer process with respect to the particular substrates.

There might also be some limitations with regard to an engraving process. A manufacturer may utilize certain engraving machines and/or tools that have certain limitations and/or certain tolerances, which in turn may impose some limitations on what the engraving machines/tools can do. That in turn may impose some limitations on the way that the customized products may be designed and customized.

Therefore, to allow a manufacturer to manufacture the real assets that accurately correspond to the customized product, a great deal of consideration needs to be given to what is requested from the manufacturer, what the manufacturer can actually manufacture, and how to instruct the manufacturer to manufacture the physical products.

3.7. Example Transfer Film

The transfer films may have a variety of applications. For example, transfer films may be applied to wedding invitations, birthday party invitations, reunion invitations, and the like.

Figure 2B:
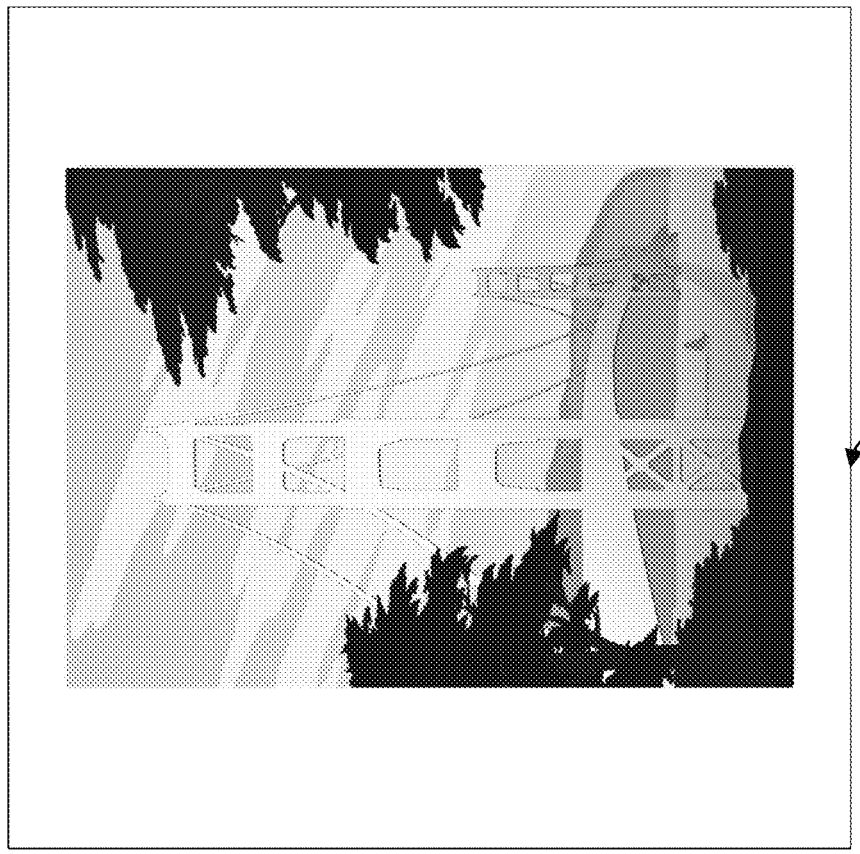
FIG. 2B depicts examples of transfer films applied onto assets.
Figure 2B:
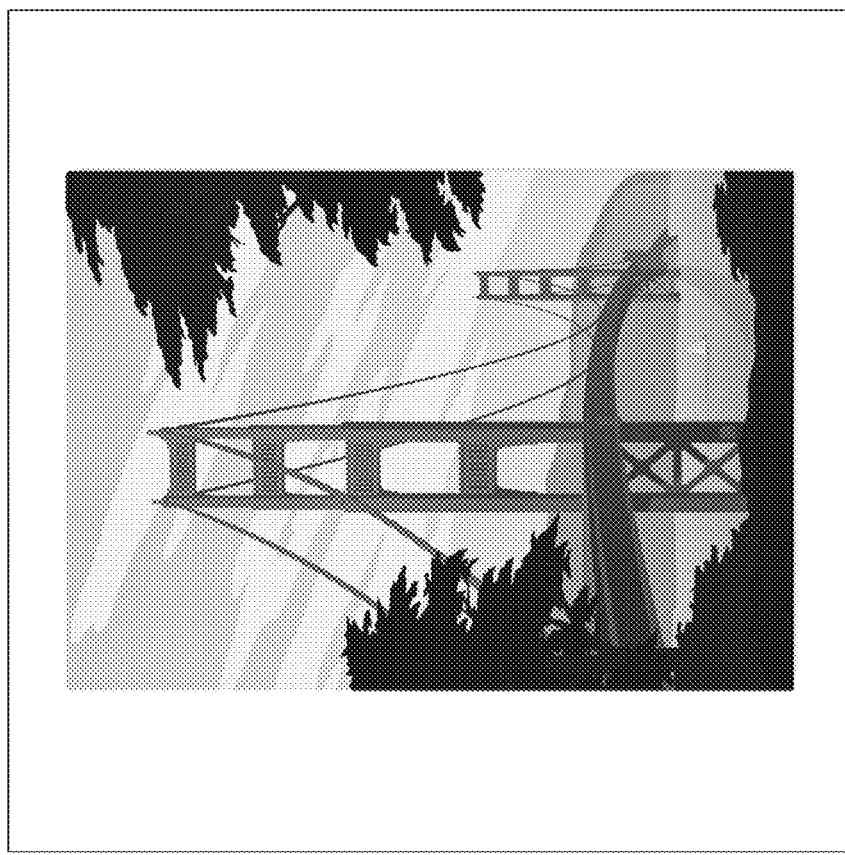
Figure 2B:
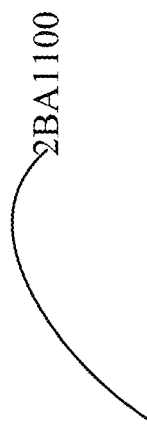

FIG. 2B depicts examples of transfer films applied onto assets. More specifically, FIG. 2B shows a transfer film 2B1100 and a transfer film 2B1110.

In the depicted example, the transfer film is a foil-like transfer film that can be printed on, for example, a digital printer. An example of a digital printer may include a Scodix™ digital printer. A foil printing is usually performed on paper substrates and the like (cards, boards, coated and uncoated).

A digital printer is usually configured to enrich the quality of the image digital output. It usually provides unique, attractive UV coatings and visual effects. The digital printer has the ability to print on a wide variety of stocks including, for example, Xerox® presses. It is applicable to a wide variety of applications including folding cartons and freestanding or framed displays.

In the example depicted in FIG. 2B, the transfer film is an adhesive layer made out of a reflective material that was heated and then applied over the background substrate.

A digital representation of the transfer film may include the output generated by applying one or more filters to a plurality of key-value pairs representing the customized digital asset. For example, the digital representation, corresponding to the particular transfer film, may be derived by applying a specific filter to a corresponding plurality of key-value pairs to represent, for example, the shiny, foil effect of the transfer film. Furthermore, another key-value may be applied to represent the color of the transfer film. Examples of the color may be rose gold, silver, regular gold, and the like. FIG. 2BA is a block diagram that illustrates examples of key-value pairs. More specifically, FIG. 2BA shows key-value pair 2BA1100, in which examples of keys are front_foil, SideSource, front, ShadowSource, background, and the like, while the corresponding values are golden_gate2.png, Sidesource, etc.

Figure 2C:
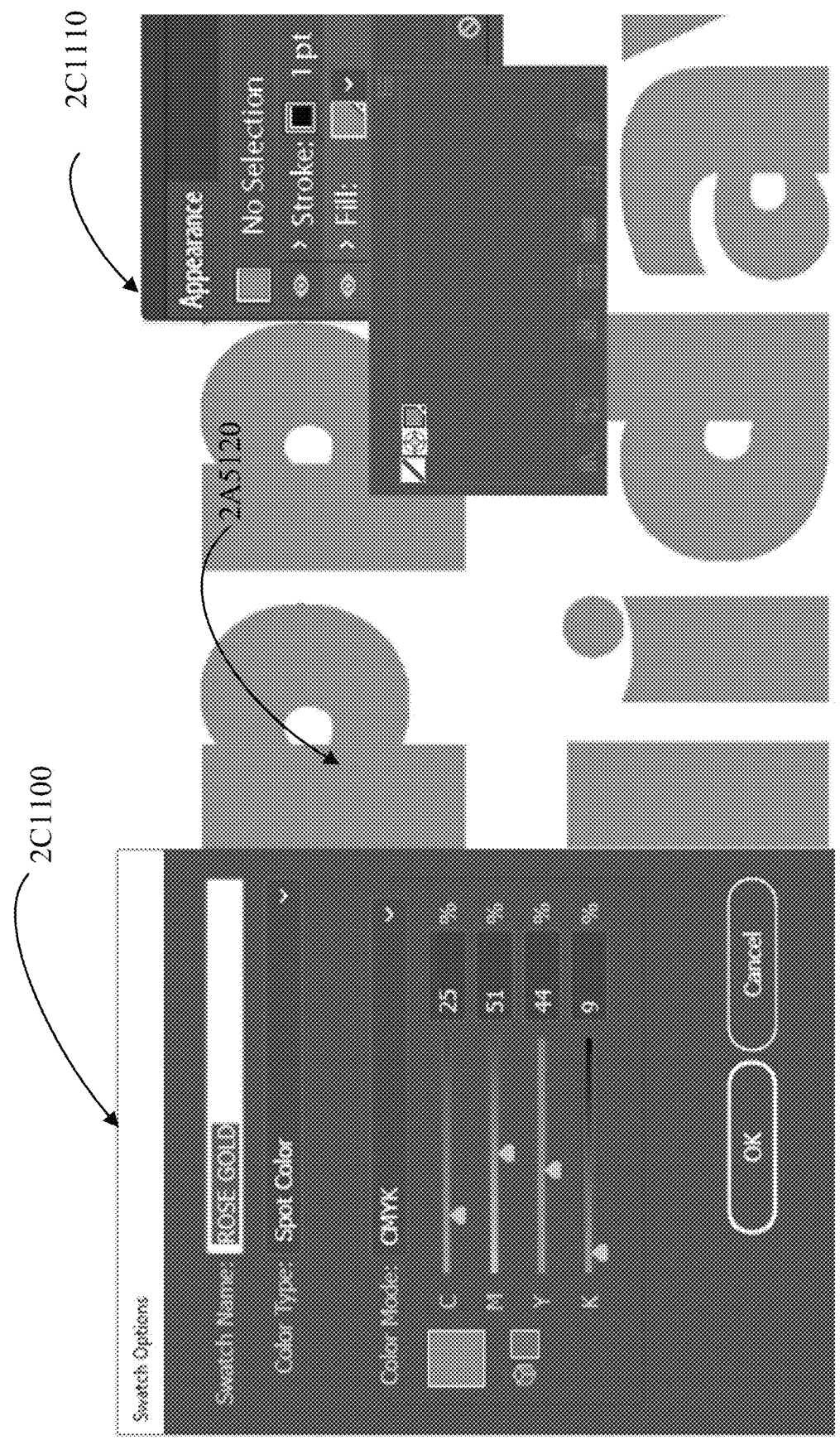
FIG. 2C depicts examples of swatch options.

FIG. 2C is a block diagram that illustrates examples of swatch options. More specifically, FIG. 2C shows a swatch option 2C1100 for a "rose gold" used in a [FoilColor, foil-rosegold.png] key-value pair shown in FIG. 2BA. The "rose gold" swatch may have an associated appearance parameter 2C1110 further defining the swatch.

In some implementations, once one or more filters are applied to the plurality of key-value pairs corresponding to the transfer film, a plurality of manufacturing instructions is generated. The instructions may be transmitted to a manufacturer to instruct the manufacturer to provide a print file that can be used to visualize a physical transfer film product that the manufacturer could manufacture.

3.7.1. An Example Method for Creating Data-Flow Processing Units

A Graph View is the name for a Graphical User Interface (GUI) for the visualization and editing of individual processing components (also known as filters), aggregate filter modules (also known as BlockZ), and their connections into data-flow processing units (filter sets). A data-flow processing unit is shown in FIG. 2A5C. BlockZ is a specific class of data processing module; it is also referred to as a unique class of data flow filter. BlockZ and examples of their use will be described later.

Individual filters, filter sets, and filter modules can be added, moved, connected, grouped, assembled, and edited in Graph View. The Graph View is one example of a method for interacting with a filter, filter sets, and filter modules to create data-flow processing units.

Figure 5:
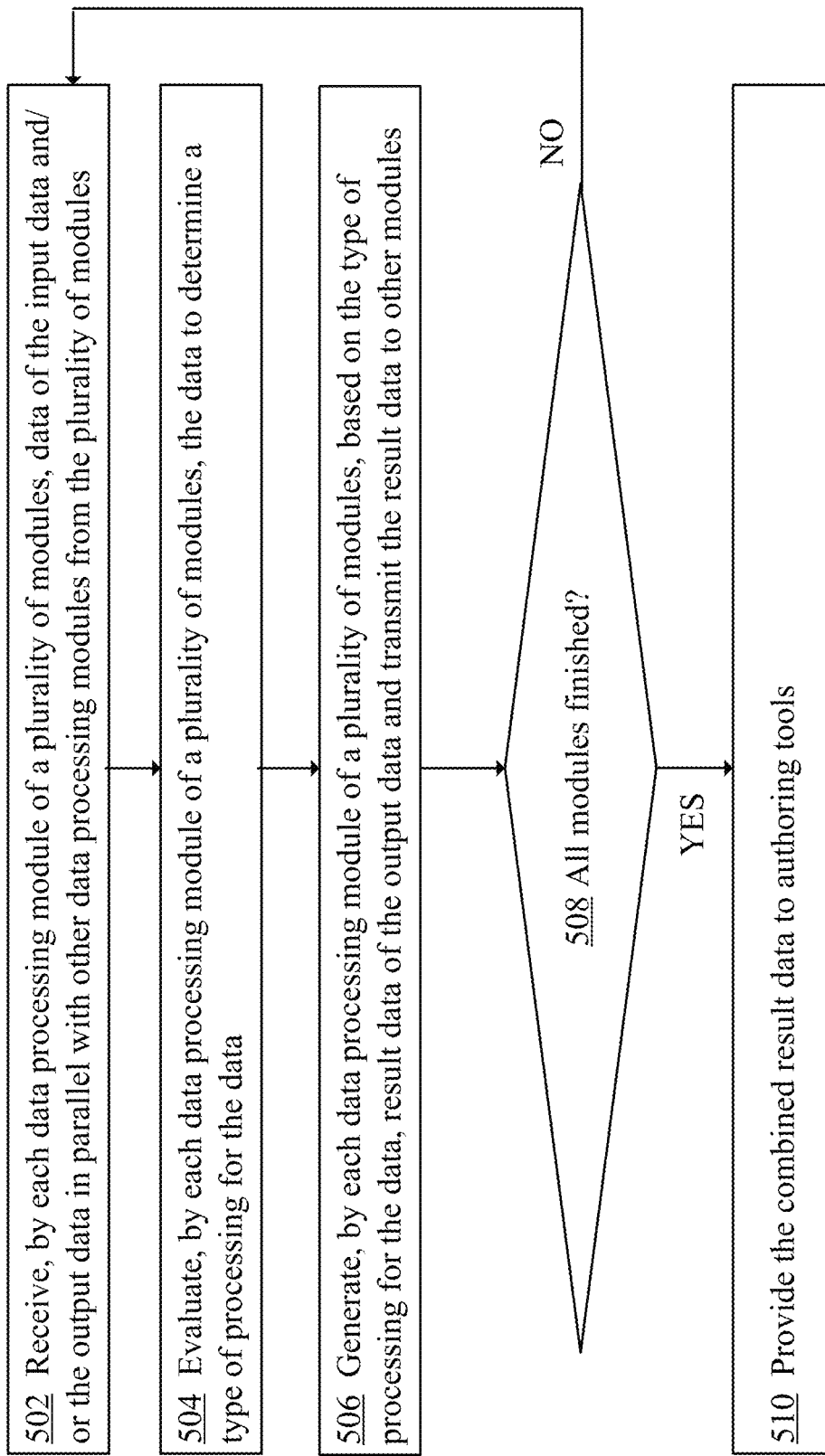

Graph View is represented as a gray workspace with filters represented as rectangles. FIG. 2A5 depicts four individual filters in a Graph View.

Individual filters are represented as rectangles with zero, one, or two color-coded circular connection nodes on either the top, bottom or both, of the rectangle. A color-coded bar 2A5100 runs along the top of each filter and indicates the process-type a filter performs. There is a yellow section 2A5110 below the color-coded bar that contains a white square 2A5120 with two diagonal lines running from the top corners to the opposite bottom corners (an "X"). Text displaying the name of the filter 2A5130 and the filter type 2A5140 are located in the color-coded bar at the top.

The color-coded bar at the top of the filter rectangle indicates the category (or process-type) of filters to which the filter belongs. For example, a red bar can indicate the filter is an input/output filter, and an orange bar can indicate an image processing filter, and so on. Within the upper colored area are two text labels, one above the other. The upper text label 2A5130 is the filter name. This is a name that is assigned by the user. The lower text label 2A5140 contains the name of the filter function. The filter function text cannot be changed by the user.

The connection nodes represent an input or output into or out of a filter. Input nodes 2A5150 are on the top of the filter and output nodes 2A5160 are at the bottom of the filter. If a connection node is not present on the top of a filter 2A5170, the filter is a data source, in that it creates, reads, or otherwise obtains data from a source outside of the filter graph. If a connection node is not present on the bottom of a filter 2A5180, the filter is the end point for a process. In general, this indicates that the filter outputs its data to a file or other destination that is outside of the data processing of the filter graph.

Filter outputs can be connected to filter inputs to create a series of processes to turn a variety of image and data inputs into a variety of outputs. These collections of connected filters can be simple or complicated. Depending on the implementations, the filter structures can be constructed to be executed sequentially or in parallel. Examples of complicated filter structures will be described later.

Filters can be connected by clicking and dragging from one filter's output node to the input node of another filter. FIG. 2A5A depicts a process of connecting a filter output to another filter's input. Using an input device (a computer mouse for example), a user clicks on an output node and drags a connector 2A5A100. When the connector is over the input node of another filter the input node turns green 2A5A120, indicating a connection will be made. When the input device button is released the connection is made, indicated by a line 2A5A130, which is a dotted red when the filter is selected or focused, and solid black when not. The input node turns white where only a single input is allowed when connected to an output 2A5A140 and turns blue if multiple inputs are allowed 2A5B160. Output nodes turn white when they are connected to the input node of another filter 2A5A150. There is no limit on how many connections can be made from an output node.

The color of the lower section of the filter indicates the processing state of the filter. FIG. 2A5B depicts two possible filter processing states. The filters may be yellow 2A5B100 when a filter's process has not been run or needs to be re-run due to a change in the filter or a preceding connected filter. When the filter process is being run the lower portion of the filter may turn red, and when the filter process is successfully completed the filter may turn green 2A5B110, and so on. Any change to the filter settings or those of any filter previous to the filter in the filter chain may change the color of the lower section to yellow.

The area of the filter with the white square with the "X" shows a visualization of the output data of the filter, sometimes referred to as a "preview." A white square with an "X" 2A5B120 may indicate the filter has not performed its process. When a filter has been run successfully, the white square may be replaced by a thumbnail image of the filter output 2A5B130 if the filter has a single output object. The white square may be replaced by a gray square with an "X" 2A5B140 if the filter has multiple output objects or output that may not be previewed as an image. A black square with an "X" 2A5B150 may indicate a NULL, or failed, state, where a filter's sub-process has failed but the filter has not, as in the case with a processing module data processing unit (also known as a BlockZ) constructions. BlockZ and failed states are described later.

When a filter is selected a black line will appear around the filter to indicate it is selected 2A5C100. Selecting a filter can also cause the output connection line (which can be a solid black line when the filter is not selected 2A5C110) to become a red dotted line 2A5C120.

The red dotted line traces the filter output, or outputs, to its end point in the processing chain. The connection line, or lines, from the output node and the connection lines from all subsequent filter's output nodes, and subsequent connections (and so on until the end of the filter processing unit), become red dotted lines. This behavior allows a filter's output to be visually traced through the processing chain 2A5C130.

Individual filters and processing modules are added to a data-flow processing unit one at a time, or as a group of filters when adding a processing module. One method for selecting a filter or filter module to add to a data-flow processing unit is by control-clicking in Graph View to display lists of available additions.

FIG. 2A5D depicts a process of selecting a filter to be added to a Graph View workspace. In this example, a user holds down a modifier key (the CTRL (control) key) and presses a button on an input device (the left-button on a mouse, for example) while holding the cursor over the Graph View workspace 2A5D100 to display the lists of available filters and filter groups 2A5D110. An individual filter is selected from a list 2A5D120, which is then added to the data-flow processing unit. The filter is then connected to another filter, or filters, in a manner such as the one described above.

Each filter operates on, or creates, data, and processes it before passing it through its output to any filters attached to it. Filter processing functions are operations that perform a variety of tasks including image processing, I/O, and object manipulation. In order to complete these operations, each filter has one or more properties that define exactly the function of the processing. An example is a Gaussian filter, which provides properties for the specific color planes of an image to operate on, as well as the amount of the blur. These properties are listed as a text-editable user interface in the Filter Properties pane of the Filter Graph window. The properties correspond to elements within a storage-based XML formatted text file.

The Graph View may provide debugging facilities for nested or hierarchical groupings of filters, such as BlockZ, described below. In this case, the background of the workspace might be filled with a different color than the default (gray) to distinguish the modes. In some applications, when there are multiple possible input values into the encapsulated group of filters, the Graph View could show a list of these possible input values so the user can select an input value to debug in the sub-system.

3.8. Blockz

A BlockZ is a programmed filter structure that, when executed, is configured to perform routine tasks related to authoring a digital design of a customizable asset. For the clarity of the disclosure, a BlockZ is sometimes referred to as a block. A BlockZ is an encapsulation of filter processing, as described previously, with inputs and outputs defined by the user.

3.8.1. Blockz as a Filter Structure

Blocks are inherently complex because they are usually configured to perform complex authoring tasks. The complexity of a typical BlockZ may depend on a variety of factors. One of the factors may be the type of the tasks which the BlockZ can perform.

A block may be configured to perform a series of complicated tasks, and a set of blocks may collectively form, for example, filters. The tasks may include the processing of an input image to detect markups embedded in the image and the collecting of the information about, for example, the markup from the image. Another, or the same filter, may process the input image and identify a set of key-value pairs associated with the image.

In the context of a BlockZ, a simple key-value pair captures an attribute of an input image. It may be understood as an association between a key (e.g., a word "color") with a color value (e.g., an RGB representation of a particular color). Another simple key-value pair may be understood as an association of a key (e.g., a word "texture") with a value (e.g., a texture identifier). The key-value pairs are described in detail later.

A particular block may be configured to perform complex processing of, for example, an input image to identify multiple key-value pairs that define the colors represented in the image, to identify the key-value pairs defining the textures represented in the image, and so forth.

From the architectural point of view, multiple blocks may be organized in a hierarchy of layers of the blocks, and the hierarchical organization of the blocks may be used to control the processing performed by the multiple blocks.

3.8.2. Consolidation of Filter Sets

Some blocks may be executed sequentially, other blocks may be executed in parallel, while yet other blocks may be executed in a hybrid configuration.

In some implementations, a hybrid configuration of multiple block blocks may include one block (or a block set) that acts as a master (or a main filter set), and that manages the other filters in the configuration. The master may be a computer program programmed in, for example, C++ or other higher level language.

Other block filters may be configured to execute the commands/tasks that are expressed in a high level language that corresponds to a level of abstraction expressed to communicate with commands in a lower level language such as the data flow language. Hence, the block filters may be viewed as a higher layer of programmed structures that are configured above the lower-layer-structures expressed in, for example, eXtensible Markup Language (XML) or other data flow language.

The block filters collectively form a control system configured to manage the filters and sub-filter sets. They may be used to construct multiple automated filter sets configured to process digital images. The control system usually includes multiple sub-filter sets configured to perform individual processing of the input digital images or other inputs in the data flow of the software authoring system. The filters and sub-filters may be packaged into, for example, discrete XML files that can be called and controlled from a main filter set.

A markup language is a set of codes, or tags, that describes the text in a digital document. The most popular markup language is hypertext markup language (HTML), which may be used to format Web pages. The filter set may include multiple controls that are embedded in the XML files and that are the control points for the processes that are executed in the individual blocks.

Typically, individual filters are used to construct filter sets that can be used by the authoring tools. An individual filter may implement, for example, fail state switches, if-else filters, and the like; all described later. The switches allow for if-else arguments and allow triggering and managing an image processing.

Some block filters may implement the processing of, for example, multiple key-value pairs stored in input images, and other aspects of the input images.

3.8.3. Failed States

A failed state is a state generated by a block filter and indicates that, as the filter processed an input image or other input, the certain processing performed by the filter has failed for some reasons. In this state, however, the filter does not abort the further processing of the input, but instead, the filter conveys, for example, a state indicator to another block in the flow of the blocks. For example, the filter may process and pass the information indicating the failed state information to the next filter. Thus, even though the processing performed by the filter failed to, for example, return an expected result, the filter itself does not fail and the processing (e.g., serial processing, parallel processing, or a combination thereof) of the image continues in the next filter or filters.

Suppose that the processing performed by one of the filters did not lead to a particular result or that the processing for some reason failed. In that situation, the filter may indicate to the next filter in the serial processing loop that a failed state was encountered. (The loops are described in detail later.) That, however, does not stop or abort the serial processing loop. Instead, the next filter (or filters) continues its corresponding processing. Stating differently, the failed state allows the individual filters to fail without interrupting the flow of information or data processing from one filter to the next.

A failed state is different from an error state in that processing continues when one or more filters fail, whereas an error stops the data flow at that point. The author of the process can specify whether certain results are considered failed states or errors.

3.8.4. Fail State Switching

In this context, a failed state switching means switching the context for continuing the processing on the input image. The switching allows each block, which is part of the controlled mechanism, to be turned on or off as the filter continues its processing of the provided input.

Suppose that there are ten blocks within a filter set. The filter set may be constructed with one or more decision blocks that are used to determine which lower-level-blocks are to be executed. For instance, one of the decision blocks may determine that, if that block has failed, then the further processing may be handed over to another block from a group of the lower level blocks.

The processing on an input image may include multiple operations, and some of them include determining which operations are to be performed on a particular input image and which operations are not to be performed on the image. For example, there might be a reason to turn some of the filters off, and have some other filters enabled to perform the processing on the input image. Turning the filters on or off (i.e., switching between the filters) may be implemented in the main blocks (i.e., the control blocks). The implementations may include setting the switches in the configuration files of the filters. This may be done in advance, as opposed to having that done during the runtime.

Suppose that a system of blocks includes a particular block that is configured to generate a background image for a RealView of an asset. However, suppose that when a particular asset is specified, but the background is not specified. Therefore, the particular asset does not have an associated background image. Hence, for the purpose of processing the image associated with the particular asset, the particular block, configured to generate a background image, may be turned off in the block configuration to cause the particular block to bypass the processing of the background.

3.8.5. Block Control Cluster

One or more block filters may be grouped into a block control cluster. Each of the individual blocks may implement certain controls for the processing flow. Therefore, for a given input image, the processing flow may be controlled by the block filters in the block control cluster. Controlling of the processing may be implemented using switches implemented in the blocks.

When a particular switch is turned on in a particular block, then the particular block performs the processing implemented in the block. However, if a particular switch is turned off in a particular block, then the particular block does not perform the processing implemented in the block. The intelligence implementing the decision process as to whether to turn a switch on or off may be encoded in the associated configuration file of the block. The configuration file may also be referred to as a specification file.

3.8.6. Complexity of a Block Cluster

Just as a block may be configured to perform complex processing of an input image, so can a block control cluster. Even if a cluster includes a set of relatively simple blocks, due to the complexity of the processing that the cluster is configured to perform, the cluster itself as a whole may be configured to perform the complex processing. The clusters of blocks may be configured to execute hundreds of individual blocks in the timely and controlled fashion.

3.8.7. If-Else Decision Points

Execution of blocks in a cluster is usually controlled using configuration instructions. The control mechanism may be encoded using the instructions written in, for example, C++ programming language. For instance, a cluster may include a main filter (or a control filter) that is configured to accept multiple inputs and, if one of the inputs indicates a failed state, then the filter may trigger the execution of the "else" branch of the cluster.

One of the novel concepts in this context is the "else" branch of the cluster. It is the novel concept in the block architecture because it introduces a loop functionality within the cluster to allow automatic iterations within the processing flow. Having the "else" branch in the cluster within the blocks allows for a discrete processing and branching at decision points to choose between multiple paths. The loops are described in detail later.

Multiple inputs may be provided to a runtime process implemented in a block cluster. Suppose that 10 images are to be processed using the same subroutine or the same blocks. Having the "else" branch in the cluster allows processing each of the images individually and according to the switches and discrete loops implemented in the cluster.

3.8.8. Streamlined Processing

Suppose that input is received. Suppose that the input has multiple parts such as multiple files, a series of strings, several numbers, several channels and so forth. Using the multiple-part-input, the selected blocks of the cluster may be executed on the corresponding parts of the input. This type of processing is also referred to as a streamlined processing. The processing may be executed for different inputs and for different assets.

Processing performed by the blocks of a cluster on an input image may be performed by the selected blocks of the cluster. The output generated by one block of the selected blocks may be provided to one or more other blocks of the selected blocks. The process may be repeated multiple times until a certain outcome or a certain condition is reached.

The processing may allow each of the selected blocks to process one or more parts of the input image. The processing may include applying so-called treatment to the image to generate or derive certain characteristics or attributes of the corresponding asset. The processing may also include applying the treatment to different portions or regions of the image to generate or derive certain characteristics or attributes for the particular regions of the image. For example, one of the selected blocks may process a particular region (or part) of the image to identify the key-value pairs, and based on the pairs, determine the colors of the color options associated with the particular region (of the part) of the asset.

Continuing with the above example, suppose that an input image is a Photoshop™ image and has six different areas, and each of the areas may be processed as a loop by the selected blocks of the cluster. In some implementations, the input may be processed to identify multiple layers of the input. The image may be processed to identify the layers of the image. Each layer may provide information about certain attributes of the input. The information derived from the layer of the image may be used to create a channel, which is described later. An example of a block is depicted in FIG. 2A5.

FIG. 2A5 depicts an example of a BlockZ. Typically, the blocks are configured to perform multiple discrete operations on the information stored for a particular image in an input image. Once the processing is completed, the resulting image may be opened in, for example, a Photoshop™ application. As shown in FIG. 2A5, blocks may be configured in a hierarchy of blocks. The hierarchy may have a root block 2A5100, a next layer blocks 2A5110 (referred to as a Control Input layer of filters that passes information from the top-level filter set into the individual BlockZ, for use by the subsequent filters), a following layer blocks 2A5120, and so forth.

As shown in FIG. 2A5, the application may show the image and multiple channels that capture the so-called controlled vocabulary portion.

Control vocabulary usually includes controls and other information generated during the processing of the area of the image. The vocabulary portion captures the controls used to control the blocks of a filter cluster during the processing of the image.

As described above, the processing of an input image may be controlled using a set of settings that allow, for example, looping the processing of the image; determining whether certain conditions are met; and if they are, selecting the blocks to further process the image through various and different channels and generating an output based on the information derived or determined during the processing loop. Hence, the processing of the input image loops over a set of filters or channels, which essentially form a fixed array of the selected blocks. The array of the selected blocks may be represented also as a list.

A list stored in a file or a file folder usually includes multiple filters, files and/or images. Selecting and executing the items stored in the list and that participate in the processing of a particular input is referred to as looping.

The controls and the filters included in a filter cluster may form so-called loops. The loops comprise blocks, links between the selected blocks, and the like. To control the cluster, controlling information is channeled from a main filter set into the selected blocks and then down into the individual filters and so forth in the cluster.

Control functionalities also refer to managing the changeable settings inside of the blocks and selectively automating the way the links between the selected blocks are traversed and the way the blocks are selected.

Each filter may have multiple settings and multiple switches. Depending on the output, which is expected to be generated by the filter, certain switches may be turned on, while other switches may be turned off. The settings of the switches allow navigating through the blocks in the cluster and allow selecting a subset of the filters used to continue the processing of the input image.

Usually, individual blocks are added to a group and linked in a filter set. Hence, the processing flow may be represented as a graph that on the top has a source input image; then the source image is provided into each individual block of the filter set, and each block in the set may receive its own input and generate its own output.

3.8.9. Example Data Flow Network Implementing Blockz

In some implementations, a data flow network implements one or more BlockZ. For example, the data flow network may implement a plurality of data processing modules configured to process, in parallel, input data and to generate output data.

A data processing module of the plurality of data processing modules may be configured to receive data of the input data and/or the output data. The data processing module may be further configured to evaluate the data to determine a type of processing for the data; generate, based on the type of processing for the data, result data of the output data; and transmit the result data to one or more of the plurality of data processing modules.

The one or more data processing modules may execute as one or more parallel threads. The execution of the one or more parallel threads may be optimized according to one or more optimization criteria selected based on one or more of: types of the input data, the plurality of data processing modules, or types of the output data.

The processing of the data, by the data processing module of the plurality of data processing modules, may include controlling a flow of the data based on one or more controlling functionalities implemented in the data processing module. The processing may also include routing result data to the one or more of the plurality of data processing modules according to the flow of the data.

In some implementations, the data flow network is further configured to determine a probability value that may indicate a likelihood of a success of the processing of the data by the data processing module. The probability value may also indicate the likelihood of success that the processing of the data by the data processing module succeeded.

The data flow network is further configured to determine whether the probability value that indicates the likelihood of success that the processing of the data by the data processing module exceeds a threshold value. In response to determining that the probability value exceeds the threshold value, the data processing module determines that the processing of the data has succeeded and transmits the result data to the one or more of the plurality of data processing modules to indicate a success state of the processing data by the data processing module. However, in response to determining that the probability value does not exceed the threshold value, the data processing module determines that the processing of the data has failed and transmits the result data to the one or more of the plurality of data processing modules to indicate a failed state of the processing data by the data processing module.

In some implementations, the probability value indicating the success is determined by executing the controlling functionalities implemented in the data processing module.

The processing of the data by the data processing module may include one or more of: determining whether a particular layer definition is present in the data, selecting, based on one or more criteria, a particular data processing module, of the one or more data processing modules, for transmitting the result data from the data processing model, or processing a plurality of key-value pairs included in the data.

3.8.10. Example Method for Processing Data Using Blockz

In some implementations, a method for processing and controlling a collection of data uses BlockZ. The method is configured to generate output using a dynamic system. The method may include providing the dynamic system; providing a control system having two or more data modules, the two or more data modules being communicatively coupled to receive collection data from the dynamic system and implementing a plurality of switches; activating the dynamic system to read and process the collection data received from the dynamic system; and using the two or more data modules of the control system, generating, based on the data collection data, output that satisfies the conditions set forth using the plurality of switches.

The method may also include executing a data module, of the two or more data modules, to invoke a plurality of filters; wherein two filters of the plurality of filters are executed in parallel.

The method may also include executing a data module, of the two or more data modules, to invoke a plurality of filters. In some implementations, two filters of the plurality of filters are executed in parallel.

The method may also include generating a graphical representation of the output and updating a display using the graphical representation. The method may further include manipulating the display while collection data continues to be received.

In some implementations, the method also includes executing a suspend function to pause generating, based on the data collection data, the output that satisfies the conditions set forth using the plurality of switches while the control system continues to operate.

The method may also include providing an interface having a communication port for communicating with each of the two or more data modules and defining a plurality of parameters for controlling the two or more data modules. The method may also include utilizing an event based trigger to initiate execution of a data module of the two or more data modules.

In some implementations, the two or more data modules are virtually formed using at least one or more of: JAVA, C++, object-oriented code, XML, or a computer code. The two or more data modules may provide displays in the form of at least one of: a textual form, a graphical form, or a multi-dimensional form.

In some implementations, the dynamic system is at least one of: a virtual system or a physical system.

3.9. Adding and Linking Individual Blockz in a Filter Set

BlockZ filter set may have control filters that cooperate with a main filter and that control a subset of data in an underlying processing subroutine. Processing performed by a cluster of BlockZ may include porting images and data inputs to, for example, a top level BlockZ. A top level BlockZ may be referred to as a top level filter. Image and data inputs can be provided into the process at the top level or within one of the BlockZ.

The controls can be managed and adjusted via, for example, a shotListConfig.xml file, using the authoring tools' interface, through exposed user interface (UI) components, or through variants embedded in the image files (e.g., Photoshop™ channel names).

A Photoshop™ channel may provide a few different ways that information within the blocks can be presented and/or adjusted. That may include presenting and/or adjusting the key-value pairs associated with, for example, an input image. Some of the key-value pairs capture the asset characteristics such as the asset's colors, shading, and the like. These characteristics need to be captured with a high level of accuracy to be able to provide the asset with a high quality. The key-value pairs are described in detail later.

Processing an input image, represented as a PDF file, may include parsing the PDF file and searching for the layout definitions included in the file. One of the novel aspects of the image processing approach is that the layers and the key-value pairs are linked and created dynamically. In sharp contrast, other approaches do not provide those capabilities.

For example, adding the rotation capabilities may be implemented on the fly, i.e., dynamically as the input image is processed. Other functionalities may also be added dynamically. For example, the scaling, shading, rotations, and the like may be added dynamically. Adding a variant that implements the rotation may be implemented by making the decisions during the processing of the image—instead of having that functionalities locked (i.e., hard coded) into the program code.

The variants described herein are flexible. Once defined, the variant allows providing the image specific values during the execution time. Thus, the particular values are not hardcoded in the variant itself. One example of providing that functionalities via the image specific key-value pairs as the replacements.

3.10. Blockz as Inherently Complicated Filter Structures

BlockZ may be used to create complex filters and complex filter sets. The usage of the BlockZ allows simplifying the inherently complicated filter structures used to represent a flow of multitude of routing tasks. The BlockZ may be used to build things easily and consistently and may allow automation of creating the streamlined and standardized filter sets for processing the input images.

Using the blocks allows automation in a more efficient and effective way than using manual approaches that rely on, for example, creating ad hoc filter sets, defining the individual names of the layers, and connecting the layers with the underlying processes.

3.10.1. Consolidation of Filter Sets

In some implementations, a subset of capabilities of the BlockZ-based platform is made available to external groups of users. That allows collaboration between the groups of users and teams. That, in turn, allows implementing the platform without having all teams to learn all details about the platform's processes. Furthermore, it allows implementing the logic and looping through the components' compartmentalization and failed states.

Decision functionality is implemented in the blocks, and the blocks implement the switches that facilitate the control flow of the processing of input images. Based on the outcome of a switch (true or false), the control flow is passed onto a selected other filter or the selected other filter set. Therefore, the control flow creates a mesh comprising blocks, switches and decision points that are involved in the processing of the input images.

3.10.2. Streamlined and Standardized Filter Sets

Figure 6:
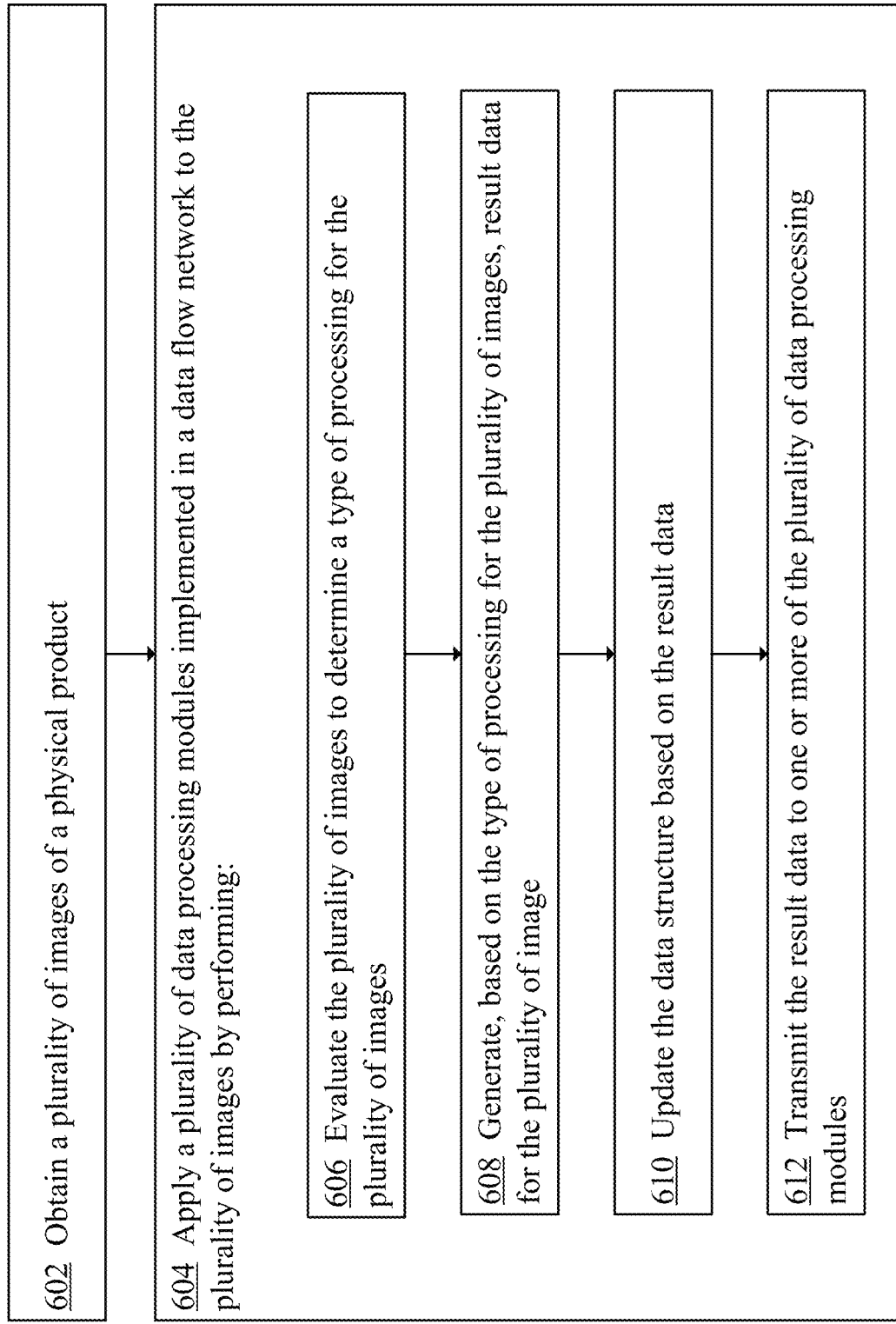
Figure 7:
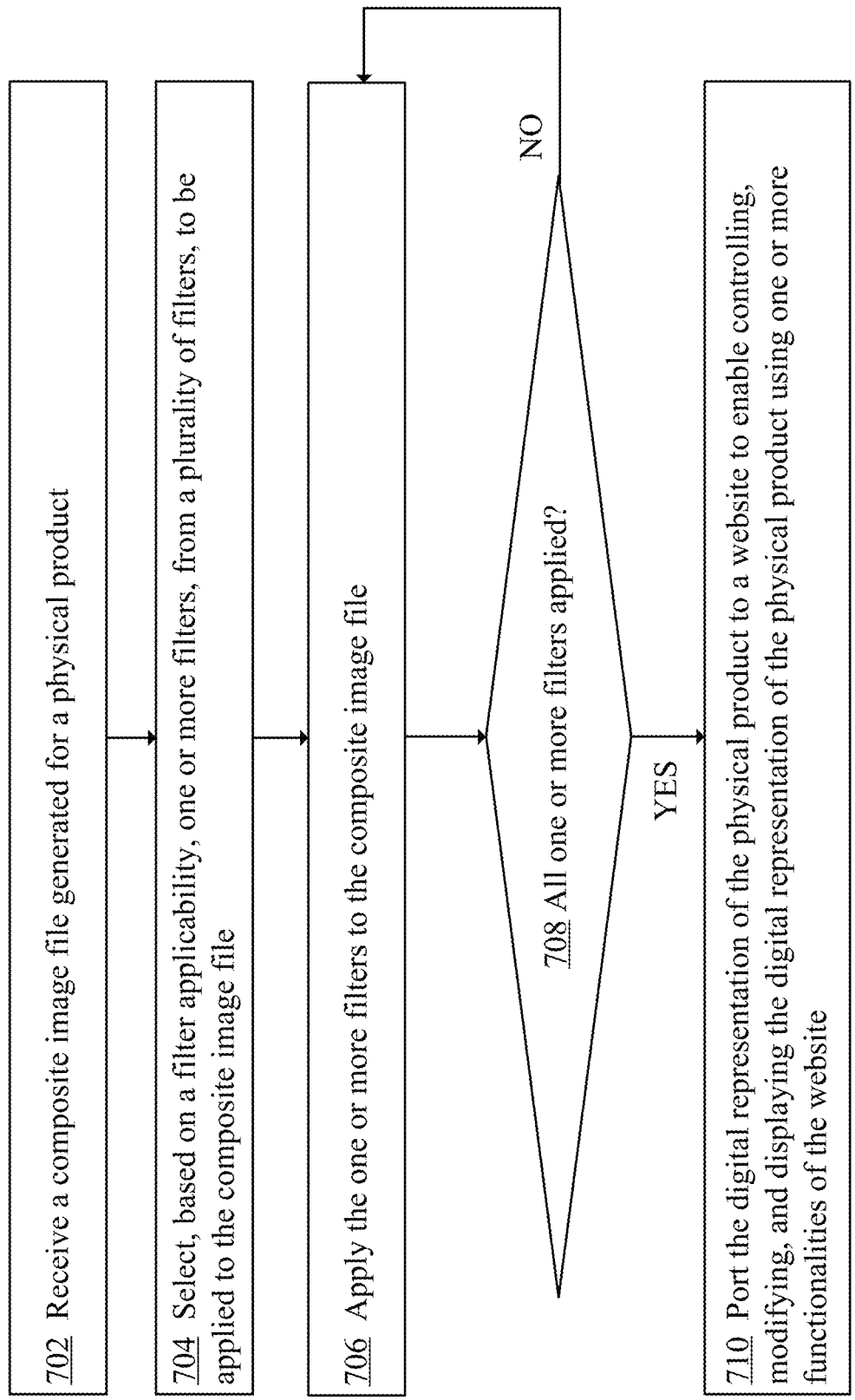

Each of FIG. 2A6 and FIG. 2A7 depicts examples of a BlockZ. As shown in FIG. 2A6, blocks may be configured in a hierarchy of blocks. The hierarchy may have a root block 2A6100, a next layer blocks 2A6110, a following layer blocks 2A6120, and so forth. As shown in FIG. 2A7, the hierarchy may have a root block 2A7100, a next layer blocks 2A7110, a following layer blocks 2A7120, and so forth.

Traditionally, in linear processing of images, if one processing component fails, then the whole processing of an input image fails. In sharp contrast, according to the approach presented herein, a failure of one processing component does not necessarily cause a failure of the entire processing of the input image.

According to the approach presented herein, the failure of a processing component causes the component to generate a failed state, and output, for example, information about the failed state, and thus relay the processing to other selected blocks. The processing continues despite the fact that some of the processing components failed.

For example, upon receiving a PDF file having information about an input image, or upon receiving a pattern file, a jpg file, a PNG file, a tiff file, a PSD file, or the like, the received input is ported into a runtime processing. During the execution time, the processing reaches decisions based on the content of the input and determines how the processing should continue and proceed.

Multiple filter sets may be designed to handle, for example, replacing a background color or not replacing background color. Based on, for example, the failed states generated by certain filters within a cluster of filters, the decision may be made whether to replace the background color, or not. Indeed, encountering a failed state does not mean that the entire processing failed; instead, encountering a failed state allows redirecting or refocusing the processing into another branch of the processing in the filter structure.

3.11. Exposing a Subset of Capabilities to External Groups

In some implementations, some filters may be configured to perform the same, or similar, processing. The processing may include reading image data in different data formats, and generating output determined based on the corresponding processing.

The same filters may be used and utilized by different teams or groups of users. For example, one team may use the filters to perform some preliminary checks on the input image, while another team may use the filters to determine, for example, a color for the background depicted in the input image.

Certain categories of filters allow a user to specify inputs into a BlockZ process, for example, creating a specialized user interface on top of the user interface provided by the implementation itself. In some cases, a filter might have many inputs that an expert user might access, but the system allows the expert user to restrict specific users or cases to a subset of these inputs. A custom or specialized user interface may be provided for this restricted set of inputs. This might allow novice users access to the tools or reduce errors by limiting the input possibilities, among other benefits.

3.12. Loops and Looping

Filter sets are configured to implement multiple functional blocks. The functional blocks reduce and streamline the processing of input images and allow the innovative processing of the individual elements of the input images.

The control logic implemented in the blocks allows processing of the input images by iterating loops on the sets of key-value pairs captured in the input. The loops' inputs can be a list of filters containing the image, data files or a series of images' channels that can be provided to controlled vocabulary, as described above, or any set of objects within the system Any number of loops can be used to trigger the processing within a single filter set. The flexible logic can be used to create the complex, automated decision and processing flows.

3.13. Using Filter Sets in Dynamic Insitu Real Views

In some implementations, filter sets described above are utilized to support marketing efforts. This may include providing support for generating the marketing RealViews, described before. The implementations of the filter sets for the marketing purposes may be achieved by the means of collaboration between the product development teams and the marketing department.

The marketing efforts may include showcasing the products on, for example, a website and/or conducting marketing campaigns to promote the products showcased on the website. It is important, therefore, to showcase the different product lines and products on the website in the most attractive and appealing way.

Furthermore, it is important to showcase the product lines and the products efficiently, provide the depictions of the products in a near-real-time in terms, provide various viewing capabilities and options, and the like. To be able to showcase the products in such a way, the filter sets may be developed to provide the capabilities that the marketing team may utilize to launch successful marketing campaigns.

3.14. Translating Key-Value Pairs to Manufacturing Instructions

3.14.1. Spot Color Definitions—Foil Examples

In some implementations, a plurality of manufacturing instructions, capturing the details of the transfer film, is sent to a manufacturer who ports the instructions to, for example, a digital printer. An example of a digital printer includes a Scodix™ printer. The instructions usually capture all the details of the transfer film including, for example, the foil with a spot color.

Typically, for every single manufacturer, one usually has to provide the instructions that would provide the same color gamut reflected on the manufactured products. For example, it is desirable to have a magenta color represented the same on each manufactured product, to have a black color represented the same on each manufactured product, and so forth.

However, this might be something that would be hard to encode in a document that is usually sent to the manufacturers.

However, one can define a plurality of key-value pairs that would capture various characteristics of a custom product, including the color used to represent/depict the custom product. The color may include the magenta, black, rose gold, and the like.

To print, for example, an element of a custom product in the rose gold color, the process may include assigning a spot color name to a rose gold and assigning a hexadecimal representation of the RGB (or HSV or CMYK) which corresponds to the color representation in a specific color model.

Next, the process may want to ensure that the hexadecimal representations of the colors used by the product customization platform are synchronized with the color representations used by the manufacturers. One way to ensure that is to send the instructions to print a physical product according to the instructions including the color representation for a customized product according to the product customization platform, and, upon receiving the physical product, determine whether the colors on the physical product correspond to the colors on the customized product.

In FIG. 2B, a path (described later) is shown on the very right side of the figure. Suppose that a designer is designing a custom product as shown in FIG. 2B. The characteristics of the custom product may be captured in a corresponding plurality of key-value pairs, as described before. The paths capture the characteristics of the custom design. As described later, one or more filters may be assigned to the paths to generate manufacturing instructions, which may be transmitted to a manufacturer to manufacture a corresponding physical product. This may include, as shown in FIG. 2B, both the background image (in black-red-white colors) and the embellishment (in a rose gold color).

Printing tools used by a manufacturer may not necessarily be able to represent, in a physical product, the same colors as the colors of the customized product. For example, the printing tools may have a different color gamut, a different color gamma characteristics, a color "curve," a different color temperature, and the like. Hence, to represent, for example, an embellishment in a particular shade of a rose gold color, the manufacturer would have to ensure that the settings of the manufacturer's printing tools are indeed compatible with the settings on the product customization platform. Usually, however, that is not the case. Therefore, some corrections/adjustments on either the product customization platform side or the manufacturer side need to be made.

In some implementations, a plurality of key-value pairs for a custom product is translated into the manufacturing instructions, which are used by the manufacturer to manufacture a physical product (that should correspond to the custom product). Upon receiving the physical product, a comparison may be made to determine whether, for example, the color on the physical product matches the colors on the custom product. If they do not, then corrected manufacturing instructions may be generated and sent to the manufacturer, or the manufacturer may be instructed to calibrate their printing tools until they achieve the colors desired as shown in the custom product.

Suppose that a custom product has an embellishment in a rose gold color, but a physical product delivered by a manufacturer does not capture the rose gold color accurately. Certainly, a customer who ordered that particular custom product might not be completely satisfied if the received product does not have the color (i.e., a rose gold color embellishment) that the customer expected.

One way to solve the problem is to, for example, revise the manufacturing instructions, sending those instructions to the manufacturer that the manufacturer can use to hopefully manufacture a physical product capturing the rose gold embellishment accurately.

Another way to solve the problem is to, for example, communicate to the manufacturer that they were not able to match the color (i.e., the rose gold embellishment) accurately, and encourage them to do a better job matching the colors.

Another way is to adjust the settings for the colors on the product customization platform to the settings for the colors on the printing tools of the manufacturer so that they match. If this option is pursued, then, during a designing a custom product, a designer or a user will see the color gamut the same as the color gamut used by the printing tools used by the manufacturer. Referring again to the above example, using this approach, once the designer selected a particular rose gold color for a particular embellishment in this custom design, then that particular rose gold color will most likely be represented in a corresponding physical product because a plurality of key-value products corresponding to the custom product will most likely be translated to the manufacturing instructions that, once executed by the manufacturer, would cause manufacturing the embellishment in the desired rose gold color.

If this approach is pursued, then the color settings and the calibration of the product customization platform would be manufacturer specific. That means that changing a manufacturer for a particular custom product may involve changing the settings and calibration settings for the color gamut for the product customization platform.

3.15. Designing Process

3.15.1. Designing an Asset

In some implementations, a custom product may include, so-called, cutouts. A cutout may be, for example, an enclosed opening. An example of an enclosed opening was described before.

Figure 2D:
FIG. 2D depicts an example of a customizable product.

FIG. 2D depicts an example of a customizable product 2D1100. Suppose that a user is customizing a backpack and that the customization includes customizing a label that is to be attached on a front panel of the backpack and that has a first name and a last name of a person. Suppose that the customized label says "Samantha Johnson." Furthermore, suppose that the label is to be cut out from a particular substrate and all the cutouts, such as the enclosed opening in "a" and "o" of the "Samantha Johnson" label.

The cutting out the cutouts is sometimes referred to as a "weeding," i.e., removing a portion of the substrate that is enclosed. In practice, from the manufacturing point of view, cutting out a portion of the substrate may include removing, from the substrate a portion of the substrate, which in turn may include cutting, using a cutting device, a boundary of the cutout along the boundary and according to the instructions provided in the manufacturing instructions to the manufacturer.

However, this may be difficult to achieve. For example, the precision and tolerance imposed by the manufacturing instructions may not be compatible with the precision and tolerance of the cutting tools employed by the manufacturer. For instance, some cutting tools may not be configured to cut out openings that are smaller than 1 centimeter, and, therefore, they may be unable to cut out an interior portion of an "a" or an "o" in the "Samantha Johnson" label if the "a" or the "o" is smaller than 1 centimeter.

3.15.2. Generating Instructions to a Manufacturer

For at least the reasons outlined above, the product customization platform is expected to provide the precision and tolerance specification of the cutting tools used by a manufacturer. That specification needs to be embedded into the framework of the product customization platform and used to determine, for example, a size of the text that may be imprinted on labels and/or the products. Hence, if a particular cutting tool from a particular manufacturer is unable to cut out the openings that are smaller than 1 centimeters, then that information may be encoded in the customization option portal of the product customization platform so that a designer/user is aware of the minimal size of the labels that can be customized and personalized.

Another issue is automation of the process of removing the cutouts from a substrate from which the cutouts were cut out. For small cutouts, the process of removing the cutouts from the substrate is usually performed manually, and involves removing the cutouts with, for example, a pair of tweezers, a pair of scissors, or the like. However, in some situations, using the tweezers to remove the cutouts from the substrate is difficult, and certainly difficult to perform automatically. This, therefore, imposes additional restrictions and requirements on the customization options available via the portal of the product customization platform.

Figure 2E:
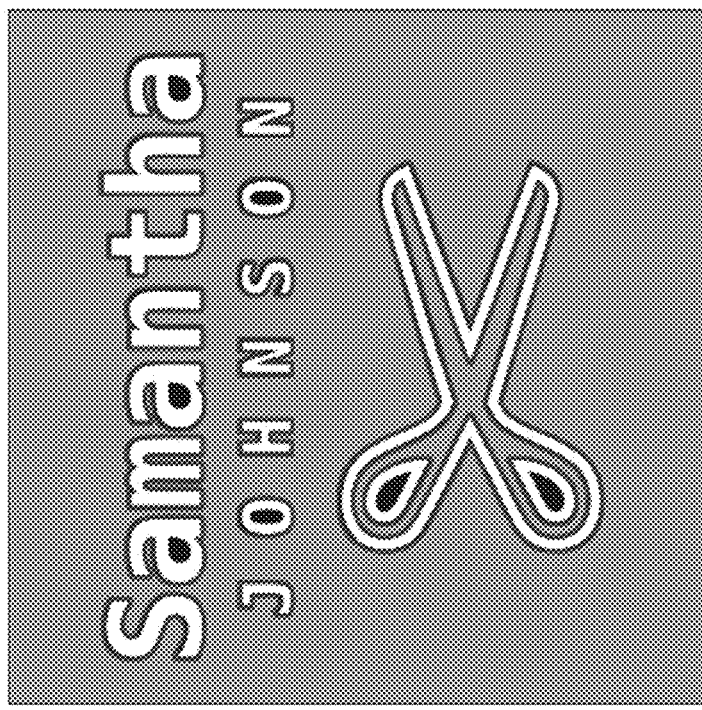
FIG. 2E depicts a print file definition to be sent to a manufacturer and a CAD cutout file definition to be sent to a manufacturer.
Figure 2E:
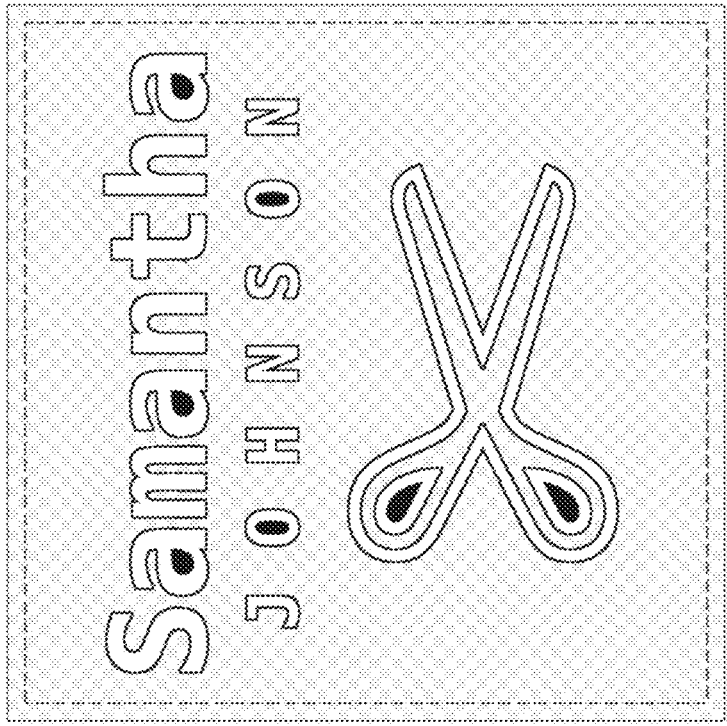
Figure 2E:
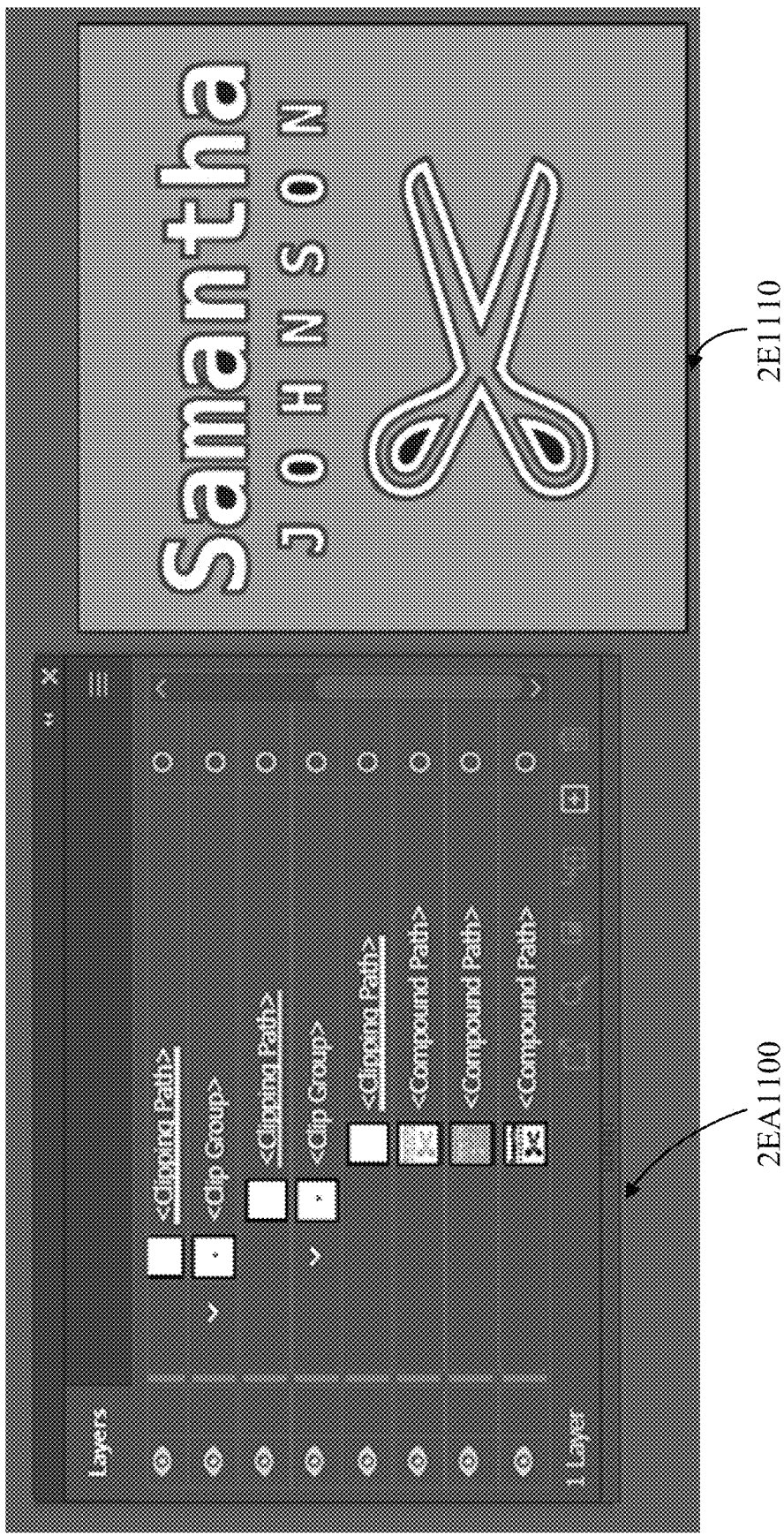

FIG. 2E depicts a print file definition 2E110 to be sent to a manufacturer and a CAD cutout file definition 2A1110 to be sent to a manufacturer. FIG. 2EA is a block diagram that illustrates CAD cutout file definition 2E1110 to be sent to a manufacturer and corresponding layers 2EA1100 describing the CAD cutout file.

In some implementations, the restrictions and requirements for cutouts are implemented in the product customization platform, and therefore, the manufacturing instructions for manufacturing customized products, having cutouts, include, among other things, the cutouts that may be indeed done by the manufacturer.

The specific instruction set for a printer used by the manufacturer encodes the paths used to represent the custom product in a particular way so that the printer, used by the manufacturer, can print a physical product as it correspond to the customized product, and so that the cutting device can cut out all the cutouts in the substrate so that the physical product corresponds to the customized product.

The manufacturing instructions sets are automatically generated in a unique way and are specific to the customized product. The manufacturing instructions sets are automatically generated as a high fidelity representation of the customized product. At the same time, the manufacturing instructions are capable of capturing the details of the customized product in the way that the manufacturer, responsible for manufacturing the physical product corresponding to the customized product, can easily port to the manufacturer's equipment, such as printers, scanners, and the like.

3.15.3. Example Process for Correlating a Manufactured Product with an Interactive Digital Design In some implementations, a method for correlating a manufactured product with an interactive digital design comprises receiving a physical product generated for an interactive digital design by a manufacturing entity based on manufacturing instructions. Examples of the manufacturing instructions were described before. Example process of generating a physical product is described later.

The method may also include correlating an appearance of the physical product, having a plurality of parameters, with the interactive digital design, having a plurality of corresponding parameters, to determine one or more visual differences between the physical product and the interactive digital design. Various examples of correlating the appearance of the physical product with the interactive digital design are described later.

The method may also include correcting, based on the appearance, the one or more visual differences between the physical product and the interactive digital design. The correcting the visual differences may include generating updated manufacturing instructions, providing correction instructions to the manufacturing entity, and the like.

In some implementations, the correlating of the appearance of the physical product with the interactive digital design includes detecting, using an imaging approach, one or more regions of visual differences between the physical product and the interactive digital design; constructing, based on at least the one or more regions of visual differences, a graphical representation of the physical product; and correlating the appearance of the physical product with the graphical representation of the physical product to determine the one or more visual differences between the physical product and the interactive digital design. The graphical representation may include a plurality of classified key-values that cause the one or more of visual differences in the one or more regions;

In this context, an imaging approach may be defined as using digital photographic images of physical product and comparing it to synthetic imagery of the digital product, using computer vision processes commonly known to one skilled in the art, such as those processes available in OpenCV, an open source computer vision software toolbox. Additionally, this may include techniques of constructing digital representations of physical product as described in U.S. Pat. Nos. 9,355,421 B2, 9,400,997 B2, 9,436,963 B2, etc. This may include, but is not limited to, detecting specific markup regions, and comparing color, geometry, and surface texture fidelity. More of these techniques are described later herein.

The graphical representation of the physical product may be constructed using a computational photography approach. The computational photography approach may include an in-camera computation of digital panoramas, a computation of high-dynamic-range images, and/or a computation using a light-field camera.

In some implementations, the computational photography approach comprises obtaining a plurality of images depicting the physical product; recognizing, in each image, of the plurality of images, a location, of a plurality of locations, of a particular marker depicted in the image; mapping the plurality of locations onto a plane grid; and referencing the plurality of locations in the plane grid to a corresponding markup depicted in the interactive digital design. The plurality of images typically depicts the physical product from different viewing points.

In some implementations, the correlating of the appearance of the physical product with the interactive digital design is performed automatically and by executing one or more computer programs on a computing device.

In some implementations, the correlating of the appearance of the physical product with the interactive digital design comprises using markups, depicted at least in the physical product, to verify locations of a plurality of red lines, green lines, and blue lines of the markups. A markup, of the markups, may be a two-color checkerboard pattern comprising a plurality of squares, wherein each square has a single color and each adjacent square has an opposite color.

In some implementations, the correlating of the appearance of the physical product with the interactive digital design comprises using a grid markup, depicted at least in the physical product, to verify locations of a corresponding grid depicted in the interactive digital design.

In some implementations, the correlating of the appearance of the physical product with the interactive digital design comprises generating a design view of the graphical representation of the physical product; and comparing the design view of the graphical representation of the physical product with a design view of the interactive digital design.

The method may further comprise determining the manufacturing instructions based on, at least in part, a plurality of classified key-values for each parameter, of a plurality of parameters of an interactive digital design, for manufacturing the physical product corresponding to the interactive digital design and causing the manufacturing entity to manufacture the physical product based on, at least in part, the manufacturing instructions. Each parameter, of the plurality of parameters of the interactive digital design, may be represented as a key-value pair of a plurality of key-value pairs. The plurality of classified key-values may be generated by classifying each key in a corresponding key-value pair based on its contribution to a manufactured appearance of a custom product to a group of a plurality of groups. The key-value pair, of the plurality of key-value pairs, may be a data structure that includes an attribute key and a corresponding attribute value, while the plurality of key-value pairs capture characteristics of the interactive digital design.

3.15.4. Example of Creating a Custom Wax Seal Stamp

Figure 2F:
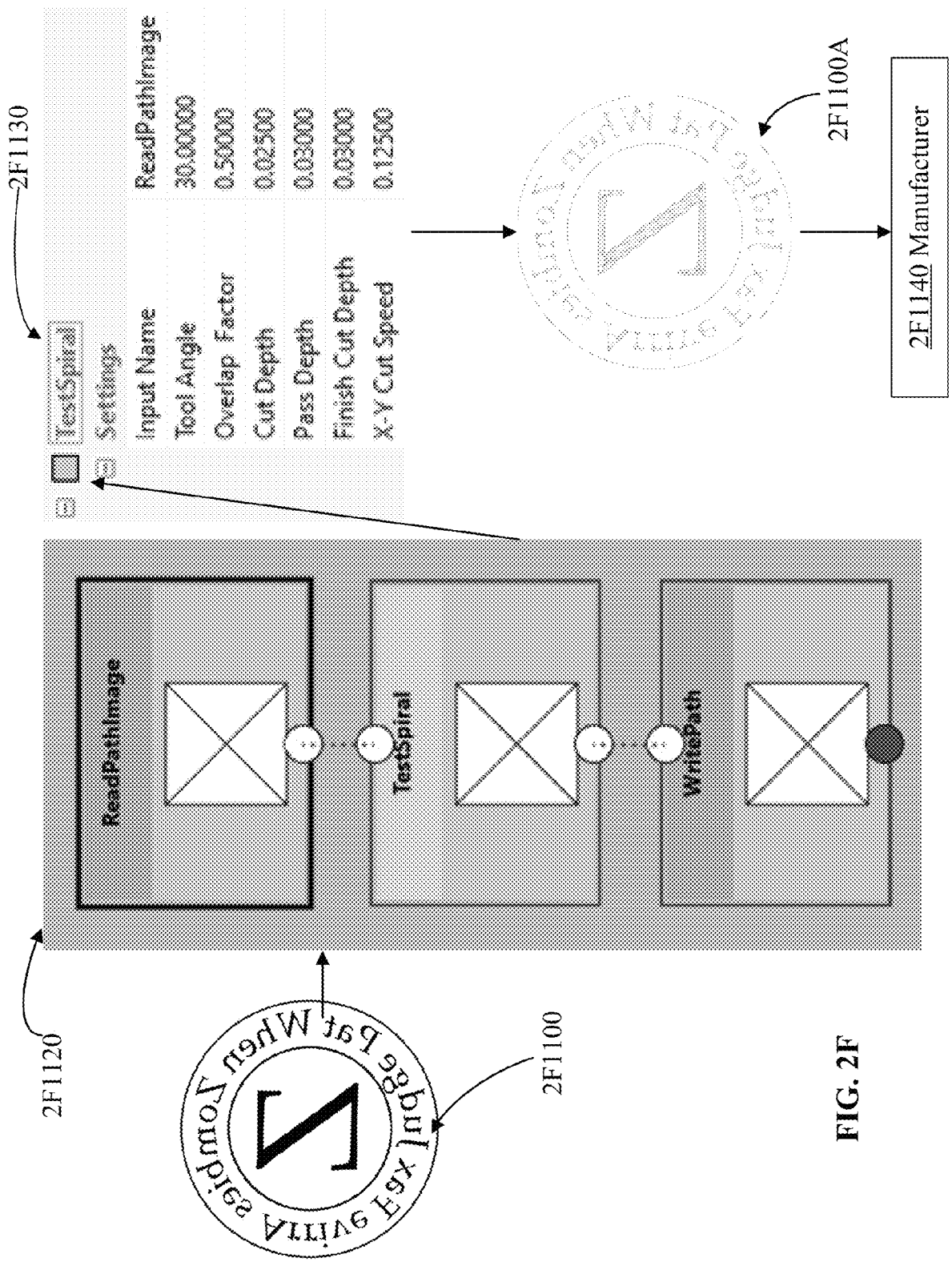
FIG. 2F depicts a set of filters and corresponding data structures for an example wax stamp.
Figure 2F:
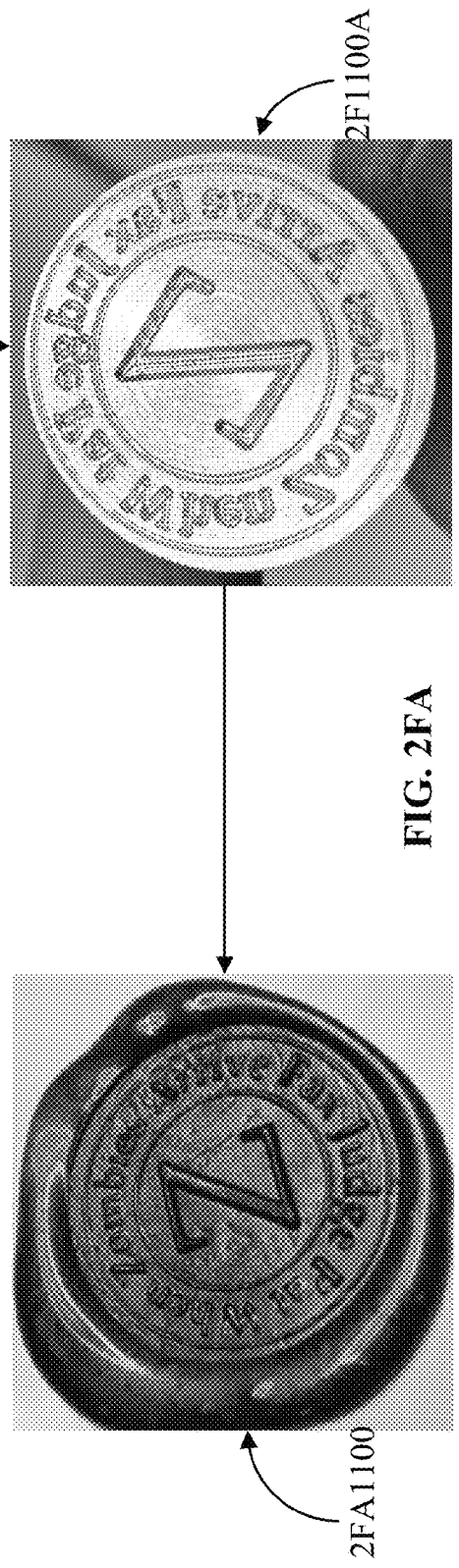

FIG. 2F depicts a set of filters 2F1120 and corresponding data structures 2F1130 for an example wax stamp 2F1100/2F1100A.

Suppose that a user designed a custom stamp 2F1100 that is to be manufactured by a manufacturer 2F1140 as a physical stamp 2F1100A that can be used to seal a wax stamp onto a letter or other documents. The custom stamp has a particular engraving embossed in a substrate made out of, for example, brass. The embossed engraving is designed to be made out of brass so that the stamp may use the brass engraved portion of the stamp to imprint the engraving on the wax that may be heated up, melted, and deposited onto the letter or other document.

While generating the manufacturing instructions for carving the upper part (i.e., the handle) of the stamp may be straightforward, generating the manufacturing instructions for manufacturing the brass portion of the stamp, and in particular, for manufacturing the engraved and embossed portion of the brass portion of the stamp may be difficult.

The difficulty in generating the manufacturing instructions for engraving the embossed brass portion of the stamp may be imposed by the specific shape of the engraved portion, the depth of the engraving, the corners of the engraving, and the like.

In some implementations, the product customization platform comprises the tools for generating manufacturing instructions that are configured to translate a plurality of key-value pairs, specific to a customized product, to a set of manufacturing instructions capturing the instructions which, when performed by the manufacturing tools, allow the manufacturer to manufacture a physical product corresponding to the customized product.

Referring again to the brass stamp, the tools of the product customization platform need to be configured to capture the engraved portion, the depth of the engraving, the corners of the engraving, and the like, and the captured characteristics need to be understandable by the manufacturing tools, and it needs to be possible for manufacturing tools to perform the manufacturing instructions. For example, the manufacturing instructions need to take into consideration the precision and the tolerance that the manufacturing tools of the manufacturer are capable of delivering.

Referring again to the difficulties with generating the manufacturing instructions for engraving the embossed brass part of the stamp, an embossing tool, such as a stylus tool configured to trace patterns and designs onto a surface of the substrate, usually has its precision and tolerance specifications. Those specifications need to be taken into consideration not only when designing the stamp, but also when generating the manufacturing instructions to be sent to the manufacturer. For example, if the stylus tool is unable to trace a pattern that has corners having, for example, a 10 millimeters radius, then that limitation should be communicated to the product customization platform, which in turn, should prevent designing the custom product that would include embossing the corners having a radius of 10 millimeters or less.

Another issue is capturing the color of the brass portion of the brass. The colors of the brass that may be chosen by the user may correspond to the colors of the brass that the manufacturer can manufacture in the physical products.

In terms of generating the manufacturing instructions for engraving the brass portion of the stamp, the instructions need to capture the characteristics of the path that the stylus tool needs to follow to engrave the brass portion in the way that the user intended in the custom product. The path may be represented in a 2D plane to represent the 2D dimensions of the engraving. The path may also be represented in 3D to represent not just the 2D dimensions of the engraving, but also the depth of the engraving, i.e., how deeply the stylus tool needs to engrave the pattern in the brass portion of the stamp.

In some implementations, the manufacturing instructions may be represented in, so-called, G-code. FIG. 2FA depicts a G-code file 2FA1110 to be sent to a manufacturer for manufacturing a cutout of an example brass stamp 2F1100A. FIG. 2FA also shows an imprint generated using example brass stamp 2F1100A imprinted on a seal material.

G-code, also referred to as RS-274, is based on a widely used computer numerical control (CNC) programming language. It is used mainly in computer-aided manufacturing to control automated machine tools. For example, G-code instructions may be provided to a machine controller (such as an industrial computer) to instruct the control how and where to move the machine tools, how fast to move to machine tools, and what path to follow, and the like. In some situations, within a machine tool such as a lathe or a mill, a cutting tool is moved according to the G-code instructions through a toolpath cutting away material to leave only the finished workpiece and/or an unfinished workpiece is precisely positioned in any of up to nine axes around the three dimensions relative to a toolpath and, either or both can move relative to each other. The same concept may also extend to non-cutting tools such as forming or burnishing tools, photo plotting, additive methods such as 3D printing, measuring instruments, and the like.

3.15.5. 3D Printing Example

Figure 2G:
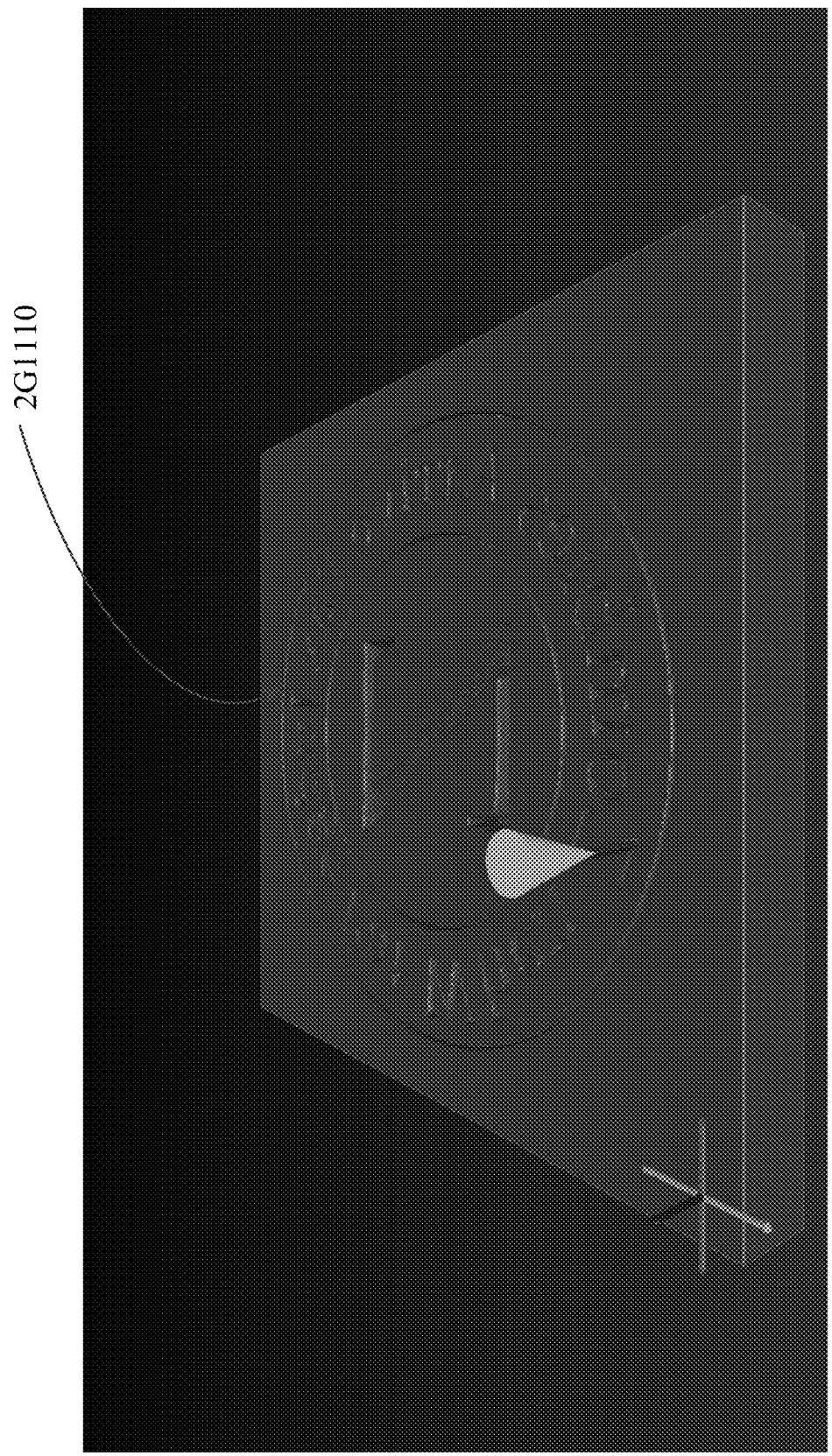
FIG. 2G depicts an example of a 3D printed object.

FIG. 2G depicts an example of a 3D printed object. Referring to FIG. 2G, to cut out an embossed part 2G1110 of the brass portion of the stamp, the product customization platform generates a set of manufacturing instructions that comprise the instructions for, for example, a stylus tool as to how to cut and engrave the brass portion of the stamp so that engraving looks exactly as in the corresponding custom product.

The manufacturing instructions need to take into consideration the limitations, precision, and tolerance of the stylus tool.

In some implementations, a 3D scan of the customized product, such as a stamp, may be generated before the manufacturing instructions are generated. Generating a 3D scan of the customized product may allow the user to visualize the customized product before a corresponding physical product is actually manufactured. Visualizing the 3D scan may allow the user to, for example, visualize the customized product in the views that might be unavailable using visualization tools provided by the product customization platform.

3.15.6. Bleed and No Bleed Issues in Designing Products

Full bleed printing is a way of printing a physical product where a design is imprinted on the product within a certain tolerance. The full bleed printing is based on an approach that has been long-used by printing companies to achieve a printing effect popular with customers. For example, to produce a full bleed 8.5"×11" color copy, the digital file needs to have the background extended to 8.75"×11.25". Once printed, a guillotine cutter will cut off 0.125" from each side of the color copy to the final dimension. This way the final product will have the printed portion of the product applied from one edge of the product to another edge of the product even if the printing device has an internal "shift" when executing the printing. Additional details of the bleed printing approach are described later.

In sharp contrast, no bleed approach requires that the printed portion is accurately aligned with the edges of, for example, blue lines depicted in the design. Hence, in the no bleed approach, there is very little, or not at all, tolerance for any shifting in the printing process. In this approach, the important content or part of the custom product is not cut off.

Some products, like color copies, mini posters, and bindings, provide options for selecting whether the product is to be printed with or without full bleed. Because full bleed printing requires larger sheets and more labor, the price of the full bleed printing is usually more expensive that no full bleed printing.

If a custom design has, for example, a white background, then there is usually no need for the full bleed printing. However, if the design should extend precisely to the edge of the sheet, then usually no bleed printing is used.

3.16. Example of a Bleed Case

Figure 2H:
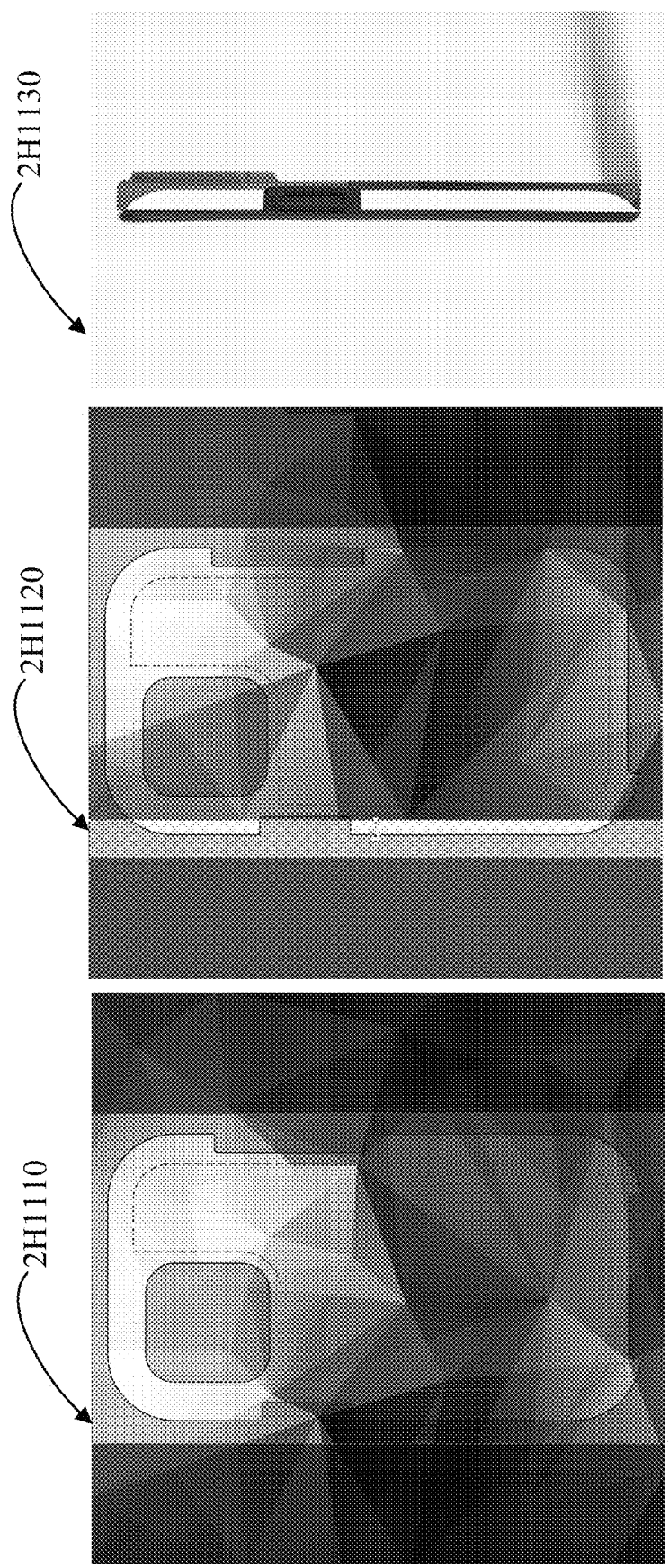
FIG. 2H depicts example bleeding cases.

FIG. 2H depicts example cases of full bleed printing. In a front view case 2H1110, a red-line represents a bleed line of the product, a blue line represents a visible area of the product, while a green line represents a safe area of the product. Suppose that a manufacturer shifted the design to the right, as shown in a front view case 2H1120. In this case, everything within the green line is still seen correctly. However, as shown in a side view case 2H1130, if the design is shifted, then a user would not be pleased to see the unembellished white edges of the object.

In the depicted example, a color transfer film fills in the entire white area of the design space. But one should notice a red line, a blue line, and a green line. The red line represents the bleed of the product. The blue line represents the visible area of the product, and the green dotted line represents the safe area of the product. The blue/visible is a representation of the area of the design to be printed. It is a direct representation of the shape, size, and dimensions of the physical area of a product onto which the design will be placed. There is no express guarantee as to what will actually appear along the edges. That depends on manufacturing tolerances.

Based on the three lines, certain promises are made to a user designing the custom product (and subsequently, based on the manufacturing instructions, certain instructions are provided to indicate to the manufacturer how the physical product is to be manufactured). For example, based on the three lines, a promise is made to the user that, in the manufactured product, the user will see everything that was enclosed by the green lines. Hence even if there were some manufacturing tolerances or printing errors in the print process, the user will see the content enclosed by the green lines of the design. Stating differently, no matter what happens during the manufacturing, if the content is within the green lines, then the user will see it. Hence, the content that is really important to the user, should be placed in the area that is enclosed using the green lines.

Another promise is that the content enclosed within the blue lines is to be seen in the physical product.

The content that is outside the red line most likely will not be shown. Hence, the content between the red line and the blue line may not be shown in the physical product.

Hence the user should be encouraged to define their designs in such a way that the designs are enclosed by the green line; if that is not possible, then in such a way that the design is enclosed by the blue line; but the design can go beyond the red line.

Basically, a user should be aware of the fact that the content depicted outside the blue area, under ideal printing conditions, will not be shown in the corresponding physical product.

The above promises and requirements are usually dictated by the precision and tolerance of the printing devices, such as a guillotine cutter. Due to the calibration difficulties for the guillotine cutters, it is difficult to guarantee that the cutter will cut the product exactly as the user would like it.

3.17. Wrap-Around Cases

In some complex products, the printed content may wrap around a designed shape. For example, if a user designs a cell phone case that has a particular color design imprinted on the outer part of the case, then the edge portion of the color design may wrap-around the phone case.

In this case, since the user might have spent a fair amount of time to figure out the design, the designer would also want to know how the design will wrap over the edges of the phone case.

Usually, determining a wrap for a 3D surface is a bit harder than determining green/blue/red lines for a flat design.

According to one approach, physical measurements of the phone case may be taken in advance to figure out how a 3D wrap-around would look. This will consider a certain number of deformations that could happen along the edges of the phone case. This may become even more complicated if the edges of the phone case are rounded, beveled, slanted, or the like. Some, or additional deformations, may include the design deformations inherent to the printing process, transformations in 3D to 2D space, and the like. Based on the measurements, a 2D model of the case may be generated, and the green, red, and blue lines may be plotted on the top of the 2D model. The lines may be visualized in the design view to allow the user to visualize the areas that are enclosed by the green lines, to visualize the areas that are enclosed by the blue lines, and to visualize the areas that are enclosed by the red lines.

In some implementations, once a source image is printed by the system and sent to the manufacturer and the product is manufactured by the manufacturer, a feedback loop can be created whereby the outlines (i.e., bleed, visible, and safe) can be adjusted in the system without any further manufacturer input (this is described in detail later).

3.18. Using Markups to Verify Locations of the Green/Blue/Red Lines

In some situations, this approach may be prone to some inaccuracies due to the fact that the approximations of the locations for the green/blue/red lines may be somewhat inaccurate. For example, some segments of the lines that should be horizontal may be represented by the segments that slightly deviate from the horizontal direction, or/and some segments of the lines that should be vertical may be represented by the segments that slightly deviate from the vertical direction. Therefore, the accuracy of the green/blue/red lines may have to be verified and corrected, if needed.

In some implementations, the location of the green/blue/red lines may be derived based on the markups imprinted on the product. Once the lines are projected onto the design, the location of the lines may be compared with the location of the markups to determine whether the process of deriving the location of the green/blue/red lines was subject to, for example, deformation, skewing, and the like.

By using the markups to verify the accuracy of the location of the green/blue/red lines on the design for the purpose of defining the imprint areas may be implemented as a closed-loop process and may be fully automated. For example, the process may be automatically repeated until the accuracy of the location of the green/blue/red lines and the boundaries of the corresponding markups is satisfactory.

Achieving a high level of accuracy with respect to the locations of the green/blue/red lines is essential in analyzing manufacturing constraints and, subsequently in generating accurate manufacturing instructions so that the manufacturer can manufacture an accurate physical product.

3.19. Examples of a No Bleed Case

Figure 2I:
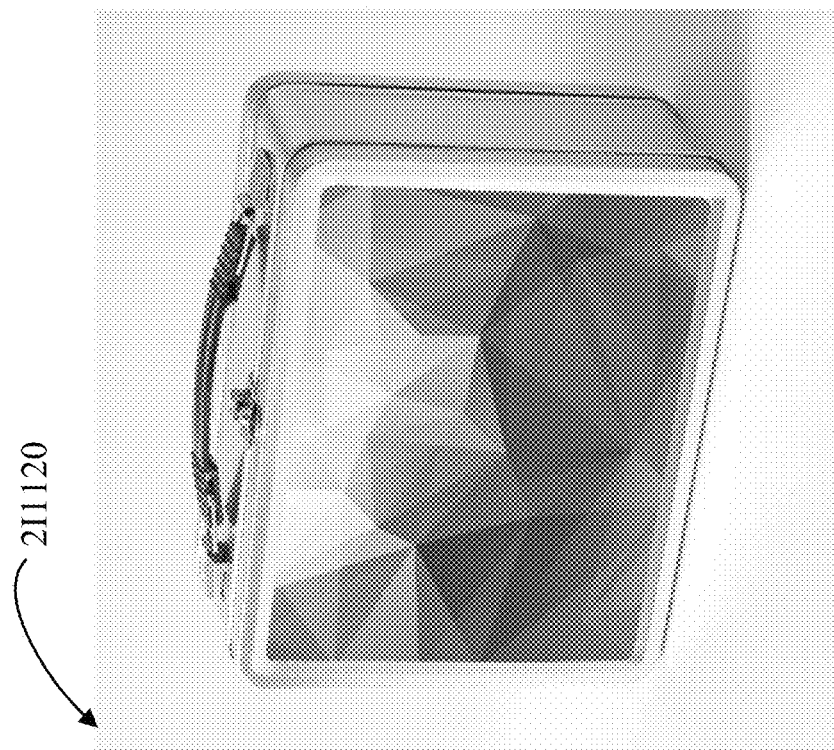
FIG. 2I depicts examples of no bleed cases.
Figure 2I:
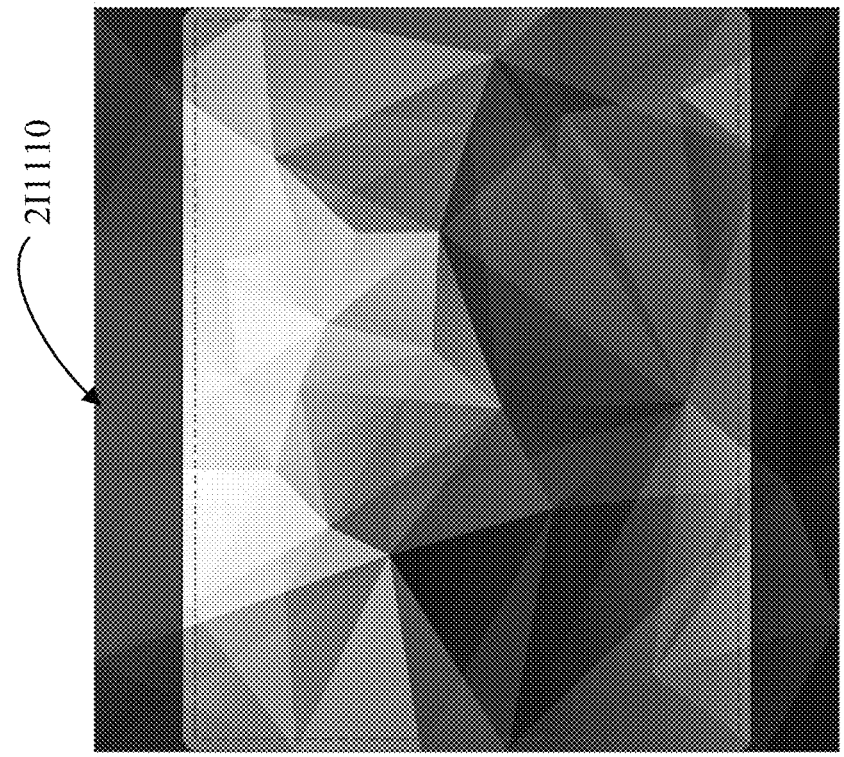

FIG. 2I depicts examples of no bleed cases 2I1110, 2I1120. Suppose that a user designed a lunch box, and the user wants to have a rectangular transfer film placed on the front side of the lunch box in such a way that each corner of the rectangular transfer film meets a corresponding corner of the front side of the lunch box precisely. Such a customized product is referred to as a no bleed product. That means that no portion of the transfer film may bleed, i.e., encroach beyond the boundaries of the rectangular area on the lunch box specified by the user.

Referring again to the lunch box example, the no bleed product is a product in which the bleed line and the visible line are essentially the same. Hence, the rectangular transfer film needs to be printed precisely within the enclosed blue area, and should not encroach beyond the blue area, i.e., the blue lines are the same as the red lines. Stating differently, the manufacturing instructions for manufacturing the corresponding physical product should be such that it would require that the manufacturer would never print outside of the blue area.

To be able to allow manufacturing the no bleed products, the product customization platform needs to obtain the manufacturing constraints from the manufacturing to determine how the no bleed areas can be set and needs to use those constraints to determine how to generate the corresponding manufacturing instructions for the no bleed products.

Similarly, to be able to allow manufacturing the products with bleed, the product customization platform needs to obtain the manufacturing constraints from the manufacturer to determine how the bleed areas can be set and needs to use those constraints to determine how to generate the corresponding manufacturing instructions for the products with bleed.

Suppose that someone designed a custom product (e.g., a lunch box) within the print area (showing a truck) of the lunch box that has no design that extends beyond the print area. There's nothing outside of the area, this is the only thing that manufacturers are going to receive whatever is in this box and, hence in this example, the entire print area is contained within that blue line and there is no bleed and there is no data that needs to be printed outside the blue line.

Figure 2J:
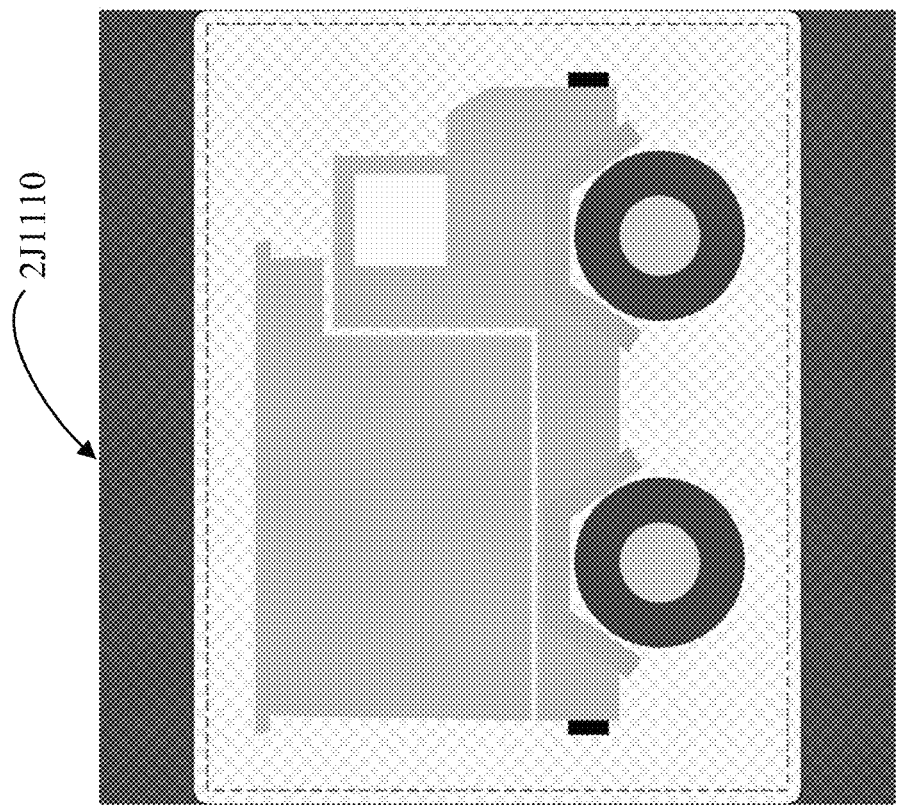
FIG. 2J depicts examples of no bleed cases.

FIG. 2J depicts an example no bleed case 2J1110. More specifically, FIG. 2J depicts a desired design effect. There is no red line (representing a bleed of a product). A blue line represents a visible area of the product. A green line represents a safe area of the product.

3.20. Grid Definition

In some implementations, a process for designing a customized product utilizes a grid definition. Typically, the grid definitions are included in the definitions of markup. In fact, the grid definitions are usually a subset of the markup definitions.

Markup definitions may include field markup definitions, dynamic markup definitions, the regular grids definitions, and the like.

Suppose that the design is a paper cup. A tile-based grid may be mapped onto the design. The grid may be a rectangular area, or a deformed rectangular area that is mapped onto the conical shape of the paper cup.

Suppose that a product is a flat product. Suppose that the size of the product is known. Because the size of the product is known, one can derive a plane onto which the design is to be printed. Subsequently, one can determine a grid that is mapped onto that plane. The grid may be used to define the shape, the color, and the size of the product.

Furthermore, suppose that the product has a border. The border may be considered as a separate component of the product. That separate component may be marked using an additional grid that may have a separate set of key-value pairs used to describe the components' size, color and the like. Therefore, pairs may be used to define the shape, the color and the size of the border of the product.

For example, if the substrate color for the lunch box is defined using the grid parameters (i.e., RGB color components, including the red, the green and the blue components), the grid may be used to define the shape, color, and size of the lunch box, while the border may be defined using the additional grid parameters (i.e., RGB components).

In the RealView (described later) of the product, the product may be represented using, among other things, the corresponding grids, capturing the shape, size and colors of the corresponding parts of the custom design.

A user may be provided with the capabilities to adjust or modify any parameters of any of the grids identified for the custom product.

3.21. Computational Photography Approach

Computational photography refers to a process for a digital image capture and for digital processing techniques that use digital computation instead of optical processes. Computational photography can improve the capabilities of a camera by introducing the features that usually are not available to traditional photography. Computational photography allows reducing the cost or size of camera elements. Examples of computational photography include in-camera computation of digital panoramas, high-dynamic-range images, and light field cameras.

For example, light field cameras may use novel optical elements to capture three dimensional scene information which can then be used to produce 3D images with an enhanced depth of field, and selective de-focusing (or "post focus") functionalities. Enhanced depth-of-field reduces the need for mechanical focusing systems.

3.21.1. Recognizing Colors Based on Markups

Figure 2K:
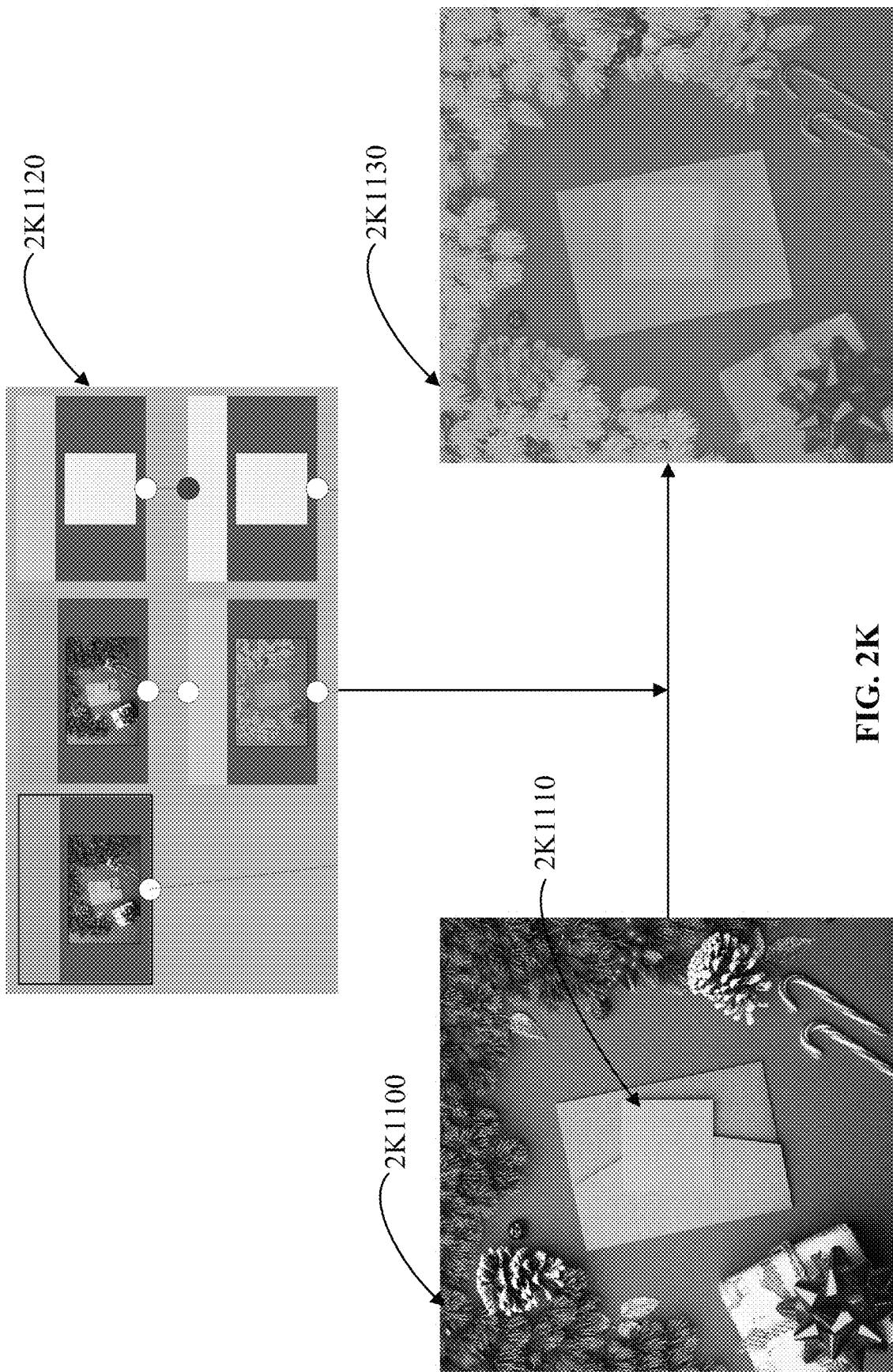
FIG. 2K depicts an example of finding and recognizing a color based on a markup.
Figure 2L:
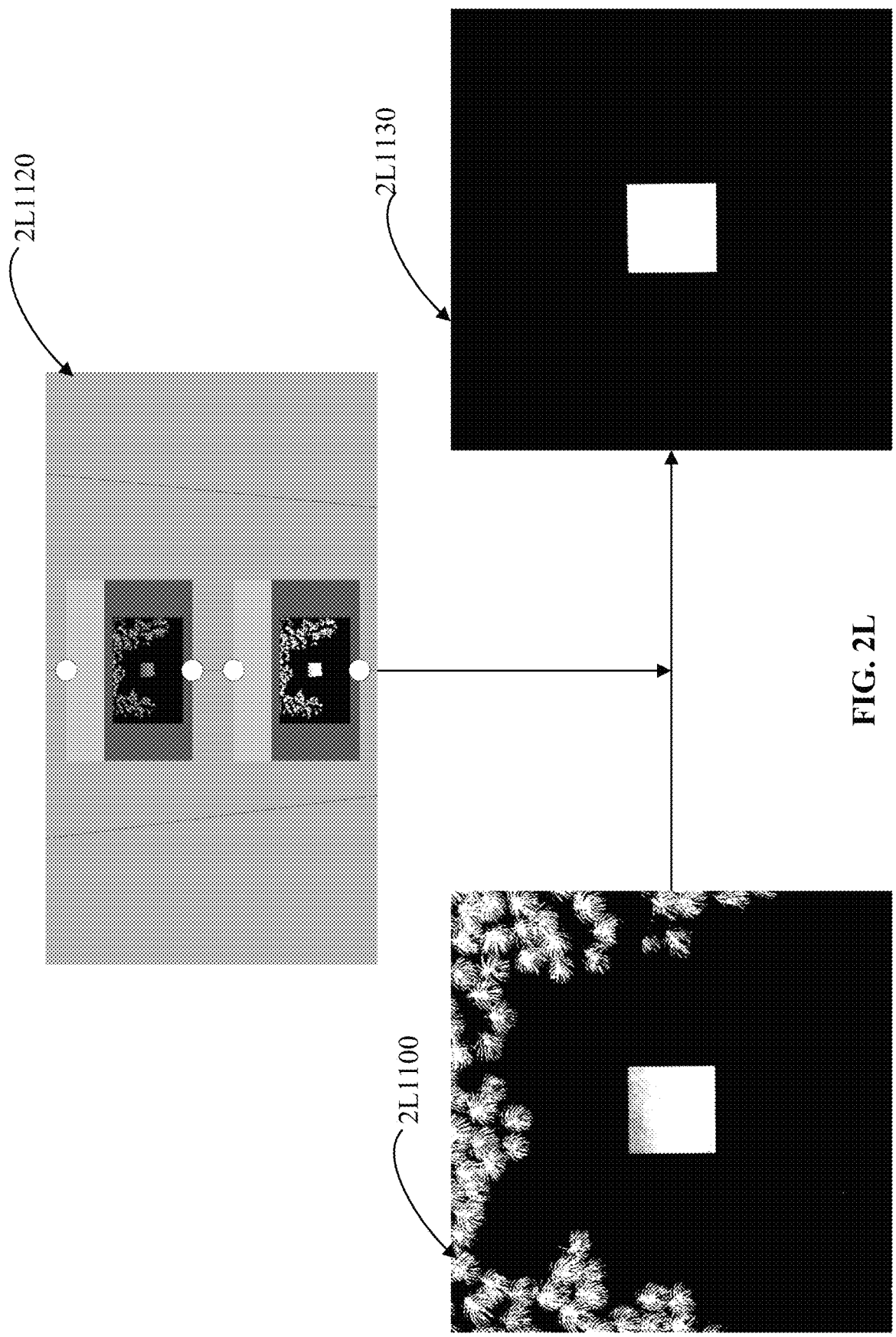
FIG. 2L depicts an example of finding and recognizing a color based on a markup.
Figure 2M:
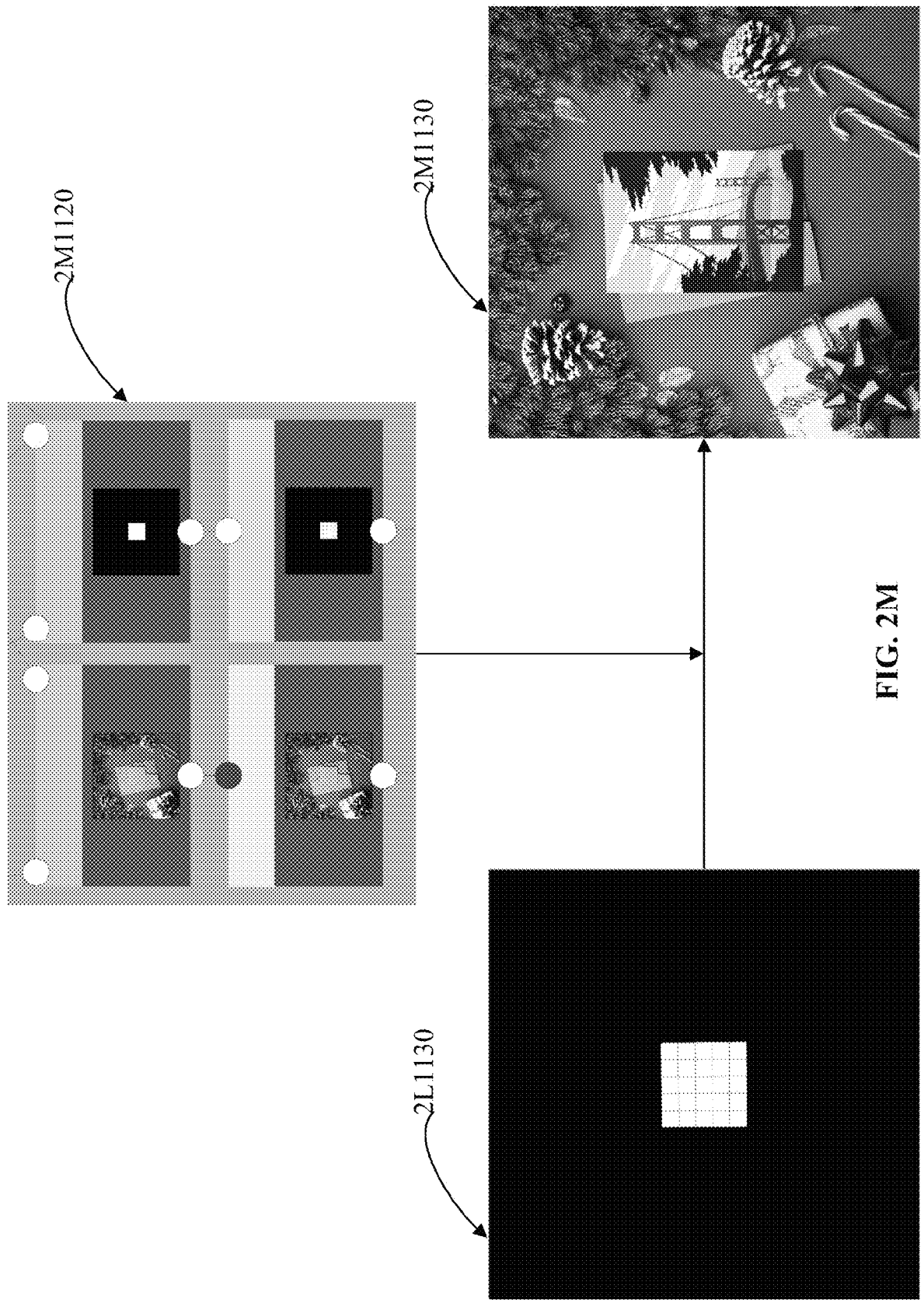
FIG. 2M depicts an example of finding and recognizing a color based on a markup.

Each of FIG. 2K, FIG. 2L and FIG. 2M depicts examples of finding and recognizing a color based on a markup. The depicted example is one of the examples of a scene that was captured using computational photography. It shows a base example 2K1100 of holiday imagery. Suppose that a user would like to place an individual five-by-seven invitation onto a space marked by a green marker.

In the first step, the computational geometry is used to recognize the location and the size of the green marker (i.e., a paper sticker 2K1110 shown in FIG. 2K) automatically. In the next step, the area is mapped onto a plane, and then a new card is placed at that location to replace the green marker.

This may be accomplished by applying a set of filters 2K1120 (see FIG. 2K) to generate an image 2K1130.

Then, image 2K1130 is processed by computational photography. This image is created by filtering the original image using a set of filters 2L1120 to obtain an image 2L1100 having a reduced number of colors. This process is part of the automated computational photography process.

Then, the green marker (which corresponds to green sticker 2K1110 shown in FIG. 2K) is identified and used to obtain an image 2L1130.

Image 2L1130 is obtained by finding the green marker. This is done by filtering image 2L1130 using a set of filters 2M1130, determining the location of the green marker, and then applying a set of filters 2M1120.

Further, the computational photography approach may be used to determine where the markup image needs to be cropped. Determining where and what to crop and defining a square crop based on the identified mask allows determining the size and the shape of the mask onto which the other image is to be pasted. The resulting image is an image 2M1130 in FIG. 2M.

In the next step, the mask may be cropped so that it matches the image which is to be pasted onto the portion of the original invitation.

In the next step, the direction, and the intensity of the light for the scene is determined. For example, if the original invitation is illuminated using a light source positioned above and on the top of the original invitation, then the corresponding direction and the intensity of the light in the scene needs to be emulated to determine the illumination effect to be expressed on the additional image to be pasted onto the original invitation.

The information about the lighting and other information can be mapped onto the resulting image automatically and dynamically. This may include determining the physical dimensions of the product, defining the exact size of the marker, defining the exact size of the additional image, and dynamically and automatically mapping the additional image onto the original invitation.

In some implementations, when a product has already been through the full authoring loop (as explained later), additional photography or assets may be created with data embedded in the assets that allow mapping of existing product information/data to the product, or products, in the new asset. The authoring process, as it is typically run, is for new products (i.e., the products that have not been ingested, photographed, processed, and added to the website yet) and is generally linear (with iterative loops at key steps).

There are several types of mapping: a planar mapping, a conic mapping, a geometric mapping, and the like. All these mappings are projections.

A planar mapping is a direct mapping that is performed using homography from a markup space to a plane or nearly a planar portion of the product.

A conic mapping is a mapping of a planar markup space by wrapping the markup around a conic surface without distortion or unwrapping a conic surface onto a planar markup space.

A geometric mapping is a mapping between each of a planar markup space, a planar design space designed to partially correct for distortions inherent in a geometric surface (such as the human form), and a 3d wrapped product geometry (such as leggings stretched around the human form).

In some implementations, there are three processes that include (a) adding additional photography, (b) "Dynamic InSitu RealView", and (c) ZigInline. Collaboratively, these processes receive, as input, the end products of the original authoring process and use the assets (i.e., the imagery) or data as inputs to create new output with the authoring tools. The output generated by the authoring tools may be used as inputs to other filters, which in turn, may generate new outputs.

The mapping may be performed in many different ways. One way is to map the additional image onto the original invitation in such a way so that the geometric center of the additional image matches the geometric center of the marker (i.e., the green marker shown in FIG. 2L).

The process may be more complex if the original design and/or the additional image have certain thickness. The computational photography approach may be used to resolve those issues. For example, a user wishes to place a picture of the President onto a teacup. The teacup itself may have a certain thickness, and so may the transfer film that depicts the President.

In such situations, a 3D object corresponding to the teacup and a 3D object corresponding to the transfer film may be built, and then the computational photography may be used to determine the location of the marker, perform the cropping of the marker, perform the cropping of the transfer film, and apply the resulting transfer film onto the original teacup.

There also may be situations where the marker is rotated with respect to the X-Y coordinates of the custom product and/or where the additional image/transfer film is rotated with respect to the X-Y coordinates of the custom product. In those situations, the computational photography approach is also used to perform the required rotations (and potential scaling) to achieve the result intended by the user.

In the next step, the resulting image is displayed in a designer view (described later) and/or a RealView (also described later).

3.22. Quick Response Codes (QR Codes)

In some implementations, a QR code, or a token, may be embedded in the design. The QR code or the token may capture the information about the design, the author of the design, the contact information of the author, the shipment ID, the shipment delivery time, and any additional information that may be related to the product or to the author/user/designer.

The QR code or the token may be also used to capture a plurality of key-value pairs or to point to a location in the cloud storage system where the plurality of key-value pairs is stored. For example, the QR code or the token may encapsulate a hyperlink to the location in the cloud system where the plurality of key-value pairs is stored. The hyperlink may also point to the location where some additional information, such as other products designed by the user, other images captured by the user, and the like) is stored.

QR codes are specified by the ISO 18004 standard and have a defined geometric structure. One application of this standard structure is to use it to determine the shape or form of the surface which holds the QR code. This structure may be transformed into a markup grid, or a portion of a markup grid to aid in intake, description, or further identification of a custom product.

3.23. Design Views

During the process of designing the asset, a designer may view an asset in various views, including a design view, a configurable image, and/or print view. The views are described below. Once the designer is satisfied with the design, the design will be placed in a print view, and will then be ready for manufacturing. The user may not actually see the print view, which is a combination of the user's design and additional data that are going to be sent to the manufacturer. The three views, i.e., the design view, the configurable image, and the print view, are generated by a subset of the internal tools, such as authoring tools, which are described later.

Before an asset can be customized, the asset itself needs to be designed. Designing of the asset can be facilitated using the functionalities of the internal tools, such as internal tools 16F shown in FIG. 1.

An asset may be designed using the functionalities of the internal tools, some of which are configured to generate a design view of the asset. An example design view generated for an asset is illustrated using the example of a custom-cut vinyl sticker depicted in FIG. 3A.

FIG. 3A depicts an example model 3A102 and an example of a design view 3A104 of an asset.

Using various functionalities available via the design view, a designer may design an asset in the form of, for example, a vinyl sticker. In the example depicted in FIG. 3A, a designer has chosen a depiction of a sunflower as, so-called, a cutout of the sticker.

The designer can add a text to be displayed as, for example, an overlay over the cutout of the sticker. In the example depicted in FIG. 3A, the designer added a text "Madison," and selected the font type ("Garamond Display"), the font size, the justification, the scale, the rotations, the flip options, the anchor option, and letter spacing, and the like. Of course, the designer may design other assets, use other options, and/or generate other depictions of different assets.

Designing an asset is usually performed by a designer or other user, both of whom are skilled and proficient in designing aesthetically pleasing objects that can be bought by customers. Upon completing the designing process, the output captures, so-called, a maker definition of the product. The term "maker" has traditionally been used to describe a company that manufactures a product. Hence, the maker receives a design created by a designer, while a customer buys the manufactured product.

A designed asset's information can be stored within the core services databases as a template, organized into a designer's store to be offered sale, and further customized by an end user (for example by changing a text object from a placeholder text to the end user's name) and then purchased.

3.24. Configurable Images

A designer (or a user designing the asset) may view the asset not only in a design view, but also in a configurable image (also known as a RealView). A configurable image is an asset visualization view in which the designer/user may view the asset from, so-called, a user's perspective. A graphical user interface (GUI) presenting the configurable image of an asset may provide functionalities that the designer may use to, for example, personalize the asset, select a size for the asset, select a finish to be applied to the asset, and the like. An example of a configurable image is depicted in FIG. 3B.

FIG. 3B depicts an example of a design view 3A104 of an asset and an example of a configurable image 3B104 of the asset.

Using various functionalities of a configurable image, a designer may personalize the asset and see it as available on a website. In the example depicted in FIG. 3B, the designer may, for example, personalize the text displayed on the top of the sunflower sticker, personalize the size of the sticker, and/or personalize the finish of the sticker (e.g., whether the sticker should have a matte white finish, or a glossy transparent finish, or the like).

A configurable image of an asset may be a view of the asset depicted in situ, i.e., in the natural or the original environment and/or the position or the place. Alternatively, the configurable image may depict the asset itself as isolated from the asset's environment.

A configurable image may contain information about, for example, the substrate that's used to create the asset, whether it has a white backing or whether it's glossy transparent. The configurable image can represent different sizes of the asset, and the visualization of the size of the asset in situ so that a customer may actually get a feel of how large the product might be in the given environment.

The GUI may allow displaying an asset using different configurable images, each of which may show a different arrangement of the asset in situ, a different perspective for viewing the asset, and the like. In each of those RealViews, a designer may personalize certain characteristics of the asset and fine tune the customization options.

3.25. Print Views

A next step may include generating a print view of an asset. An example of a print view is depicted in FIG. 3C.

FIG. 3C depicts an example of a configurable image 3B104 of the asset and an example of a print view 3C104 of the asset.

A print view may be generated based on a design view of an asset and may depict the asset as it can be sent to a manufacturer for manufacturing the asset. Generating the print view is considered a final stage of the process of designing the asset. However, the asset may be redesigned a few times, until the designer is satisfied with the appearance of the asset.

Subsequently, one may request generating a print file capturing the attributes and characteristics of the asset.

3.26. Print Files

A print file generated for a product captures attributes and characteristics of the product. The print file may be expressed in a pdf format, a png format, a tiff format, or the like, as long as a manufacturer is configured to process the print file in the provided format. Processing of the print file may include manufacturing a physical object corresponding to the product.

In some implementations, attributes and characteristics of a product may be captured using, so-called, key-value pairs. A key-value pair is basically a data structure that captures a key, i.e., a name of the attribute, and a value, i.e., the value associated with the key. To illustrate a simple example of a key-value pair, suppose that a product is a yellow sunflower and each of the attributes of the sunflower are represented using corresponding key-value pairs. One of the key-value pairs may include a key indicating a color of a particular petal of the sunflower, and a value may indicate an RGB value of the yellow color of the particular petal of the sunflower. Other key-value pairs created for the sunflower product may be different and more complex. Details about key-value pairs are described later.

In some implementations, a print file may capture not only the attributes of the product, but also some additional elements that provide a manufacturer with additional information about the product. For example, as shown in FIG. 3C, the depiction of the sunflower also may include an eighth-of-the-inch-wide border around the image that the internal tools of the platform have added to the design of the sunflower. The border may be added by the authoring tools and without any input from a designer. The border may not be depicted in, for example, a design view or a configurable image; however, it may be shown in a print view.

Referring again to FIG. 3C, the added border in print view 3C104 may allow a manufacturer to add a dynamic cut path around the design of the sunflower. This may be tailored to a specific machine that a manufacturer would use, and to specific features such as defining a spot color, defining contour cut paths that are necessary for manufacturing, and the like. The added border is usually added automatically and without notifying a designer about the addition.

3.27. Asset Definition from a Manufacturer

Before high quality renderings of an asset can be generated and used on a website, a test is usually performed to determine whether a manufacturer can indeed manufacture a product corresponding to the asset correctly and precisely. For simplicity of the description, the manufacturer is also referred to herein as a maker of physical products.

The test may include receiving an asset definition, applying, for example, a grid pattern to an asset according to the definition of the asset, sending the instruction to the manufacturer to manufacture the product corresponding to the asset and containing the grid, receiving the physical product having the grid imprinted on the product, and comparing the received physical product with the asset definition to make sure that the manufacturer is capable of producing the product according to the instructions generated from the asset's definition. The above steps are described below.

Suppose that a definition of an asset is received. An example of the asset definition is herein illustrated using an example of a paper cup, and it is depicted in FIG. 3D. The paper cup is used to illustrate some of the concepts related to the authoring tools; however, other assets and other corresponding definitions may be implemented in the authoring tools.

FIG. 3D depicts various views of an asset. In the example depicted in FIG. 3D, an asset is a paper cup, and the depicted views include different pictures of the paper cup. The depicted views include a view 3D100, a view 3D102, a view 3D104, and a view 3D106.

View 3D100 depicts an outer surface of a paper cup and includes a paper cup print area and outer blue lines. The outer surface in this example is also referred to as an outer wrap. The print area indicates the area in which a manufacturer can print. The blue lines are the outlines. The area between the blue and red lines indicates where the paper will be folded to form the paper cup.

Using the information about the shape and the boundaries of the print area shown in view 3D100, depicted in FIG. 3D, a user may use the authoring tools to print some pattern over the depiction of the asset. An example of the print pattern applied to the print area is shown in view 3D102. The type and colors of the grid pattern are not critical; what is critical is the fact that the pattern covers the entire print area.

View 3D102 depicts a print pattern in the shape of a grid image applied to the print area. That view, containing the grid image applied to the print area, may be sent to a manufacturer along with a request to actually manufacture an asset as depicted in view 3D104.

View 3D104 is a photograph depicting the physical asset that has been manufactured by the manufacturer according to the instructions corresponding to view 3D102. The asset shown in view 3D104 is an outer part (i.e., an outer wrap) of the paper cup. It can be gleaned from view 3D104 that the physical asset has a grid image applied to the print area and that the areas between the print area and the blue lines/borders are left white.

View 3D106 is a photograph depicting three physical assets that have been manufactured by the manufacturer according to the instructions corresponding to view 3D102. The assets shown in view 3D106 are actual paper cups; each cup is positioned differently than other cups. It can be gleaned that each of the physical assets has a grid image applied to the print area and that the areas between the print area and the blue lines/borders are left white.

In some situations, there is a need to unwrap the outer part of the paper cup and determine whether the unwrapped part (shown, for example, in view 3D104) matches the guidance depicted in view 3D100. This may include determining whether the actual outer part of the paper cup actually matches up the lines shown in view 3D100. This essentially amounts to verifying whether the guidance (shown in view 3D100) provided by the manufacturer has indeed been followed by the manufacturer when producing the corresponding physical cup (shown in views 3D104-3D106).

The verification process is important because if the actual product manufactured by the manufacturer does not meet the guidelines provided by the manufacturer, then the problem needs to be corrected before the actual orders for manufacturing physical products for customers may be sent to the manufacturer. For example, in some situations, the manufacturer may have some settings in, for example, their printers that cause a scaling or stretching or fitting or adjusting the grid image while the image is applied to the physical paper. These may cause some issues when the actual outer part of the paper cup actually does not match the lines shown in view 3D100. This needs to be corrected until the actual outer part of the paper cup actually matches up the lines shown in view 3D100. For example, the manufacturer may be contacted and requested to disable the settings that cause the image distortions.

In other situations, the manufacturer may have a different manufacturing process that the operators of the visualization platform expected. For example, if there are discrepancies between the physical product that the manufacturer has provided and what has been requested, then the issues need to be identified and the problems need to be, for example, reverse-engineered before they can be solved. This sometimes may require the operators to fully understand the manufacturing process before the problem is solved.

If the verification process does not produce a satisfactory outcome, then the processes described in relation to views 3D100-3D106 need to be repeated until the verification process is satisfactory.

3.28. Data Structures for Capturing an Asset Definition

Once the verification process for an asset is completed satisfactorily, a data structure corresponding to the asset according to the asset definition may be generated. An example layout of the asset and the corresponding components (e.g., layers) of the data structure are depicted in FIG. 3E.

3.28.1. Layouts and Layers

FIG. 3E depicts an example layout of an asset and an example of corresponding layers for the asset. A layout 3E100 depicted in FIG. 3E corresponds to a paper cup described in the previous example and has the same shape as the shape shown in view 3D100 in FIG. 3D. In particular, layout 3E100 includes the lines that correspond to the respective blue and red lines shown in view 3D100 in FIG. 3D. Further the size of paper and the like in layout 3E100 correspond to the size and so forth shown in view 3D100.

In the next step, the authoring application is executed to generate, based on layout 3E100, its own version of the asset. That version has the exact same size of paper, the exact same art board, the same shape, and the like asset shown in view 3D100.

In the next step, the authoring application is executed to allow drawing, on top of layout 3E100, the definitions that may be the most useful to the users/customers who would design, personalize, and otherwise customize the asset.

This step may include many sub-steps. Referring again to the paper cup example, one of the sub-step may include defining the areas that are going to be wrapped around to follow, for example, a conic path. Another sub-step may include defining the areas that need to be mapped straight across for elements that may be, for example, background elements like filigree or bubbles or a group of circles, or the like. This allows certain areas to be displayed in particular ways, but not necessarily as conformed to the conic shape.

Selecting the particular areas may include marking a corresponding PDF file containing the definitions of the asset shown in layout 3E100. The marking involves constructing layer names that specify paths, and then the corresponding paths, and the types of the paths. In FIG. 3E, different layers are shown in a layer area 3E102, and the examples of the layers include a front safe layer 3E104, a front2 safe layer 3E1106, a back safe layer 3ED108, and so on.

3.28.2. Illustrator Views

Layers and paths generated for an asset may be viewed in, so-called, an illustrator view. The illustrator view is a type of GUI that allows users to review the layers and the corresponding paths associated with the asset.

In some implementations, an illustrator view is generated by Adobe illustrator, which is a vector graphics editor and design program developed and marketed by Adobe Inc. Adobe Illustrator is the industry-standard vector graphics application that allows creating logos, icons, drawings, typography, and complex illustrations for a variety of media. It also allows capturing various shapes, color, effects, and typography. While the native file format (.ai) of Illustrator files is proprietary, illustrator also saves industry standard PDF (.pdf) files, which can be generated, displayed, and parsed by many applications, including the authoring tools described here.

Examples of layers generated for an asset and the corresponding attributes of the data structure associated with the example layers are depicted in FIG. 3F.

FIG. 3F depicts an example layout of an asset and an example of corresponding layers for the asset. In the depicted example, a view 3F102 of a layout 3F100 of a corresponding paper cup includes various layers, such as a front_blend layer, a front2_safe, a front2_visible, a front2_bleed, a back safe, and the like.

An example layer of an asset and the corresponding attributes of the data structure associated with the example layer are depicted in FIG. 3G.

FIG. 3G depicts an example layout of an asset and an example of corresponding layers for the asset. In the depicted example, a layer 3G102 of a path 3G100 has been selected to illustrate an example of the correspondence between the layer and the path. Layer 3G102 has a name "full_visible>0.827" and corresponds to path 3G100, which appears to be a closed-loop path, as shown in FIG. 3G. The depicted path is represented using the lines that are connected to form the closed-loop path, and that collectively represent path 3G100.

The above described example is provided merely to illustrate a simple case of the layout. More complex layouts may be created for, for example, cell phone cases with complex cutouts for the camera holes and the buttons and other components of the cases. In a cell phone case, a layout may include a single path that also considers all the cutout areas in the layout, and that may include the corresponding layer name, the type, and the like.

3.28.3. Layers

Each layer may encode multiple types of information, including geometry (the path shape of the area), colors, manufacturing information, and projections.

The names of paths like "safe," "bleed" and "visible" correspond to standard print industry terminology, used throughout the process from design to manufacturing. Hence, it is convenient to maintain the correspondence between the path names selected using the authoring tools of the visualization platform and the standard printer path names. Therefore, the path names used by the authoring tools usually have the same meaning as the standard printer path names, and therefore the path names are usually selected to correspond to the standard printer path names.

Other path names, such as "cut" and "fold" and "overprint" can provide specific manufacturing instructions for devices that can perform operations beyond printing. Typically, the devices process these instructions by parsing layer names, spot colors assigned to paths, and other hinting.

Printable areas with non-planar projections could also be specified as planar paths using this method. For example, an area with a fan shape could be processed by the software to map a flat image into a conic projection within the fan shape, to manufacture, for example, a cup or other product with conic shape. Other examples of non-planar projections include spherical, meshes, and other warped spaces.

In some implementations, there might be an extra layer of markup that can be used to define, for example, properties of specific areas in order to provide more natural user interactions with software tools or to provide instructions to manufacturers arranged in a way that is more efficient. For example, a content rotation could be specified to provide a user designing a particular paper cup with a user interface that presents a warped, rotated, or tilted area as a flat, normally oriented space, which is natural to design in. In this example, an image of a line transmitted to the manufacturer may have rotation (e.g., 9.814 degrees for the paper cup, as shown in FIG. 3G); however, to the designer, this is a straight line.

Generally, layers may be defined to consider any kind of rotations or counter rotations that a user would like to have available while designing the asset and to make the user's experience as pleasant as possible. The concept of defining different layers, some of which include various rotations, is specific to the authoring tools, and is transparent to manufacturers. The different layers concept is meant to enhance the user's experience and thus to increase the users and customers' satisfaction when using the visualization platform.

In some sense, the concept of defining different layers may be analogous to selecting a font in other applications. The font is usually selected based on its readability, convenience to use, clarity and the like. Similarly, the different layers may be designed to provide convenience, clarity, and ease of usability for the users who design, personalize, and customize the assets using the visualization platform.

Layers may also provide specific instructions for the software to generate manufacturing files based on the configuration described by the manufacturer, including overprint options, for example to expose the key-values associated with foil colors or specific properties of overprint areas.

3.29. Generating Data to Enable High Quality Renderings

At this point, it is assumed that a sample product provided by a manufacturer has passed a preliminary test because the sample of a physical product provided by the manufacturer matches the corresponding asset definition and that the data structures comprising layers and path definitions for the asset have been created. The next step, however, involves performing a more complex test, and it usually involves generating, by the authoring tools, a set of files and sending the files to the manufacturer that, in response, would generate a corresponding product that would be adequate for being photographed to obtain high quality renderings of the product. Such high quality renderings may be used to depict different views of the product on the website.

Generating a set of files for enabling high quality renderings of a product is provided to a manufacturer so that the manufacturer could provide a physical product that will be adequate for being photographed to obtain high quality pictures of the product. The standard used to determine the high quality of a picture is usually subjective; generally, a picture is a high quality picture if the asset depicted in the picture realistically and accurately represents the asset as it appears in real life.

3.30. Field Markups

In some implementations, to generate the above described set of files, a layout described in the above example is augmented by adding, so-called, a field markup. A field markup is usually generated to capture the exact specifications of the paths and the layers generated for and associated with an asset. Examples of markups have been disclosed in, for example, U.S. Pat. Nos. 9,852,533 B2 and 10,283,165 B2. Examples of layers and the paths are described in FIG. 3E-3G.

An example of a field markup applied to a layout of a paper cup outer surface is depicted in FIG. 3H.

FIG. 3H depicts an example field markup. In the example depicted in FIG. 3H, a field markup 3H100 was generated for a layout depicted in FIG. 3G and is mapped to a conic area that is larger at the top and smaller at the bottom. Field markup 3H100 follows the conic path of the layout.

In some embodiments, a set of files for enabling high quality renderings of a product includes a file that is a flattened representation of the layers of the asset and that can be sent to, for example, a printer for printing. The file should be fully understandable by the printer and would require no translation before the printer can execute the instructions included in the file. That means that, upon receiving the file, the printer does not need to decode any of the content of the file, does not need to rotate any content of the asset depiction, etc.; instead, the content of the file should be readily understood by the printer for the purpose of printing the asset image according to the instructions included in the file.

3.31. Filters

Typically, to generate a file for enabling a high quality rendering the authoring tools use as input the layout, such as the layout depicted in FIG. 3E, process the input using, for example, a filter set that ingest the layout, and generate the corresponding file. Examples of the filters are depicted in FIG. 3I.

FIG. 3I depicts example filters. The example depicted in FIG. 3I shows a set 3I100 of filters that are configured to ingest a layout data of an asset and use the layout data to generate a file that can be used to enable high quality renderings of the asset.

Each of the filters includes a set of executable commands and executing the commands in each filter causes traversing the paths defined in the layout and captures in the corresponding PDF file and generating the file that can be used to enable high quality renderings. Depending on the implementations, the commands may be executed sequentially or in parallel. More specifically, a ReadPathPDF filter may be used to read a PDF file containing a description of the layout.

A MakeProductView filter may be used to generate the instructions necessary for creating a design view of the layout, and for generating template files that can be downloaded to, for example, graphics applications such as Photoshop™, and used to create and display an image that would correspond to the layout.

A SaveAllPatternAssets filter may be used to save all patterns used to define the asset.

A ConfigPDF filter may be used to save the settings that are available for generating a PDF output so that when a manufacturer downloads this file, the manufacturer would be able to determine whether the images are being compressed, and if so, to identify a particular PDF compressor that is being used to compress the images, how the images are compressed, and the like. Further, the ConfigPDF filter may be used to define a level of compression for the images, specify, for example, dot-per-inch (dpi) settings for the images, and the like. Some of those settings may be overwritable by a user or other party. For example, a user may insert new values into some of the configuration parameters by, for instance, overwriting a 300 dpi setting to a 150 dpi setting, and thus the new dpi value to be used to construct the file for enabling high quality renderings.

Other settings may include color options (e.g., an RGB profile, a black handling option, a white handling option, and the like), page layout options (e.g., a rotation option, a flip horizontal option, a flip vertical option, and the like), optimization options (e.g., an auto raster option, a minimum line width, a no form option, a force raster option, and the like), and the like.

A LayoutMarkup filter may be used to allow to create the markup files necessary for photography and that can be used to specify the kind of grid to be used to map to a 3D object (described later), a red color value, a green color value, a blue color value, a white-black option, an invert colors option, a line size option, a line width, and the like.

In some implementations, a grid is mapped onto a 3D object so that the printed physical object includes the grid that then can be photographed and used to construct a corresponding mesh for the object.

The LayoutMarkup filter may be also used to save outlines that can be used to determine the visible outlines on the product, generate markup files which can be used to map any arbitrary image to the spaces that are defined in the layout, generate a field markup directly from running this filter in this the layout filter set.

Generally, a system of filters is implemented in such a way that each one has some specific function. Each filter has a certain function, accepts certain input, generates certain output, and handles certain image processing. The different filters may be graphically displayed in a GUI. Examples of the displayed filters are shown in FIG. 3J and FIG. 3K.

Each of FIG. 3J and FIG. 3K depicts example paths for example filters. In some implementations, the filter depictions may be color-coded, as shown in FIG. 3J (as shown using elements 3J100, 3J102, 3J104) and FIG. 3K (as shown using an element 3K100). However, the color-coding of the depictions of the filters is not critical to read, for example, a path in the PDF file; however, the content of the filter and the corresponding setting is important for creating the PDF file. The filters, as described before, allow converting the data into a certain format to define, for example, how big each area is, what kind of areas are present, and so forth.

Referring again to FIG. 3I, the red lines shown between the boxes representing the particular filters represent the direction in which the data is flowing. For example, the output from the filter ReadPathPDF may be ported to the MakeProductView filter, the SaveAllPatternAssets filter, and the ConfigPDF filter, and so forth.

Suppose that, in a relatively simple case, a PDF file capturing the layout of the asset is read by the ReadPathPDF filter. The reading of the PDF file includes converting the content of the PDF file into that data that represents the layout in the format used by the authoring tools. That data captures all of the information necessary to capture the layout. Then, that data is ported to the MakeProductView filter, the SaveAllPatternAssets filter, and the ConfigPDF filter, and so forth. The filters process the received data and generate output that is provided to other filters. For example, the output from the ConfigPDF filter may be ported to the LayoutMarkup filter that can be used to determine the visible outlines on the product, generate markup files which can be used to map any arbitrary image to the spaces that are defined in the layout, generate a field markup directly from running this filter in this the layout filter set.

Some of the filters may be executed sequentially (e.g., the ReadPathPDF filter is executed before the MakeProductView filter is executed), while other filters may be executed in parallel (e.g., the MakeProductView filter may be executed in parallel with the SaveAllPatternAssets filter and the ConfigPDF filter).

The filters contain instructions written in a data flow language, and the data flow follows the flow from the top (e.g., the ReadPathPDF filter) to the bottom (e.g., to the LayoutMarkup filter and the AttachLayoutFilter, as shown in FIG. 3I.

As mentioned before, certain parameters of certain filters may be edited and overwritten. The modifications of the parameters usually cause the changes in the property of the assets, and eventually in the appearance of the asset.

The examples provided above are simplified examples and are used to explain the basic concepts of the filters, the filters' parameters, and the data flow in the network of the filters. Real implementations of this approach include a complex data flow network comprising multiple complex filters sharing the data among each other according to various schemes and protocols.

3.32. Uniqueness of the Data Flow Network

The various features of the filters, such as the data flow language used to encode the tasks and processes of the filters and the different ways of interfacing the filters with each other, are combined in a unique way to allow generating a set of files that can be directly provided to a manufacturer that can port the files directly to, for example, a printer, to generate a product that meet all the criteria specified in the corresponding layout of the asset.

The unique combination of the filters and the integration of the filters to a block of filters allow using a PDF file capturing the layout of the asset and converting that PDF file into a set of files that can be understood by the manufacturer to manufacture the product corresponding to the asset.

The collaboration between the filters is implemented as a unique data flow network that corresponds to an actual true representation of the process that starts at receiving a PDF file capturing a layout of an asset and ends in generating a set of files that capture the layout of the assets in the form that can be directly provided to a manufacturer to manufacture a physical product.

3.33. Markups

Markups provide a means to capture, via photography or other methods of measurement, the relationship between symbolic areas (e.g., in the case of a shirt, the front, pocket, and back are symbolic areas) and the physical manifestation of that area, once the product is manufactured according to the established format and instructions. The symbolic areas in some implementations are defined in Layouts as named layers. When processed, a grid, checkerboard, or other form of measurable pattern can be sent to the manufacturer and follows the same production process that a customer's customized product follows. The resultant product sample can be measured to determine, among other properties, the scale, shape, and surface properties of the area on the physical product. One way this information could be used is to create a UV mesh to map an arbitrary image into a photograph of a product in a realistic way. The physical product can be measured from different viewpoints to capture partial areas.

In some systems, markups can be generated automatically based on information about the manufactured product. An example of such a system is described above (layouts), where paths and layers are encoded in a file that corresponds to the instructions needed to encode a file in a form useful to a manufacturer. If stored in an editable form, markups can be edited manually using software tools.

Products generated using markup techniques can, in some implementations, be used to verify the accuracy of the manufacturing and/or visualization, as described above.

Markups follow the manufacturing instructions already established for the product. For example, projections have been described as a property of different printable layers. Referring again to the example of a paper cup, in some implementations, a markup may follow a conic wrap, while in other implementations, a markup does not follow a conic wrap. Both types of markups are described below. Merely to provide simple examples, the markups that follow a conic wrap are referred to herein as conic markups, while the markups that do not follow a conic wrap are referred to herein as non-conic markups. The simplest markup is a flat (plane) markup that is applied to a flat product or nearly flat portion of a product surface.

3.33.1. Conic Markups

Referring to the examples described above, in some implementations, a field markup is generated in such a way that it conforms to the conic shape of the product, i.e., the markup is mapped across the layout to follow the shape of the layout and each grid cell of the markup follows the conic wrap of the outer surface of the exemplary paper cup. In this mapping, every single square in the top row of the layout of the field markup is aligned with the top edge of the layout, every single square in the bottom row of the layout of the field markup is aligned with the bottom edge of the layout, and so forth. An example of such a markup is depicted in FIG. 3H.

3.33.2. Non-Conic Markups

In some other implementations, a markup may be applied to a geometry that is neither flat (a plane) nor conic (cylinder or segment of a cone). For instance, the geometry may fit the human form, such as in a pair of leggings, or a form fitting shirt. In this case, the markup may be designed to allow a mapping to the design view of the embellishment, and also a mapping for the product view of the physical product. In this case, there are three distinct spaces and a mapping between each of them. The first being the flat geometry markup space, the second is the non-planar geometry for a design view, and the third the full three-dimensional wrapping of the product around the human form. For instance, this may be necessary for the design view to preserve the scale and linearity of text along the outside of each leg for a pair of leggings but stretch and fit to accommodate the continuous change of the leg shape.

In some other implementations, a field markup is generated in such a way that it does not conform to the conic shape of the product, i.e., the markup is mapped in a planar fashion upon the layout, even though it may be cropped by the layout and portions of the markup are unused. In these implementations, each grid cell of the markup is mapped straight across the conic wrap of the outer surface of the exemplary paper cup and without following the conic wrap of the outer surface of the paper cup. In this mapping, the squares of the markup are not aligned with the edges of the layout. In this mapping, every single square of the field markup is indeed a square from the top to the bottom of the field markup. An example of such a markup is depicted in FIG. 3L.

FIG. 3L depicts an example field markup. In FIG. 3L, a field markup 3L100 includes grid squares, and every single square is a square from top to bottom of the markup. The squares are mapped straight across without following the conic wrap.

If such a markup is sent to a manufacturer, then a product generated based on that markup would show the squares being deformed in the actual product.

3.34. Using Markups to Test Lighting Levels

Different types of markups may be used to test different lighting levels available on products provided by a manufacturer. For example, conic markups (i.e., that follow a conic wrap) and non-conic markups (i.e., that do not follow wrap) may be used to print the images to test the white levels, black levels, and various levels in between. The tests may be performed to make sure that the manufacturers can indeed generate products that have the colors that are specified in the files that are sent to the manufactures by the operators of the visualization platform and that the corresponding colors are represented accurately.

An example test may allow testing the white levels, the highest white levels and the darkest black levels and determining whether the actually manufactured/printed products have indeed the accurate colors. This type of test is performed to make sure that a manufacturer has the capabilities of representing the true colors. In some situations, however, the manufactured product may have the areas that are printed with the black color being completely dropped out, or with the white color being completely dropped out, and so forth. These flaws need to be identified and solutions need to be found. Examples of the different tests are shown in FIG. 3M and FIG. 3N.

Each of FIG. 3M and FIG. 3N depicts example field markups used to test lighting levels. A color grid 3M100 depicted in FIG. 3M corresponds to the scenario in which the markup followed the conic wrap, while a color grid 3N100 depicted in FIG. 3N corresponds to the scenario in which the markup did not follow the conic wrap. The color grids used in the above examples are also referred to as rainbow grids.

The test results shown in FIG. 3M and FIG. 3N may be used to infer how the colors are going to look on a final product. This is important because when the product is displayed in, so-called a configurable image (described later), it is important that the colors are represented accurately since if the product is purchased, a customer expect the accurate colors, i.e., the colors that the customer selected and liked and saw on the website, or at least close to those colors.

The color gamut shown in FIG. 3M and FIG. 3N are also used to test how the color in natural conditions would be represented on the manufactured products. This allows, for example, a designer to make sure that the colors on a designed asset are mapped onto the colors shown on a corresponding physical product as closely as possible.

While in some situations the lighting level test may not guarantee that the color grid will be accurately preserved, nevertheless, the test allows testing if the colors shown on the designed assets and the colors shown on the corresponding physical products correspond, within some level of accuracy, to each other. The value of the colors very much depends on, for example, characteristics of the printers, characteristics of the display devices, the temperature of the room in which the printer or the display device is located, and the like. Thus, the test may not account for, for example, differently calibrated display devices, different temperatures of the projection devices, and the like. However, the test is usually sufficient to create a relatively accurate user experience.

3.35. Using Markups to Test Sizes/Shapes/Proportions/Positions

Another purpose of performing the test described above is to make sure that, if the grid shown in FIG. 3M and/or FIG. 3N is mapped onto a physical product, then the product would look basically the same in the configurable image at the end of the process, i.e., the same as the designed asset.

To ensure that, if there are some discrepancies between, for example, a size, a shape, a proportion, and/or a position of the parts of the designed asset and the physical product, then there are some adjustments that can be made to correct those flaws. However, the tests described above are used to verify, and work with the manufacturer, that the sizes, shapes, proportions, and positions of the components of the designed asset correspond to the sizes, shapes, proportions, and positions of the components of the physical, manufactured product.

Once the operators of the visualization platform are satisfied with the results of the above described test, a set of files representing the designed assets is transmitted to a manufacturer along with a request to manufacture the corresponding physical assets.

3.36. High Quality Photography

3.36.1. Receiving Physical Products

Assuming that the operators of the visualization platform are satisfied with the manufacturer's capabilities to manufacture a physical product that has the same size, shape, scale, proportions, and the like, as a designed asset, the operators may transmit a set of files representing the designed assets to the manufacturer and ask the manufacturer to manufacture several samples of the corresponding physical product. Examples of some samples of a paper cup are depicted in FIG. 3O.

FIG. 3O depicts example physical products 3O100. The depicted example shows a set of samples of paper cups received from the manufacturer that the manufacturer produced based on the set of files capturing the layers, and other characteristics of the designed asset. As shown in FIG. 3O, some of the markups are depicted on the outer surface of the cups, others have the color grids are depicted on the outer surface of the cups, yet others are just white or gray, some others have some twisted patterns, and the like.

3.36.2. Taking Photographs of Physical Products

Assuming that the received physical product meets the quality levels set forth by the operators of the visualization platform, the next step includes taking photographs of the product.

The photographs of the physical product are usually taken using high-end and high-resolution digital cameras. The products are usually arranged in a special environment having a special lighting, a special ambient light, a special direct light, a special background, a special location, and the like.

Referring again to the example with paper cups, taking the photographs of the paper cups usually involves taking the photographs of the cups that have a grid imprinted on the cups and use those photographs as a reference. The product is usually positioned at the same place with respect to, for example, the edges of the table or the desk, so that depictions of the product in different photographs may be overlapped in such a way that the outline of the product in each of the photographs at least partially overlaps.

Taking the photographs may include taking multiple versions of the grid products. Having those photographs allows the operators to determine how to display the depictions of the product so that a user would be able to design an asset in a way that would allow the user to conform to either one mapping or the other mapping indicated by the corresponding grid product, based on the user's intent. Further, having those different photographs would allow the operators to determine how to display the depictions of the product so that the user would be able to generate the asset that can hold all the different areas and the corresponding layers simultaneously in a way that the layers were originally created and designed.

The next step includes verifying that all needed photographs have been taken and that all taken photographs have a satisfactory quality, and thus can be useful in the next step. In practice, a set of photographs is usually very large, and the size of the set usually depends on the complexity of the product, the number of finishes of the product, and the like. An example contact sheet of the photographs samples is depicted in FIG. 3P.

FIG. 3P depicts an example of a contact sheet 3P100. The contact sheet depicted in FIG. 3P illustrates that a tremendous number of photographs of a paper cup having the grid imprinted on the outer surface of the cup were taken. The different photographs may have different views of the cup, different shadings, different lenses, and the like. The photographs show all variations of the views and all the viewing angles that are important to representing the asset in situ on the website as realistically as possible.

The requirements for taking the variety of the photographs may be predicated on the requirements provided by, for example, a business team that may be focused on determining how the product may be showcased on the website, which views of the product may be of interest of the users, which views may be desirable to entice the customers to consider the asset for purchasing, and the like.

Sometimes, a product is showcased in several basic views, such as a front view, a left side view, a right side view, a back view, a top view, a bottom view, and the like. Other views may include a composition of several assets of the same type arranged in some attractive and interesting way, or a composition of the assets placed on someone's desk in various lighting conditions such as an early morning light, a sunset light, a winter scene background, a beach background, and the like.

Referring again to FIG. 3P, the depicted examples of physical products include, from the upper left corner, a blank versions of the cup, then moving to the right, there is a shot of just the silhouette of the cup, then a shot of the cup having a spirally wrapped black-and-white grid imprinted on the outer surface of the cup, then a shot of an orthogonally wrapped black-and-while grid imprinted on the outer surface, then different shows of the different mappings of the grid onto the cup, and so forth.

3.36.3. Composite Image Files composite image files can contain multiple area definitions representing multiple variations of printing techniques and processes, defined by multiple layout inputs supplied by, for example, a manufacturer, and contained in a single input file for the authoring tools.

All previously described types of markups (i.e., grid, digital, field, etc.) may be consolidated into a composite image file, creating a continuity of information encoded in the components that have a direct link to the manufacturing instructions.

It should be noted that in each photograph of the set, the product is usually positioned at the same place with respect to, for example, the edges of the scene, so that the depictions of the product in different photographs may be overlayed in such a way that the outline of the product in each of the photographs may more-less overlap.

3.36.4. Example Composite Image Files

A composite image file may be expressed in a PSD format, a tiff format, a jpg format, or any other format that can be understood by the authoring tools.

FIG. 3R depicts a composite image file 3R100. In some implementations, a composite image file is a layered Photoshop Document (PSD) image file and includes information about the components of the product and the product characteristic information reconstructed from the individual images of the composite image file. The composite image file may contain all of the information pertinent to the layers in a configurable image and the information about the channels and layouts of the asset in a design view. An example of a composite image file created for a paper cup, as described above, is depicted in FIG. 3R.

In some implementations, the layers are used to capture information about individual components of the images, while the channels are used to capture information about particular characteristics and/or components of the individual component image.

3.37. Example Process for Generating a Composite Image File

In some implementations, a method for generating a composite image file based on multiple images of a physical product comprises obtaining a plurality of images of a physical product. The method also includes applying a plurality of data processing modules implemented in a data flow network to the plurality of images to cause the modules to process, in parallel, the plurality of images and to generate a data structure that captures a composite image file of the physical product. The composite image file that captures the physical product is a combination of automatically processed photography and manually processed photography.

The processing of the plurality of images by a data processing module of the plurality of data processing modules may include evaluating the plurality of images to determine a type of processing for the plurality of images, generating, based on the type of processing for the plurality of images, result data for the plurality of images, updating the data structure based on the result data, and transmitting the result data to one or more of the plurality of data processing modules.

The data structure that captures the composite image file of the physical product is a layered image file that includes information about one or more components of the physical product and one or more characteristics of the physical product. The composite image file usually includes information about one or more layers expressed in a configurable image and information about one or more channels and layouts of the physical product in a design view. The composite image file may also include the information about the components of the physical product that has been reconstructed from individual images of the composite image file.

The evaluating of the plurality of images may include segmenting an image of the plurality of images, wherein one or more first images of the plurality of images are infrared images, while one or more second images of the plurality of images are 3D scans of the physical product.

The evaluating of the plurality of images may also include processing one or more of the plurality of images using one or more of: a computational photography approach or an optical approach.

The processing of the plurality of images by a data processing module of the plurality of data processing modules may include controlling a flow of data associated with the plurality of data processing modules based on one or more controlling functionalities implemented in the plurality of data processing modules.

In some implementations, the method also includes porting the data structure that captures a composite image file of the physical product to authoring tools to cause the authoring tools to generate a representation of the physical product. The porting of the data structure to the authoring tools causes an application of complex filters to the composite image file.

3.38. MFLOWZIGINLINE

MFlowZigInline is an example of a processing component (filter) that may be used to import files into the authoring tools. MFlowZigInline allows for importing, for example, Zazzle Internal Graphics (.zig) format files, as previously described. .zig files are files generated by the authoring tools and may be used, for example, by a design tool on a website, and by the Dynamic Marketing RealViews and other services, during the generation of configurable images.

.zig files may contain image resources, products, and image references (key-value information), geometry, product area information, and so on. When the mFlowZigInline filter is used in a data-flow process, all of the information contained in the .zig file (which was itself generated by a data-flow process) is imported into a data-flow process and can be available to the process.

Generally, there are multiple .zig files available for a product in the product asset library. MFlowZigInline may be used to import one or more .zig files into a data-flow process, which are then combined into a new .zig. This resultant .zig file may be a meta-file of a product or products selected from the product asset library.

As an example, mFlowZigInline may be used to import a single .zig file that may be used in multiple instances in a data-flow process to create a multi-part product such as a string of flags or bunting. MFlowZigInline may also be used to import a selection of files with a product in multiple configurations that can be used to create a stepped animation, like a flipbook. MFlowZigInline may also be used to create marketing imagery by importing a selection of .zig files of different products from the product asset library and arranging them in relation to, for example, a background image. The above processes may result in the creation of a new .zig file, which may contain all of the individual product's information that is specific to each product representation for each .zig file imported by mFlowZigInline.

.zig files may contain information of a digital version of a physical product, and its embellishment and manufacturing data. Being able to take a .zig file and arrange it within the context of another image (for example a background image of a table or an arranged display) or one or more .zig files is analogous to taking a physical product and arranging it in a store display. However, in this example the appearance, design, physical properties, and other information of a product, or products, has been defined in the core services and is being represented using a virtual representation created by the authoring tools and contained in a .zig file.

3.39. Layers, Channels and Paths in a Composite Image File

An example composite image file may include the information about the components of the product and the characteristic information of the product that has been reconstructed from the individual images of the composite image file. The composite image file may contain all of the information pertinent to the layers in the configurable image and the information about the layout of the asset in the design view. However, that information is reconstructed from the composite image file generated from the photographs of a physical product, not from the design view or the configurable image of the asset.

A layer in a composite image file may correspond to a component of the product (e.g., a lid of a paper cup), while the channels for the lid layer of the composite image file may correspond to the areas within the lid that can be personalized, customized, or otherwise modified. In some implementations, the paths shown are not utilized.

A layer and the corresponding customizable product area may be linked by the layer name or label, the index or ordinal number of the layer, or by markup or data embedded in the layer's image.

Examples of layers, channels and paths created from the component images of the composite image file of, for example, a paper cup, are depicted in FIG. 3S.

FIG. 3S depicts examples of layers 3S102, channels 3S104, and paths created from component images of a composite image file of a paper cup 3S100. In some implementations, a composite image file comprises metadata that captures information about the corresponding layers, the corresponding channels, the corresponding paths, and the like. For example, a sub-image 3S100 depicting a lid of a paper cup may have an associated layer 3S102 and the corresponding channels 3S104, which may be described in metadata associated with the composite image file.

In the example depicted in FIG. 3S, a select layer 3S102 corresponds to lid 3S100, while channels 3S104 correspond to the different area definitions of the selected image of the lid.

3.40. Example Components of a Composite Image File

FIG. 3T depicts example components 3T100 of a composite image file. The components of a composite image file may be used to recreate the information that was captured by the components and that corresponds to the initial layout that is stored in the initial PDF file. This allows recreating the initial layout based on the actual photographs taken from a physical product, which in the above examples depict a paper cup.

The process of creating layers, channels, and paths from the components of the composite image file involves determining the geometry, the attributes and the shapes and the different layers.

3.41. Generating a Digital Representation of the Physical Product

In some implementations, a composite image file (generated from the photographs taken from a physical product provided by a manufacturer) along with the image's corresponding metadata is read by the authoring tools, and the tool generates a representation of the asset that a user could control using the functionalities of a website or a configurable image. The representation of the asset is generated based on the composite image file (i.e., the image generated from the photographs of the physical product), not from the asset definition described in the previous sections. An example of this process is depicted in FIG. 3U.

FIG. 3U depicts a process of reading a composite image file 3U100 by authoring tools. In some implementations, a composite image file that is a combination of automatically processed photography and manually processed photography is read by the authoring tools to allow the application of complex filters 3U102 to the composite image file. A structured series of filters generates a digital asset which may be modified, controlled, and viewed as user interface elements in a web browser, mobile application, or computer program. The digital asset may have text, geometry, image, color, and texture elements that correspond to each customizable element in the physical product it represents. The digital asset is automatically associated with code which constructs user interface elements for a target platform. The user interface elements are provided by well-known Application Programming Interfaces provided by web browsers, mobile device operating systems, and digital computer operating systems.

3.42. Applying Filters to a Composite Image File

In some implementations, a method for applying filters to a composite image file comprises receiving a composite image file generated for a physical product. A composite image file may be represented as a data structure generated for the physical product. The composite image file is a layered image file that includes information about one or more components of the physical product and one or more characteristics of the physical product and comprises information about one or more layers expressed in a configurable image and information about one or more channels and layouts of the physical product expressed in a design view. Furthermore, the composite image file that captures the physical product is a combination of automatically processed photography and manually processed photography.

The method may further include selecting, based on a filter applicability, one or more filters, from a plurality of filters, to be applied to the composite image file. A filter, of the plurality of filters, is a computer program that comprises a set of executable commands which, when executed by a computer processor, cause the computer processor to traverse paths defined in a corresponding layout of the composite image file.

The method also includes applying the one or more filters to the composite image file to automatically segment the composite image file into a plurality of parts of the composite image file; and automatically apply the one or more filters to the plurality of parts of the composite image file to generate a digital representation of the physical product.

A digital representation comprises layers data and paths data that, in combination, represent an interactive digital design corresponding to the physical product. Furthermore, the digital representation is compatible with the one or more functionalities of the website.

The generating of the digital representation of the physical product may include controlling a flow of data associated with the one or more filters based on one or more controlling functionalities implemented in the one or more filters as they applied to the plurality of parts of the composite image file.

Generating of the digital representation of the physical product may also include applying the one or more filters to the plurality of parts of the composite image file to cause the one or more filters to process, in parallel, the plurality of parts of the composite image file and to generate a data structure that captures the composite image file of the physical product.

The method further comprises porting the digital representation of the physical product to a website to enable controlling, modifying, and displaying the digital representation of the physical product using one or more functionalities of the website.

3.43. Complex Filters

Once a composite image file is ported to the authoring tools, the tools may apply certain filters to the composite image file to break (i.e., to segment) the image into a set of parts (i.e., pieces) and to generate, from the pieces, a representation of the image that may be controlled, used, and/or modified by a user using the functionalities of a website, internet-based tools, mobile phone applications and the like.

The filters used at this stage are usually more complex and complicated than the filters described in the previous sections. As described before, the composite image file may be expressed in a PSD format, a tiff format, a jpg format, or any other format that can be understood by the authoring tools.

Once the composite image file is ported into the authoring tools, one or more complex filters are applied to the image to generate certain pieces of the image, and then to use the pieces to reassemble the image that is represented in the form that can be ported to a website and that can be controlled, modified, and otherwise processed by a user using the functionalities of the website or a configurable image.

3.44. Unique Processing of a Composite Image File

There are many different ways of generating composite image files. One way is to overlay images on top of each other. That, however, rarely reflects the accuracy and the details that are necessary to be able to actually generate information about, for example, the layers and channels of the composite image file.

The presented approach is different from the approach for just overlaying images on the top of each other. The presented approach allows processing a composite image file using a set of filters that are designed to and specialized to identify and extract various features of the composite image file. The authoring tools that implement the presented approach have built-in intelligence and specialized filters that allow recognizing various features in the composite image file in a unique and novel way. Some of the filters from the set may be executed on the composite image file sequentially, while some other filters from the set may be executed in parallel. Examples of the filters are shown in FIG. 3V.

FIG. 3V depicts examples of filters 3V102. The depicted filters include the filters that are executed on the composite image file and that generate outputs that allow a step-by-step creation, from the composite image file, the information about, for example, the layers and the channels capturing the specific characteristics of the depicted product. Then, from the outputs generated by the filters applied to the composite image file, a mesh for the asset is generated.

From the identified and created information, a graph view of the asset may be generated. An example of a graph view of the asset is depicted in FIG. 3U (3U102).

FIG. 3W depicts a configurable image file with a changeable background. The configurable image may include, for example, a depiction 3W100 of the asset itself, or for example, the depiction of the asset along with an external wall scene 3W102, additional staging elements, and other objects that in some way may enhance the overall appearance of the asset on the website.

It should be noted that depiction 3W100 of the asset itself in FIG. 3W is very similar, if not identical, to the depiction of the paper cup shown in FIG. 3R. FIG. 3R is the product image photograph in the composite image file (generated from the photographs of a physical product), while the depiction in 3W100 in FIG. 3W was obtained from a design view created when an asset (a configurable image) was designed using the asset geometry.

Another example of a configurable image of the asset is depicted in FIG. 3Z.

FIG. 3Z depicts an example of an image mapped to a design area of a composite product image. In the depicted example, the configurable image may include, for example, a depiction 3Z100 of the asset itself, or for example, the depiction of the asset along with an image applied to the products' printable area 3Z102, additional staging elements, and other objects that in some way may enhance the overall appearance of the asset on the website.

As mentioned before, each of the assets depicted in FIG. 3W and FIG. 3Z has a corresponding mesh and the associated mesh data that can be used to generate a model of the asset's configurable area.

3.45. Porting a Composite Image File into Authoring Tools

One of the advantages of porting a composite image file to the authoring tools and executing a set of filters on the ported image is that the output generated by the filters provides, so-called, a configurable image. The configurable image has an associated set of corresponding layers and channels, and the corresponding mesh that allows reconfiguring the asset and interacting with the individual components of the asset. For example, because the mesh of the asset is available, the asset is reconfigurable and thus a user may interact with the individual components of the asset. For instance, the user may interact with the lid of the paper cup, take the lid off the cup, put the lid back on the cup, put the lid at some other location within the depicted scene, and the like.

The fact that the resulting image is reconfigurable has many important implications and applicability and usability of the resulting image. For example, using the authoring tools, a user can map some new images or patterns onto the resulting image, or its areas, to create a new appearance of the corresponding asset as the asset is displayed. An example of mapping a new image onto the resulting image is depicted in FIG. 3Z.

The ability to map different images and/or patterns on the resulting image is a very valuable property because it allows a user to personalize and customize the asset and see the results of the customization in a real time on the website.

Furthermore, the approach guarantees that the way the new image or the pattern are mapped on the resulting image shown on the website will be the same as the physical product would look like once it is manufactured.

While the process described thus far appears to be rather complicated and time consuming, it provides many benefits and improvements of the approaches known in the field. For example, by porting a composite image file (generated based on a voluminous set of photographs taken from a physical product manufactured by a manufacturer according to manufacturing instructions) into authoring tools to obtain a version of the image that can be modified by a user using functionalities of a website, the resulting image displayed on the website provides a great deal of realism to the user and provides a highly satisfactory experience to the user who browses the website. Another benefit is being able to show, market, and merchandise an unlimited number of products from the one base image asset.

Further, since the ported image provides a great deal of ready-to-use different views, different finishes, different options that may be modifiable, and different variations, the process of editing, modifying, and customizing the asset using the ported image displayed on the website is convenient to the user and the customers in general.

In fact, personalizing and customizing the corresponding assets based on the ported images displayed on the website in real time is efficient and time-effective. In contrast, personalizing and customizing the assets offline may be quite inefficient.

Furthermore, the presented approach provides realistic images of actual physical objects. The obtained realistic images are more desirable than, for example, synthetic images obtained by rendering the images from the geometry. Indeed, rendering images based on the geometry, shaders, color palette, special effects, and the like, rarely results in obtaining a depiction of a real object, much less a depiction of an actual, physical product. In fact, such rendered images rarely relate to anything that can be produced in the physical world.

3.46. Examples of Complex Filters

FIG. 3ZA depicts examples of complex filters 3ZA100. More specifically, FIG. 3ZA depicts an example filter view of a filter graph that may be used to process an example composite image file. In comparison with a filter view of the filters shown in FIG. 3I, described earlier, the filters shown in FIG. 3ZA are more complex and the filter graph is more complex than the one in FIG. 3I.

3.47. Uniqueness of Complex Filters

While the filters shown in either FIG. 3I or FIG. 3ZA are executed automatically, it should be noted that the automatic execution of the filters shown in FIG. 3ZA is more complex and more complicated than the execution of the filters shown in FIG. 3I. This is mainly because of the volume of the filters shown in FIG. 3ZA, the complexity of the interdependencies between the filters shown in FIG. 3ZA, and consequently, the amount of processing that is involved in executing the filters shown in FIG. 3ZA.

Furthermore, the processing performed by the filters is complex because it involves performing a vast number of automatic iterations of the execution of the filters and iterations through the layers and channels of the input composite image file file. It also involves iteratively extracting various pieces of information from the file and reusing the extracted pieces to eventually build an interactive mesh of the resulting asset.

3.48. Creating Layers and Channels Using Complex Filters

Referring again to FIG. 3ZA, a graph view of the filters in the network of filters shown in FIG. 3WA depicts the filters that can be applied to a composite image file to generate layers and channels of an asset. Using the functionalities of, for example, Photoshop, the layers can be hidden from the view to a user. The functionalities of Photoshop allow demonstrating the distinctions between a channel and a layer.

A layer is usually something that one might want to hide or show to a customer often, while a channel refers to a color plane (for example, red, green, blue), an alpha mask, or, for example, a grayscale image that one may use to mask an area onto which we could apply a grid, or which can have some associated metadata that may be used to, for example, place something else, that may contain some crop information, or some sizing information, but not necessarily be a part of the image that one would want to show to a customer.

The filters provide many configurable options that, for example, allow hiding and showing accessories of the asset in, for example, a configurable image. For instance, when the asset is displayed in the configurable image on a website, a customer might be able to select a lid of a paper cup or not to select the lid of the paper cup. If the customer selects the lid (which may have a corresponding layer in the description of the asset), then the website may display the lid in the configurable image along with an indication to the customer that ordering the paper cup with the lid would increase the price of the cup.

3.49. Loading Layers

To facilitate a selection of, for example, a lid of a paper cup, the visualization platform may cause loading the layer that captures the metadata for the lid, and cause displaying the image of the lid on the website.

Loading the layer data that captures the metadata for the lid may include constructing, so-called, a short list that includes, for example, suffixes of the files that contain metadata for the lid. Then, a collection of the files created by the filters is searched using the suffixes specific to the lid metadata to select the individual files that indeed contain the metadata pertaining to the lid. Then, based on, for example, the requested view (e.g., a four-sides view), a subset of the selected files that correspond to the photographs depicting the lid in the requested view (e.g., the four-sides view) is identified. Those files contain metadata for representing, for example, all four views of the lid of the paper cup and the angle definitions for representing the lid. The selected subset of the files is then read and used to generate a configurable image of the requested asset of the requested part of the asset.

3.50. Example Static Views

FIG. 3ZB depicts example product data 3ZB100 used to define properties in authoring tools. In the depicted example, a column D indicates the different views, from a set of static views for representing the asset that is encoded in the corresponding files. For example, (1) the file called zazzle_papercup_side.XML encodes a view where the tilt of the camera [0, 0, 0] around the X, Y, and Z axis, respectively; (2) the file called zazzle_papercup_front.XML encodes a view where the tilt of the camera [0, 90, 0] around the X, Y, and Z axis, respectively; (3) the file called zazzle_paper_cup_side2.XML encodes a view where the tilt of the camera [0, 180, 0] around the X, Y, and Z axis, respectively; (4) the file called zazzle_paper_cup_back.XML encodes a view where the tilt of the camera [0, 270, 0] around the X, Y, and Z axis, respectively; and so forth. Those views correspond to the static views in which the photographs of a corresponding physical product were taken.

The static views are usually based on the preferences indicated by, for example, a design team that is usually familiar with the best ways of showcasing products to customers. For example, if a design team indicates that the best way to showcase a paper cup is to show a side view, a front view, another side view, and a back view, then, upon receiving a physical product from the manufacturer, the product is photographed in the side view, the front view, another side view, and the back view. The corresponding views may be captured in (1) the file called zazzle_paper_cup_side.XML that encodes a view where the tilt of the camera [0, 0, 0] around the X, Y, and Z axis, respectively; (2) the file called zazzle_paper_cup_front.XML that encodes a view where the tilt of the camera [0, 90, 0] around the X, Y, and Z axis, respectively; (3) the file called zazzle_paper_cup_side2.XML that encodes a view where the tilt of the camera [0, 180, 0] around the X, Y, and Z axis, respectively; (4) the file called zazzle_paper_cup_back.XML that encodes a view where the tilt of the camera [0, 270, 0] around the X, Y, and Z axis, respectively The files and the naming convention of the files may be arranged and organized in a variety of ways. The organization shown in FIG. 3ZB is just one of many ways of organizing and naming the files.

The absolute orientation and positioning of a product relative to the camera may be based on the function, design, and ornamentation of the product. For instance, 'Front' or orientation {0, 0, 0} may be functionally the portion of the product that the user interacts with, such as the front surface of a cell phone. It may be the portion of the product with the primary ornament or image, such as the portion of a cup the user can see while holding the handle. Similarly, the side or back of a product may be that area of the product, relative to the front that contains a surface or feature. In these cases, the camera or imaging system may be automatically moved so that these marked-up features labeled 'side', 'right side', 'left side' are presented most visibly to the camera or imaging system.

3.51. Example Content of an Example View File

FIG. 3ZC depicts content 3ZC100 of an example view file. In the depicted example, a particular file, from a short list of the files, has been read to the authoring tools and the corresponding parameters and their values are shown in FIG. 3ZC. The different types of the parameters are usually preconfigured in advance and correspond to the parameters used to capture the particular views of the physical product.

There are usually initial scripts that are created and used to preconfigure the parameters and their corresponding initial values in the files. Then the scripts are executed to read a base image, which captures a particular view, particular characteristics of the depicted product, and so forth.

For example, when a file is read that contains an image of a cup and an image of a lid, then layers for the cup and lid are created and several channels for the cup layer are created. The lid layer indicates that the lid may be either shown or hidden in a configurable image for a customer, while some channels indicate the areas within the cup that can be personalized, customized, or otherwise modified. In some implementations, the paths shown are not utilized.

Each individual filter may be relatively simple or relatively complicated, and the complexity of the filter depends on what type of image the filter is configured to read and what type of layers and channels the filter is configured to generate. For example, if a filter is configured to read a complex PSD file or if the filter is configured to figure out which colors are to be used and which colors are to be removed based on some heuristic approach, then the filter may be complex.

There is usually a wide range of functionalities that may be implemented in a filter. Examples of the functionalities include reading the image and its components correctly, representing the layers correctly, representing the color correctly, and the like. Some of the functionalities may be simple (e.g., reading in a particular layer from a PSD file); others may be complicated (e.g., figuring the colors that are important for depicting the asset and removing the colors that are unimportant for depicting the asset).

Another aspect of the filters' functionality includes making sure that the resulting asset is presented on the website using the three basic color channels, such as red, green, and blue, and not red, green, and blue and the sub-channels which may not enhance the user experience.

Some of the filter processing may include manipulations of the colors and colors' saturation and desaturation. For example, in some situations, the processing may include desaturation and removing some of the red hues from the photograph. The change may be quite subtle, but it is designed to enhance the user's experience.

Some processing performed by the filters may include anti-aliasing processing, which includes eliminating or minimizing the distortion artifacts when representing a high-resolution image at a lower resolution. Anti-aliasing is used in digital photography, computer graphics, digital audio, and many other applications. Some of the filters presented herein may be configured to minimize the distortions in the depicted assets to improve the user's experience.

3.52. Example Flow Charts

3.52.1. Method for Creating a Custom Product with Multiple Parameters Encoded in Product Manufacturing Instructions FIG. 4 is a flow chart depicting an example process for creating a custom product with multiple parameters encoded in product manufacturing instructions. The example process described in FIG. 4 may be executed by one or more components of core services 16 described in FIG. 1. For simplicity of the description, it is assumed that the steps described in FIG. 4 are performed by a core service.

In step 402, a core service represents each parameter, specific to a custom product, using one or more key-value pairs of a plurality of key-value pairs. As described previously, a key-value pair is a data structure that captures a pair and may include an attribute key and a corresponding attribute value. A key may be, for example, a name of the attribute, and a value may be, for example, the value associated with the key. The term "product" usually refers to a physical product, while the term "asset" usually refers to a digital file or an interactive digital product; these terms may be used interchangeably throughout the specification.

In step 404, the core service generates a plurality of classified key-values by classifying each key in the key-value pair based on its contribution to a manufactured appearance of the custom product to a group of a plurality of groups.

In step 406, based on the plurality of classifications, the core service determines values for each key, of the key-value pair from the plurality of key-value pairs. The determination may be based on characteristics of a to-be-manufactured, physical product that corresponds to the custom product (which is the designed and customized asset). The to-be-manufactured, physical product may, unfortunately, have one or more marked visual differences for the corresponding parameter from the corresponding key-value pair.

Also in this step, the core service translates the plurality of key-value pairs to a plurality of instructions that are represented in the data format that is compatible with the executable programs of a manufacturer.

The plurality of instructions may be transmitted to the manufacturer, causing the manufacturer to execute the executable programs using the plurality of instructions to generate a manufactured, physical product. As described above, the plurality of instructions captures the translation of the plurality of key-value pairs specific to the asset.

Upon receiving the physical product from the manufacturer, in step 408, an imaging means of the core service is used to detect one or more regions, in the physical product, that indicate visual differences between the physical product and the custom product.

If, in step 408, the core service determines that there are some visual differences, then the core service performs step 410. Otherwise, the core service stops in step 408A.

In step 410, the core service constructs, based on the one or more regions, a graphical representation of the physical product is constructed. The graphical representation is represented using a plurality of modified key-value pairs and is constructed in such a way that the plurality of modified key-value pairs indicate the changes in an appearance between the physical product and the customized product.

Also in this step, the core service correlates the plurality of the modified key-value, corresponding to the appearance of the physical product, with the plurality of key-value pairs derived previously and corresponding to the appearance of the custom product.

Based on the correlation, the core service determines one or more differences between the plurality of the modified key-value (corresponding to the appearance of the manufactured, physical product) and the plurality of key-value pairs (corresponding to the appearance of the custom product). The differences may be used to generate additional instructions to the manufacturer to help the manufacturer to manufacture a new product that resembles the custom product more accurately and/or better.

3.52.2. Method for Implementing Blockz

FIG. 5 is a flow chart depicting an example process for implementing BlockZ. The example process described in FIG. 5 may be executed by one or more components of core services 16 described in FIG. 1. For simplicity of the description, it is assumed that the steps described in FIG. 5 are performed by a data processing module of a plurality of data processing modules of a core service.

In some implementations, a data flow network implements one or more BlockZ. The data flow network may implement a plurality of data processing modules configured to process, in parallel, input data and to generate output data.

A data processing module of the plurality of data processing modules may be configured to receive data of the input data and/or the output data. The data processing module may be further configured to evaluate the data to determine a type of processing for the data; generate, based on the type of processing for the data, result data of the output data; and transmit the result data to one or more of the plurality of data processing modules.

The one or more data processing modules may execute as one or more parallel threads. The execution of the one or more parallel threads may be optimized according to one or more optimization criteria selected based on one or more of: types of the input data, the plurality of data processing modules, or types of the output data.

The steps described in FIG. 5, are performed by a plurality of data processing modules implemented in a data flow network and configured to process, in parallel, input data and to generate output data.

More specifically, in step 502, a data processing module receives data of the input data and/or the output data in parallel with other data processing modules from the plurality of modules.

In step 504, the data processing module evaluates the data to determine a type of processing for the data.

In step 506, the data processing module generates, based on the type of processing for the data, result data of the output data and transmits the result data to other data processing modules of the plurality of data processing modules. The processing of the data, by the data processing module of the plurality of data processing modules, may include controlling a flow of the data based on one or more controlling functionalities implemented in the data processing module. The processing may also include routing result data to the one or more of the plurality of data processing modules according to the flow of the data.

In step 508, the data flow network checks if all the modules of the plurality of data processing modules finished their respective processing. If they did, then step 510 is performed. Otherwise, step 502 is performed for other modules.

In step 510, the data flow network provides the combined result data to authoring tools, described earlier.

In some implementations, the data flow network is also configured to determine a probability value that may indicate a likelihood of a success of the processing of the data by the data processing module. The probability value may also indicate the likelihood of success that the processing of the data by the data processing module succeeded.

The data flow network is further configured to determine whether the probability value that indicates the likelihood of success that the processing of the data by the data processing module exceeds a threshold value. In response to determining that the probability value exceeds the threshold value, the data processing module determines that the processing of the data has succeeded and transmits the result data to the one or more of the plurality of data processing modules to indicate a success state of the processing data by the data processing module.

However, in response to determining that the probability value does not exceed the threshold value, the data processing module determines that the processing of the data has failed and transmits the result data to the one or more of the plurality of data processing modules to indicate a failed state of the processing data by the data processing module.

In some implementations, the probability value indicating the success is determined by executing the controlling functionalities implemented in the data processing module.

The processing of the data by the data processing module may include one or more of: determining whether a particular layer definition is present in the data, selecting, based on one or more criteria, a particular data processing module, of the one or more data processing modules, for transmitting the result data from the data processing model, or processing a plurality of key-value pairs included in the data.

3.52.3. Generating a Composite Image File

FIG. 6 is a flow chart depicting an example process for generating a composite image file. The example process described in FIG. 6 may be executed by one or more components of core services 16 described in FIG. 1, and/or via a manual construction using service tools. For simplicity of the description, it is assumed that the steps described in FIG. 6 are performed by a service.

In step 602, a service obtains a plurality of images of a physical product.

In step 604, the service applies a plurality of data processing modules implemented in a data flow network to the plurality of images to cause the modules to process, in parallel, the plurality of images and to generate a data structure that captures a composite image file of the physical product. The composite image file that captures the physical product is a combination of automatically processed photography and manually processed photography.

The processing of the plurality of images by a data processing module of the plurality of data processing modules may include (step 606) evaluating the plurality of images to determine a type of processing for the plurality of images, generating (step 608), based on the type of processing for the plurality of images, result data for the plurality of images, updating (step 610) the data structure based on the result data, and transmitting (step 612) the result data to one or more of the plurality of data processing modules.

The data structure that captures the composite image file of the physical product is a layered image file that includes information about one or more components of the physical product and one or more characteristics of the physical product. The composite image file usually includes information about one or more layers expressed in a configurable image and information about one or more channels and layouts of the physical product in a design view.

The evaluating of the plurality of images may include segmenting an image of the plurality of images, wherein one or more first images of the plurality of images are infrared images, while one or more second images of the plurality of images are 3D scans of the physical product. The evaluating of the plurality of images may also include processing one or more of the plurality of images using one or more of: a computation photography approach or an optical approach.

The processing of the plurality of images by a data processing module of the plurality of data processing modules may include controlling a flow of data associated with the plurality of data processing modules based on one or more controlling functionalities implemented in the plurality of data processing modules.

3.52.4. Applying Advanced Filters to a Composite Image File

FIG. 7 is a flow chart depicting an example process for applying filters to a composite image file. The example process described in FIG. 7 may be executed by one or more components of core services 16 described in FIG. 1. For simplicity of the description, it is assumed that the steps described in FIG. 7 are performed by a core service.

In step 702, a core service receives a composite image file generated for a physical product. A composite image file may be represented as a data structure generated for the physical product. It may capture the physical product that is a combination of automatically processed photography and manually processed photography.

A composite image file is a layered image file that includes information about one or more components of the physical product and one or more characteristics of the physical product and comprises information about one or more layers expressed in a configurable image and information about one or more channels and layouts of the physical product expressed in a design view.

In step 704, the core service selects, based on a filter applicability, one or more filters, from a plurality of filters, to be applied to the composite image file. A filter, of the plurality of filters, is a computer program that comprises a set of executable commands which, when executed by a computer processor, cause the computer processor to traverse paths defined in a corresponding layout of the composite image file.

In step 706, the core service applies the one or more filters to the composite image file to automatically segment the composite image file into a plurality of parts of the composite image file; and automatically apply the one or more filters to the plurality of parts of the composite image file to generate a digital representation of the physical product. A digital representation comprises layers data and paths data that, in combination, represent an interactive digital design corresponding to the physical product. Furthermore, the digital representation is compatible with the one or more functionalities of the website.

The generating of the digital representation of the physical product may include controlling a flow of data associated with the one or more filters based on one or more controlling functionalities implemented in the one or more filters as they applied to the plurality of parts of the composite image file. Generating of the digital representation of the physical product may also include applying the one or more filters to the plurality of parts of the composite image file to cause the one or more filters to process, in parallel, the plurality of parts of the composite image file and to generate a data structure that captures the composite image file of the physical product.

In step 708, the core service tests whether all applicable filters have been applied and finished their execution. If that is correct, then the core service performs step 710. Otherwise, the core service proceeds to step 706 to continue applying the filters.

In step 710, the core service ports the digital representation of the physical product to a website to enable controlling, modifying, and displaying the digital representation of the physical product using one or more functionalities of the website.

3.52.5. Correlating a Manufactured Product with an Interactive Asset

Figure 8:
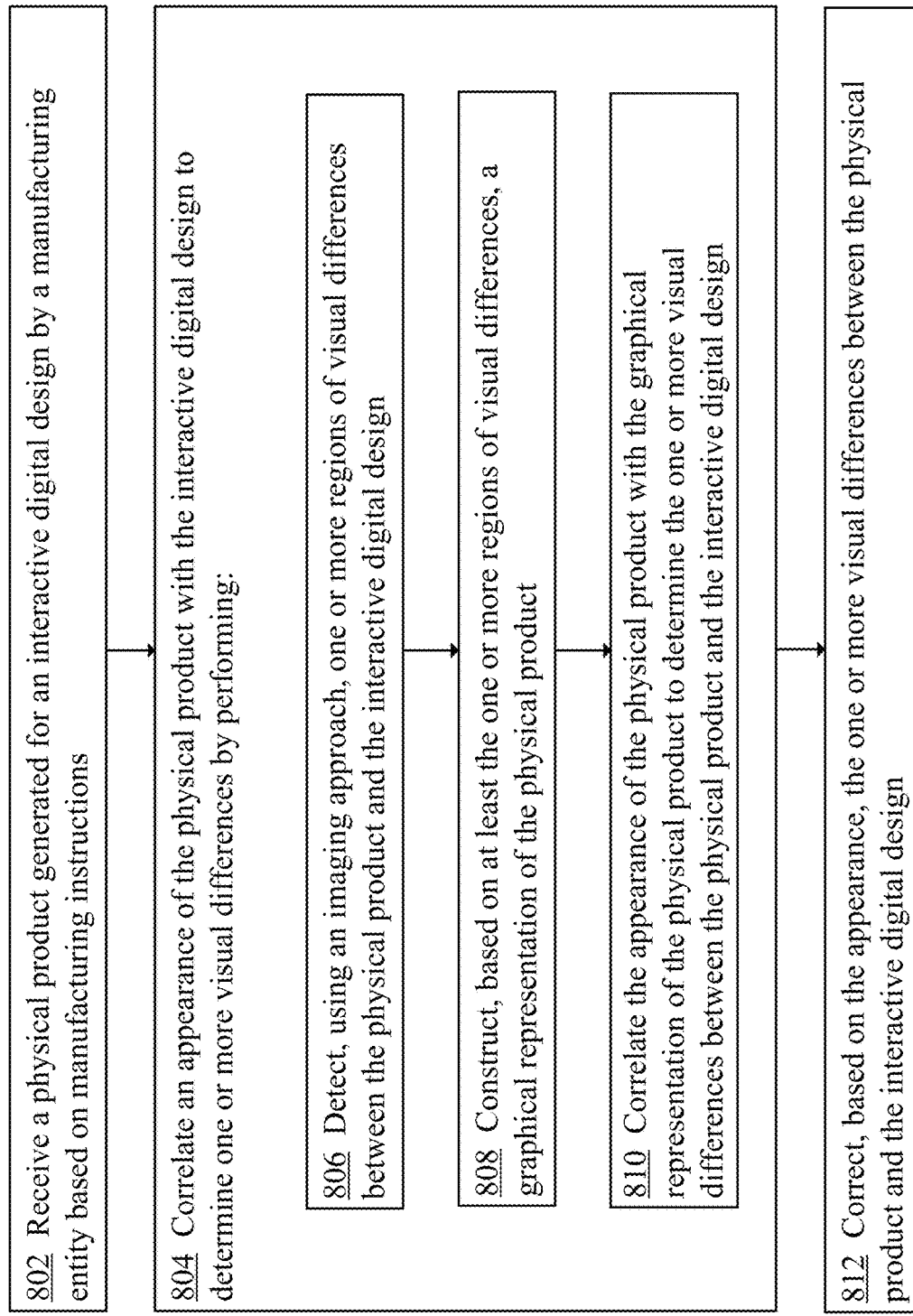
FIG. 8 is a flow chart depicting an example process for correlating a manufactured product with an interactive asset.

FIG. 8 is a flow chart depicting an example process for correlating a manufactured product with an interactive asset. The example process described in FIG. 8 may be executed by one or more components of core services 16 described in FIG. 1. For simplicity of the description, it is assumed that the steps described in FIG. 8 are performed by a core service.

In step 802, a core service receives a physical product generated for an interactive digital design by a manufacturing entity based on manufacturing instructions. Examples of the manufacturing instructions were described before.

In step 804, the core service correlates an appearance of the physical product, having a plurality of parameters, with the interactive digital design, having a plurality of corresponding parameters, to determine one or more visual differences between the physical product and the configurable image for the interactive digital design. The correlating of the appearance of the physical product with the interactive digital design is further described in steps 806-812.

In some implementations, in step 806, the core service detects, using an imaging approach, one or more regions of visual differences between the physical product and the interactive digital design.

In step 808, the core service constructs, based on at least the one or more regions of visual differences, a graphical representation of the physical product.

In step 810, the core service correlates the appearance of the physical product with the graphical representation of the physical product to determine the one or more visual differences between the physical product and the interactive digital design. The graphical representation may include a plurality of classified key-values that cause the one or more of visual differences in the one or more regions. The graphical representation of the physical product may be constructed using a computational photography approach. The computational photography approach may include an in-camera computation of digital panoramas, a computation of high-dynamic-range images, and/or a computation using a light-field camera.

A computational photograph approach may include obtaining a plurality of images depicting the physical product; recognizing, in each image, of the plurality of images, a location, of a plurality of locations, of a particular marker depicted in the image; mapping the plurality of locations onto a plane grid; and referencing the plurality of locations in the plane grid to a corresponding markup depicted in the interactive digital design. The plurality of images typically depicts the physical product from different viewing points.

In some implementations, the correlating of the appearance of the physical product with the interactive digital design is performed automatically and by executing one or more computer programs on a computing device. It may also include, for example, using markups, depicted at least in the physical product, to verify locations of a plurality of red lines, green lines, and blue lines of the markups. A markup, of the markups, may be a two-color checkerboard pattern comprising a plurality of squares, wherein each square has a single color and each adjacent square has an opposite color.

Furthermore, the correlating of the appearance of the physical product with the interactive digital design comprises using a grid markup, depicted at least in the physical product, to verify locations of a corresponding grid depicted in the interactive digital design. This may include generating a design view of the graphical representation of the physical product; and comparing the design view of the graphical representation of the physical product with a design view of the interactive digital design.

In step 814, the core service corrects, based on the appearance, the one or more visual differences between the physical product and the interactive digital design. The correcting the visual differences may include generating updated manufacturing instructions, providing correction instructions to the manufacturing entity, and the like.

3.53. Implementations Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
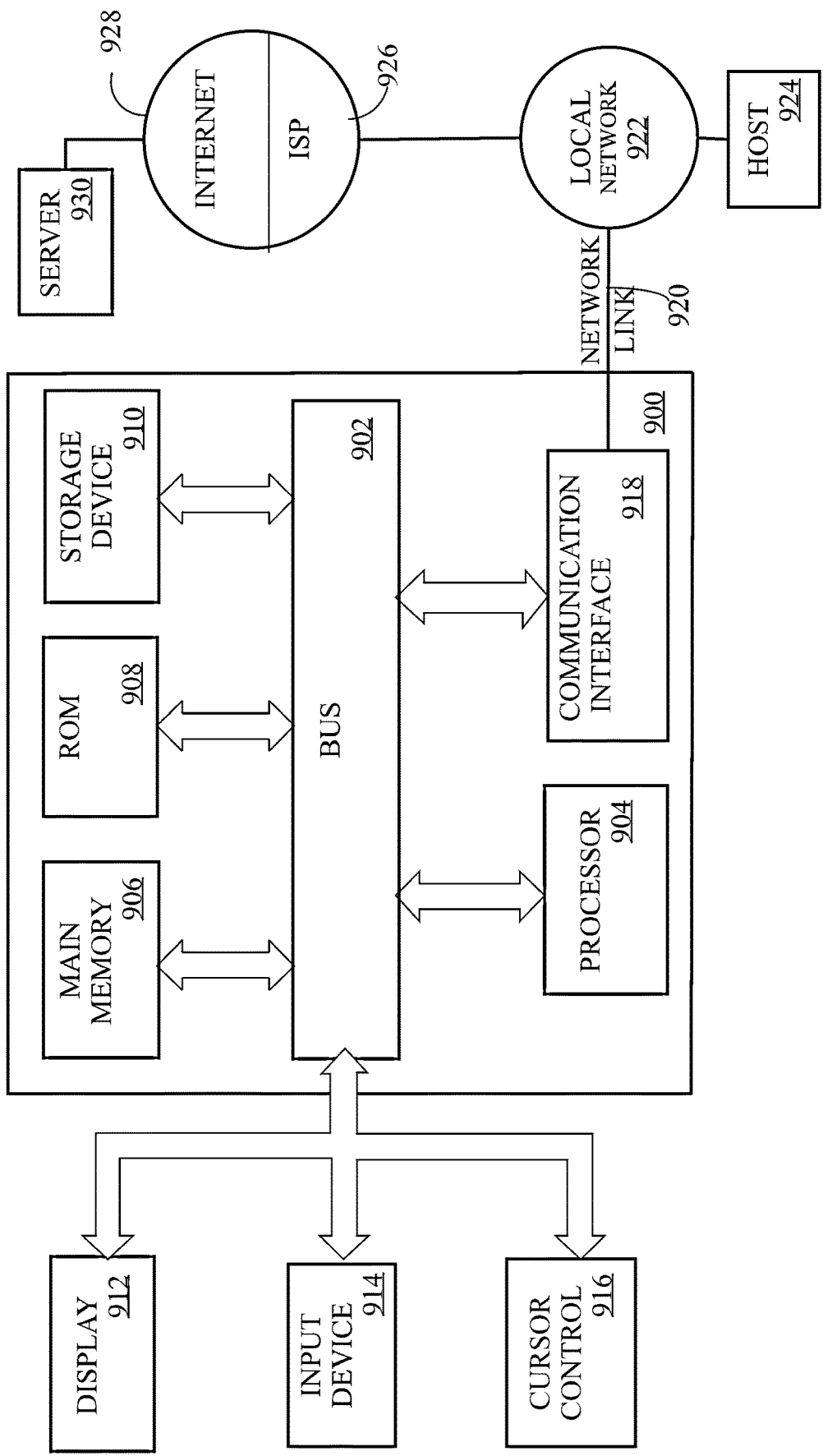
FIG. 9 is a block diagram that illustrates a computer system with which the techniques herein may be implemented.

FIG. 9 is a block diagram that depicts an example computer system 900 upon which embodiments may be implemented. Computer system 900 includes a bus 902 or other communication mechanism for communicating information, and a processor 904 coupled with bus 902 for processing information. Computer system 900 also includes a main memory 906, such as a random-access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. Although bus 902 is illustrated as a single bus, bus 902 may comprise one or more buses. For example, bus 902 may include without limitation a control bus by which processor 904 controls other devices within computer system 900, an address bus by which processor 904 specifies memory locations of instructions for execution, or any other type of bus for transferring data or signals between components of computer system 900.

An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input-device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic or computer software which, in combination with the computer system, causes or programs computer system 900 to be a special-purpose machine. According to one embodiment, those techniques are performed by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 900, various computer-readable media are involved, for example, in providing instructions to processor 904 for execution. Such a medium may take many forms, including but not limited to, non-volatile media and volatile media. Non-volatile media includes, for example, optical or magnetic disks, such as storage device 910. Volatile media includes dynamic memory, such as main memory 906. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip, or memory cartridge, or any other medium from which a computer can read.

Various forms of computer-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922.

For example, communication interface 918 may be an integrated service digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world-wide packet data communication network now commonly referred to as the "Internet" 928. Local network 922 and Internet 928 both use electrical, electromagnetic, or optical signals that carry digital data streams.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims that issue from this application, in the specific form in which such claims issue, including any subsequent correction. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. A method for processing and controlling a collection of data to generate output using a dynamic system, the method comprising:
    providing the dynamic system for generating digital representations of physical products;
    providing a control system:
        having two or more data modules, the two or more data modules being communicatively coupled to a collection of data and configured to receive collection data, from the collection of data, for a physical product of the physical products, from the dynamic system; and
        implementing a plurality of switches;
        wherein a switch, from the plurality of switches, is associated with a data module, of the two or more data modules, that implements intelligence for turning the switch on or off based on a plurality of conditions, and that is encoded in a configuration file, of a plurality of configuration files, associated with the data module;
    activating the dynamic system to read and process the collection data received from the dynamic system;
    applying one or more conditions, implemented in the data module of the control system, to the collection data to determine whether the collection data satisfy the plurality of conditions;
    in response to determining that the collection data satisfy a first condition, of the plurality of conditions:
        turning on the switch, of the plurality of switches according to the plurality of configuration files associated with the data module;
        generating a digital representation of the collection data as a series of user interface elements for a user to control, modify, and view the digital representation of the physical product using one or more common user interface classes available on a digital platform;
    in response to determining that the collection data do not satisfy the first condition of the plurality of conditions:
        turning off the switch, of the plurality of switches, according to the plurality of configuration files associated with the data module;
        pausing generating of the digital representation of the collection data.

2. The method of claim 1, further comprising executing a data module, of the two or more data modules, to invoke a plurality of filters; wherein two filters of the plurality of filters are executed in parallel.

3. The method of claim 1, further comprising executing a data module, of the two or more data modules, to invoke a plurality of filters; wherein two pairs of filters of the plurality of filters are executed in parallel.

4. The method of claim 1, further comprising generating a graphical representation of the output and updating a display using the graphical representation.

5. The method of claim 4, further comprising manipulating the display while the collection data continues to be received.

6. The method of claim 1, further comprising executing a suspend function to pause generating, based on the collection data, the output that satisfies the conditions set forth using the plurality of switches while the control system continues to operate.

7. The method of claim 1, further comprising providing an interface having a communication port for communicating with each of the two or more data modules.

8. The method of claim 1, further comprising defining a plurality of parameters for controlling the two or more data modules.

9. The method of claim 1, further comprising utilizing an event based trigger to initiate execution of a data module of the two or more data modules.

10. The method of claim 1, wherein the two or more data modules are virtually formed using at least one or more of: JAVA, C++, object-oriented code, XML, or a computer code.

11. The method of claim 1, wherein the two or more data modules provide displays in a form of at least one of: a textual form, a graphical form, or a multi-dimensional form.

12. The method of claim 1, wherein the dynamic system is at least one of: a virtual system or a physical system.

13. One or more non-transitory computer-readable storage media storing one or more computer instructions which, when executed by one or more computer processors, cause the one or more processors to perform:
    providing a dynamic system for generating digital representations of physical products;
    providing a control system:
        having two or more data modules, the two or more data modules being communicatively coupled to a collection of data and configured to receive collection data, from the collection of data, for a physical product of the physical products, from the dynamic system; and implementing a plurality of switches;

wherein a switch, from the plurality of switches, is associated with a data module, of the two or more data modules, that implements intelligence for turning the switch on or off based on a plurality of conditions, and that is encoded in a configuration file, of a plurality of configuration files, associated with the data module;

activating the dynamic system to read and process the collection data received from the dynamic system;

applying one or more conditions, implemented in the data module of the control system, to the collection data to determine whether the collection data satisfy the plurality of conditions;

in response to determining that the collection data satisfy a first condition, of the plurality of conditions:
- turning on the switch, of the plurality of switches according to the plurality of configuration files associated with the data module;
- generating a digital representation of the collection data as a series of user interface elements for a user to control, modify, and view the digital representation of the physical product using one or more common user interface classes available on a digital platform;

in response to determining that the collection data do not satisfy the first condition of the plurality of conditions:
- turning off the switch, of the plurality of switches, according to the plurality of configuration files associated with the data module;

pausing generating of the digital representation of the collection data.

14. The one or more non-transitory computer-readable storage media claim 13, storing additional instructions for: executing a data module, of the two or more data modules, to invoke a plurality of filters; wherein two filters of the plurality of filters are executed in parallel.

15. The one or more non-transitory computer-readable storage media claim 13, storing additional instructions for: executing a data module, of the two or more data modules, to invoke a plurality of filters; wherein two pairs of filters of the plurality of filters are executed in parallel.

16. The one or more non-transitory computer-readable storage media claim 13, storing additional instructions for: generating a graphical representation of output and updating a display using the graphical representation.

17. The one or more non-transitory computer-readable storage media claim 16, storing additional instructions for: manipulating the display while the collection data continues to be received.

18. The one or more non-transitory computer-readable storage media claim 13, storing additional instructions for: executing a suspend function to pause generating, based on the collection data, output that satisfies the conditions set forth using the plurality of switches while the control system continues to operate.

19. The one or more non-transitory computer-readable storage media claim 13, storing additional instructions for: providing an interface having a communication port for communicating with each of the two or more data modules.

20. The one or more non-transitory computer-readable storage media claim 13, storing additional instructions for: defining a plurality of parameters for controlling the two or more data modules.

* * * * *

UNITED STATES PATENT AND TRADEMARK OFFICE
CERTIFICATE OF CORRECTION

PATENT NO. : 12,056,343 B2  
APPLICATION NO. : 17/827726  
DATED : August 6, 2024  
INVENTOR(S) : Harvill et al.

Page 1 of 1

It is certified that error appears in the above-identified patent and that said Letters Patent is hereby corrected as shown below:

On the Title Page

Item (72) Correct the first inventor name from Leslie Youong Harvill to Leslie Young Harvill Signed and Sealed this  
Twenty-seventh Day of May, 2025

Coke Morgan Stewart  
*Acting Director of the United States Patent and Trademark Office*